(12) United States Patent
Chen et al.

(10) Patent No.: US 12,039,652 B2
(45) Date of Patent: Jul. 16, 2024

(54) ANIMATION DATA ENCODING/DECODING METHOD AND APPARATUS, STORAGE MEDIUM, AND COMPUTER DEVICE

(71) Applicant: TENCENT TECHNOLOGY (SHENZHEN) COMPANY LIMITED, Guangdong (CN)

(72) Inventors: Renjian Chen, Shenzhen (CN); Hailong Gong, Shenzhen (CN); Guopeng Qi, Shenzhen (CN); Xinxing Chen, Shenzhen (CN); Haobin Liang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 355 days.

(21) Appl. No.: 17/378,242

(22) Filed: Jul. 16, 2021

(65) Prior Publication Data
US 2021/0350605 A1 Nov. 11, 2021

Related U.S. Application Data

(63) Continuation of application No. PCT/CN2020/094119, filed on Jun. 3, 2020.

(30) Foreign Application Priority Data

Jun. 11, 2019 (CN) .......................... 201910502932.9

(51) Int. Cl.
*G06T 13/80* (2011.01)
*G06T 9/00* (2006.01)
(Continued)

(52) U.S. Cl.
CPC ................ *G06T 13/80* (2013.01); *G06T 9/00* (2013.01); *H04N 19/176* (2014.11); *H04N 19/597* (2014.11); *H04N 19/70* (2014.11)

(58) Field of Classification Search
None
See application file for complete search history.

(56) References Cited

U.S. PATENT DOCUMENTS

| 2010/0149215 | A1 | 6/2010 | Kota et al. |
| 2018/0005157 | A1 | 1/2018 | Narayan et al. |
| 2020/0104976 | A1* | 4/2020 | Mammou ................. G06T 3/40 |

FOREIGN PATENT DOCUMENTS

| CN | 102289835 A | 12/2011 |
| KR | 10-1745287 B1 | 6/2017 |
| WO | WO 2015/020495 A1 | 2/2015 |

OTHER PUBLICATIONS

International Search Report and Written Opinion dated Aug. 28, 2020, in PCT/CN2020/094119, with English translation (8 pages).

* cited by examiner

*Primary Examiner* — Kyle Zhai
(74) *Attorney, Agent, or Firm* — ArentFox Schiff LLP

(57) ABSTRACT

An animation data encoding method includes obtaining animation data corresponding to an animation tag code from an animation project file. In response to a determination that attribute types exist in an attribute structure table corresponding to the animation tag code, the method further includes determining attribute flag information corresponding to each attribute in the attribute structure table. The method also includes encoding, by processing circuitry of a computer device, an attribute value corresponding to each attribute in the animation data according to the attribute flag information, to obtain attribute content corresponding to each attribute. The method further includes, for each attribute, sequentially storing the corresponding attribute flag information and the corresponding attribute content accord- (Continued)

ing to an attribute order of the attribute structure table, to obtain a dynamic attribute data block corresponding to the animation tag code.

14 Claims, 8 Drawing Sheets

(51) Int. Cl.
*H04N 19/176* (2014.01)
*H04N 19/597* (2014.01)
*H04N 19/70* (2014.01)

| Field | Data type | Attribute type | Default value | Remarks |
|---|---|---|---|---|
| id | EncodedUint32 | FixedValue | 0 | Mask ID |
| inverted | Bool | BitFlag | FALSE | Whether to invert a mask |
| maskMode | Uint8 | Value | 1 | Mask blend mode |
| maskPath | Path | SimpleProperty | Null path object | Vector path of mask |
| maskOpacity | Uint8 | SimpleProperty | 255 | Transparency of mask |
| maskExpansion | Float | SimpleProperty | 0 | Edge expansion parameter of mask |

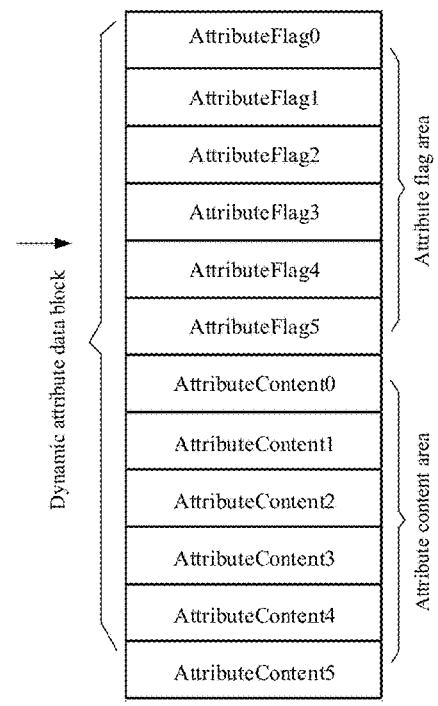

FIG. 9

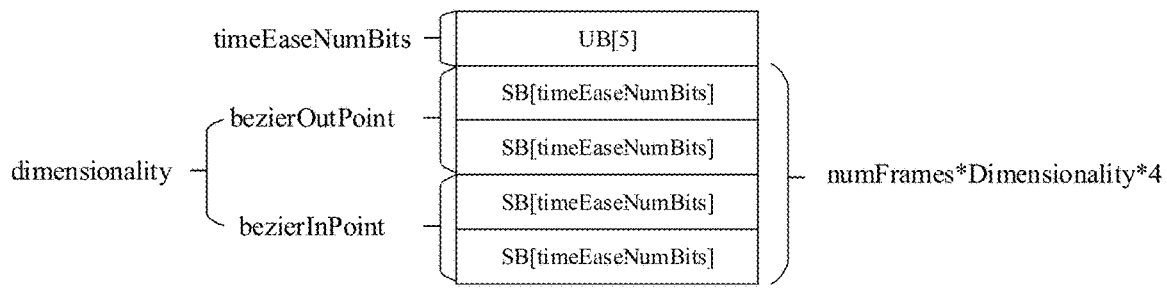

FIG. 10

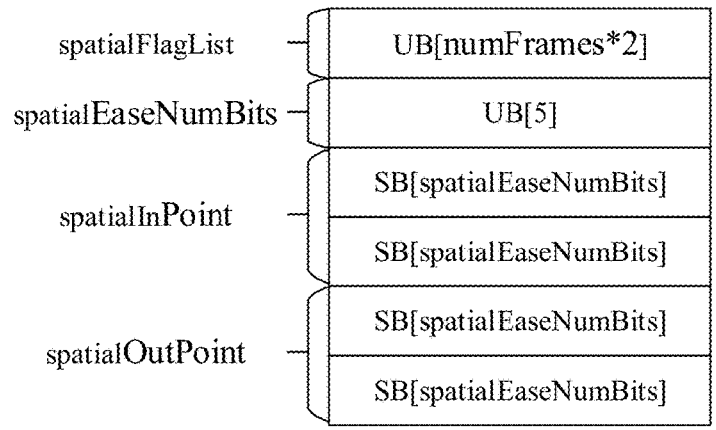
FIG. 11
| CompositionID | Composition Attributes | width/height/ frameRate | nBits | Bitmap Count | x/y/fileBytes | ... | x/y/fileBytes |
FIG. 12
| CompositionID | hasAlpha | Composition Attributes | width/height/ frameRate | alphaStartX/ alphaStartY | sps/pps | Count | frame/fileBytes | ... |
FIG. 13
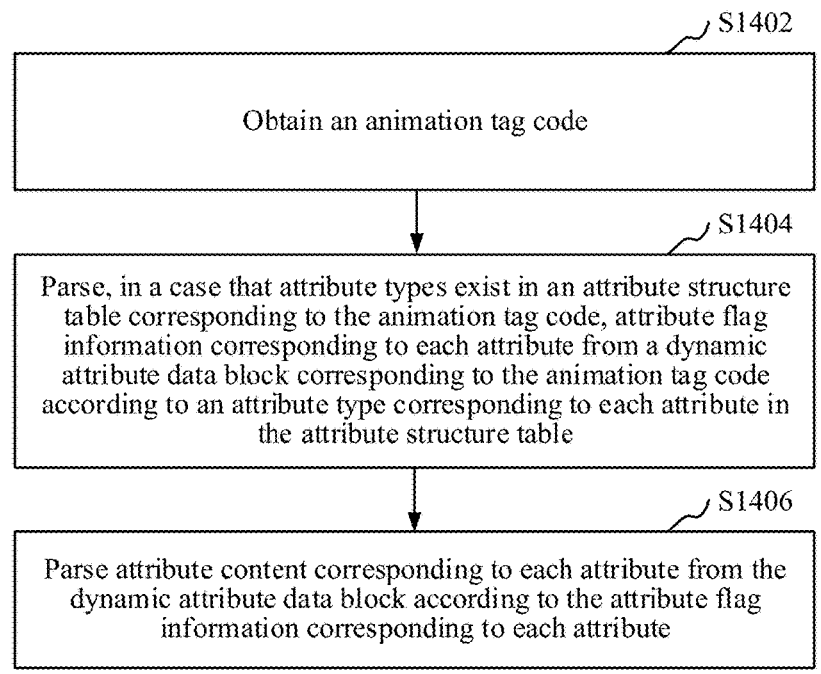
FIG. 14

ANIMATION DATA ENCODING/DECODING METHOD AND APPARATUS, STORAGE MEDIUM, AND COMPUTER DEVICE

RELATED APPLICATIONS

This application is a continuation of International Application No. PCT/CN2020/094119, filed on Jun. 3, 2020, which claims priority to Chinese Patent Application No. 201910502932.9, entitled "ANIMATION DATA ENCODING/DECODING METHOD AND APPARATUS, STORAGE MEDIUM, AND COMPUTER DEVICE" filed on Jun. 11, 2019. The entire disclosures of the prior applications are hereby incorporated by reference in their entirety.

FIELD OF THE TECHNOLOGY

This application relates to the field of computer technologies, including an animation data encoding/decoding method and apparatus, a computer-readable storage medium, and a computer device.

BACKGROUND OF THE DISCLOSURE

In order to make video or image content livelier and more interesting, the user adds an animation effect when editing the video or image content. Substantially, the animation effect is presented based on an animation file, which may also be referred to as a sticker. The more complex animation effects indicate more animation attribute data included in a corresponding animation file, and a larger size of the animation file.

A traditional process of making an animation file is: an animation project file is first designed by an animation designer, the animation project file including animation special effect data, and then various kinds of complex animation special effects are realized by a development engineer by using native code.

However, the foregoing process requires a large number of additional flag fields to identify attribute states during encoding, resulting in an excessively large volume of the animation file and a waste of a storage space.

SUMMARY

According to embodiments in this application, an animation data encoding/decoding method and apparatus, a computer-readable storage medium, and a computer device are provided.

In an embodiment, an animation data encoding method includes obtaining animation data corresponding to an animation tag code from an animation project file. In response to a determination that attribute types exist in an attribute structure table corresponding to the animation tag code, the method further includes determining attribute flag information corresponding to each attribute in the attribute structure table. The method also includes encoding, by processing circuitry of a computer device, an attribute value corresponding to each attribute in the animation data according to the attribute flag information, to obtain attribute content corresponding to each attribute. The method further includes, for each attribute, sequentially storing the corresponding attribute flag information and the corresponding attribute content according to an attribute order of the attribute structure table, to obtain a dynamic attribute data block corresponding to the animation tag code.

In an embodiment, an animation data decoding method includes obtaining an animation tag code, and, in response to a determination that attribute types exist in an attribute structure table corresponding to the animation tag code, decoding animation data by processing circuitry of a computer device by parsing, according to an attribute type corresponding to each attribute in the attribute structure table, attribute flag information corresponding to each attribute from a dynamic attribute data block corresponding to the animation tag code. The method further decodes the animation data by parsing, according to the attribute flag information corresponding to each attribute, attribute content corresponding to each attribute from the dynamic attribute data block.

An animation data encoding apparatus includes processing circuitry configured to obtain animation data corresponding to an animation tag code from an animation project file, and, in response to a determination that attribute types exist in an attribute structure table corresponding to the animation tag code, determine attribute flag information corresponding to each attribute in the attribute structure table. The processing circuitry is also configured to encode, according to the attribute flag information, an attribute value corresponding to each attribute in the animation data, to obtain attribute content corresponding to each attribute. The processing circuitry is further configured to, for each attribute, sequentially store, according to an attribute order of the attribute structure table, the corresponding attribute flag information and the corresponding attribute content, to obtain a dynamic attribute data block corresponding to the animation tag code.

Details of one or more embodiments of this application are provided in the accompanying drawings and descriptions below. Other features and advantages of this application become clear with reference to the specification, the accompanying drawings, and the claims.

BRIEF DESCRIPTION OF THE DRAWINGS

FIG. 9 is a schematic structural diagram of an attribute structure table and a dynamic attribute data block corresponding to mask information according to an embodiment.

FIG. 10 is a schematic diagram of an encoding structure of a time easing parameter array according to an embodiment.

FIG. 11 is a schematic diagram of an encoding structure of a spatial easing parameter array according to an embodiment.

FIG. 12 is a diagram of an encoding structure of animation data corresponding to a bitmap sequence frame encoding manner according to an embodiment.

FIG. 13 is a diagram of an encoding structure of animation data corresponding to a video sequence frame encoding manner according to an embodiment.

FIG. 14 is a schematic flowchart of an animation data decoding method according to an embodiment.

DETAILED DESCRIPTION

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

The following describes terms involved in this application.

AE: short for Adobe After Effects. Adobe After Effects is graphics video processing software that may be configured to design complex video special effects. Designers design complex animation effects by using this software. An obtained animation file is an AE project file (with a filename extension .aep), which is also referred to as an animation project file in the following description. The AE project file is used for storing a composition, as well as all source files and animation characteristic parameters used in the composition. The composition is a collection of layers.

PAG: short for Portable Animated Graphics. It is a self-developed binary animation file format proposed by this application. A PAG file may be attached to a video as an animation effect, which is referred to as an animated sticker.

PAGExporter: A self-developed animation export plug-in for the PAG file, which may be used for reading animation special effect data in the AE project file, and exporting the read animation special effect data in any of a vector export manner, a bitmap sequence frame export manner, or a video sequence frame export manner, to obtain the PAG file. The PAGExporter may be loaded as a plug-in of the AE software and then export the AE project file to obtain the PAG file.

PAGViewer: Self-developed animation preview software, which may be used for previewing the PAG file and writing performance parameters to the PAG file, to verify the PAG file according to the performance parameters when the PAG file is uploaded to a server.

Figure 1:
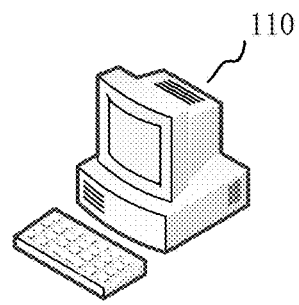
FIG. 1 is a diagram of an application environment of an animation data encoding method according to an embodiment.

FIG. 1 is a diagram of an application environment of an animation data encoding method according to an embodiment. Referring to FIG. 1, the animation data encoding method is applicable to a terminal 110.

Software supporting graphics and video processing is installed and run on the terminal 100. An animation project file is generated by using, for example, AE software. An animation export plug-in such as PAGExporter is also installed on the terminal 110. When the terminal 100 runs the software to open the animation project file, the terminal may read animation data in the animation project file by using the animation export plug-in, and load the animation export plug-in to encode the animation data, to obtain a target animation file such as a PAG file. The terminal 110 may be specifically a desktop terminal or a mobile terminal, and the mobile terminal may be specifically at least one of a mobile phone, a tablet computer, a notebook computer, and the like.

Figure 2:
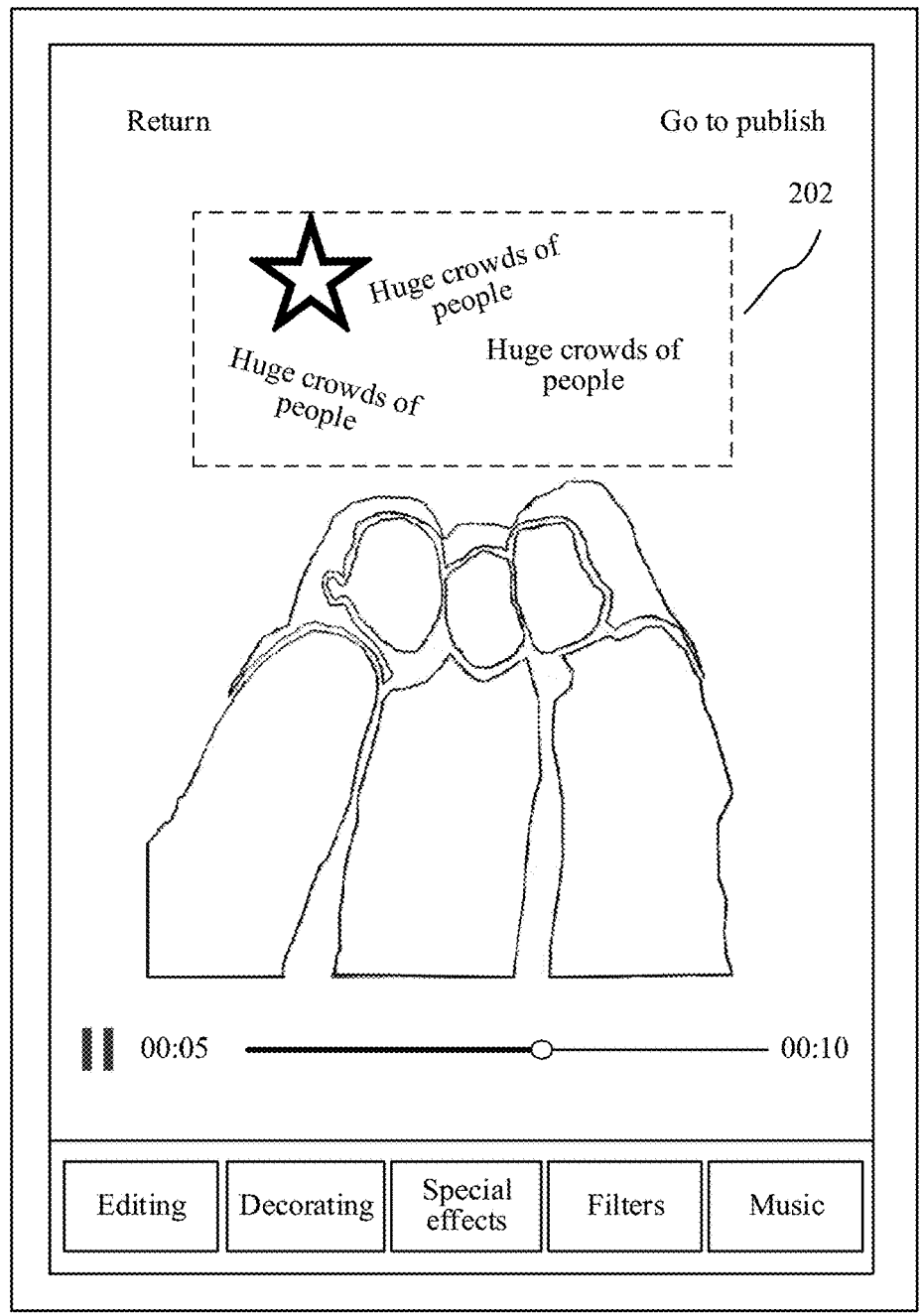
FIG. 2 is a schematic diagram of adding an animation sticker to video content when a video is acquired according to an embodiment.

In an embodiment, the PAGExporter running on the terminal 110 processes the animation data in the animation project file and exports the animation data, to obtain the PAG file. When the PAG file is played by the PAGViewer, statistics are calculated on performance parameters of the PAG file, and the calculated performance parameters of the PAG file are written into the PAG file. Finally, the performance parameters carried by the PAG file may be further verified by a verification server. The successfully verified PAG file may be published to a network, and then played by users after being downloaded. An animation effect represented by the PAG file may be attached to a video as an animation sticker. FIG. 2 is a schematic diagram of adding an animation sticker 202 to video content when a video is acquired according to an embodiment.

The following describes binary animation file formats, that is, basic data types used by the PAG file. The data types describe encoding formats of data stored in the file.

The basic data types, used when the animation data is encoded to obtain the PAG file, include an integer type, a Bool (Boolean) type, a floating-point number type, an array type, a bit type, a time type, and a string type. These data types are typically of fixed data lengths, or referred to as fixed-length data types.

The basic data types further include new data structures that are customized through arrangement and combination based on these data types as new data types, also referred to as combination types. The combination types may be used for describing animation data and includes a variable-length encoded integer type, a coordinate type, a ratio type, a color type, a font type, a transparency change information type, a color change information type, a text type, a path type, a byte stream type, a bitmap information type, and a video frame information type.

The following describes in detail the foregoing basic data types:

1. Integer Type

| Data type | Remarks |
| --- | --- |
| Int8 | 8-bit integer |
| Int16 | 16-bit integer |
| Int32 | 32-bit integer |
| Int64 | 64-bit integer |
| Uint8 | Unsigned 8-bit integer |
| Uint16 | Unsigned 16-bit integer |
| Uint32 | Unsigned 32-bit integer |
| Uint64 | Unsigned 64-bit integer |

All integer values are stored in the PAG file in a binary form. It can be seen from the above table that data of integer type may be stored according to the signed and unsigned 8-bit, 16-bit, 32-bit, and 64-bit. The data in the PAG file may be stored in "little endian", that is, data in a lower-order byte is stored at a lower address in a memory, and data in a high-order byte is stored at an upper address in the memory. The data of integer type is of a data type on which byte alignment needs to be performed, that is, a value of the first bit of an integer value is stored in the first bit of a byte in the PAG file.

2. Bool Type

| Data type | Remarks |
|---|---|
| Bool | 0 represents false; 1 represents true |

Referring to the above table, Bool data in the PAG file is represented by one bit, which can save storage space compared to being represented by one byte. The Bool type is a data type on which byte alignment does not need to be performed.

3. Floating-Point Number Type

| Data type | Remarks |
|---|---|
| Float | Single-precision 32-bit |

In the PAG file, a decimal data type is represented by the single-precision floating-point number type.

4. Array Type

For data that is of the same data type and is stored continuously, a set of data may be represented by adding a symbol [n] after the data type, n representing a length of an array. For example, Uint8[10] represents a one-dimensional array of a Uint8 type, with a length of 10. In another example, Int8[n][m] is a two-dimensional array, m representing a length of the array, which indicates that there are m counts of Int8[n] data.

5. Bit type

| Data type | Remarks |
|---|---|
| SB[nBits] | Integer (nBits represent the number of occupied bits) |
| UB[nBits] | Unsigned integer (nBits represent the number of occupied bits) |

Unlike a data type that occupies a fixed number of bits, the bit type is a variable-length data type and may be used for representing both a signed integer and an unsigned integer. For example, SB[5] may be used for representing a data type of a signed integer that occupies five bits, and UB[2] may be used for representing a data type of an unsigned integer that occupies two bits. SB is an abbreviation for Signed Bits, and UB is an abbreviation for Unsigned Bits.

Unlike the data type (for example, the Int8 and the Uint16) on which byte alignment needs to be performed, byte alignment does not need to be performed on data of the bit type. Specifically, when data of the data type on which the byte alignment needs to be performed is encoded behind data of the bit type, then the byte alignment needs to be performed on the last byte of the bit type, that is, extra bits in the last byte except for the data of the bit type need to be filled with 0 for implementing the byte alignment.

Figure 3:
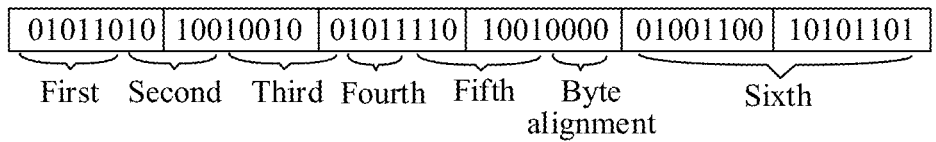
FIG. 3 is a schematic diagram of a 48-bit data stream.

Referring to FIG. 3, a 48-bit (six bytes) binary data stream is used as an example for description. The binary data stream includes six numerical values with different bit lengths. The first five numerical values are of the bit type, and the last numerical value is of the Uint16 type. Each grid represents one byte. The first numerical value (010110) of the bit stream occupies six bits. The second numerical value (10100) occupies five bits, which spans the first byte and the second byte. The third numerical value (100100) occupies six bits, which also spans two bytes. The fourth numerical value (1011) occupies four bits, all bits of the numerical value belong to the third byte. The fifth numerical value (1101001) occupies seven bits, and the sixth numerical value after the fifth numerical value is a byte-aligned numerical value (0100110010101101). Therefore, the remaining four bits in the byte (the fourth byte) occupied by the fifth numerical value are filled with 0.

In order to compress a space occupied by the PAG file as much as possible, a group of consecutive data of the same type may be further encoded by using a consecutive data encoding method. Specifically, a header area is added in front of the group of consecutive data of the same type, and a value in the header area is used for indicating the number of bits nBits occupied by the group of consecutive data of the same type. That is, each data in the group of consecutive data of the same type after the heard area is stored according to the number of bits. A specific value of the nBits is determined according to a maximum value in the group of data. Other smaller data in the group of data is encoded in a high-bit zero padding manner.

Figure 4:
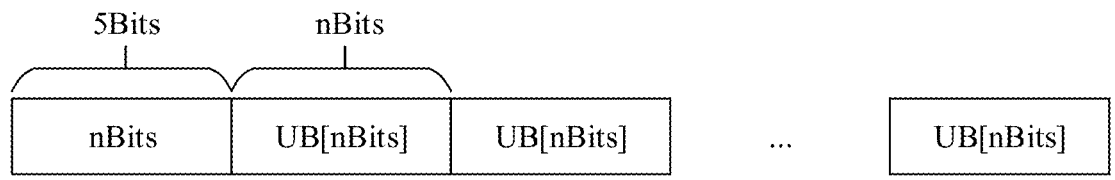
FIG. 4 is a schematic diagram of an encoding structure of consecutive unsigned integer data according to an embodiment.

FIG. 4 is a schematic diagram of an encoding structure for encoding consecutive unsigned integer data. Referring to FIG. 4, the header area stores the number of bits nBits occupied by each data in the group of consecutive integer data; and subsequently, the group of consecutive integer data is encoded by using the UB[nBits] type. The storage of consecutive 32-bit unsigned integer data is used as an example, the header area occupies a maximum of five bits for storing the nBits.

For example, for a group of 16-bit unsigned integer data: 50, 100, 200, 300, 350, and 400, if encoding is performed according to the Uint16 type, each data occupies 16 bits, and this group of data occupies a total of 96 bits. If the encoding is performed according to the consecutive data encoding manner, it is determined, according to the maximum value of 400, that each data occupies 10 bits, and thus is encoded according to the UB[10] type; besides, a UB[4] type header area is added in front of this group of data, used for storing the value "10". That is, the header area occupies four bits, and this group of consecutive data immediately after the header area occupies 60 bits. Therefore, this group of data occupies 64 bits, which saves 32 bits (four bytes) compared to being encoded in the traditional manner.

The manner of encoding the consecutive signed integer data is consistent with that of encoding the unsigned integer data. The difference is that, all the read data after the header area represents the content of the numerical value when the unsigned integer data is encoded; while the read first bit after the header area represents the sign bit (0 represents a positive number, and 1 represents a negative number), and the subsequent consecutive nBits-1 bits represent the content of the numerical value when the signed integer data is encoded. The consecutive floating-point data may be alternatively encoded in the above consecutive data encoding manner.

Further, some pieces of consecutive floating-point data in which a loss of precision is allowed may also be converted into integer data, and then encoded in the above manner of encoding the consecutive integer. Specifically, for coordinate data representing points in space, for example, a spatial easing parameter being of the floating-point type, the floating-point data may be divided by a spatial precision coefficient (SPATIAL_PRECISION=0.05) and then converted to an integer. For coordinate data representing a Bezier curve easing parameter, the floating-point data, after being divided by a Bezier precision coefficient (BEZIER_PRECISION=0.005), may be converted to an integer and then encoded. For coordinate data representing gradient change information, the floating-point data, after being divided by a gradient change precision coefficient (GRADIENT_PRECISION=0.00002), may be converted to an integer and then encoded.

6. Time Type

Data of the time type (Time) in the PAG file is uniformly represented by Int64. The time type may be used for representing a frame serial number. The frame serial number of each frame, after being divided by a frame rate, may be converted into an external time by using a second as a unit.

7. String Type

| Field | Field type | Remarks |
|---|---|---|
| String | Uint8[n] | Representing a non-empty character array with a length of n |
| StringEnd | Uint8 | Identifying end of a string |

In the PAG file, data of the string type (String) identifies end of a string by using a null character.

8. Variable-Length Encoded Integer Type

| Data type | Remarks |
|---|---|
| EncodedInt32 | Variable-length encoded 32-bit integer |
| EncodedUint32 | Variable-length encoded 32-bit unsigned integer |
| EncodedInt64 | Variable-length encoded 64-bit integer |
| EncodedUint64 | Variable-length encoded 64-bit unsigned integer |

The variable-length encoded integer type represents an integer by using a byte as the smallest storage unit. An integer value occupies a minimum of one byte and a maximum of four bytes or eight bytes. When a numerical value of the variable-length encoded integer type is encoded, the first seven bits of a byte are used for representing the numerical value, and the $8^{th}$ bit is used for identifying whether there is a numerical value behind. If the $8^{th}$ bit is 0, it indicates that a next byte does not belong to the content of the numerical value. If the $8^{th}$ bit is 1, it indicates that the next byte still belongs to the content of the numerical value. Therefore, during decoding, if the $8^{th}$ bit of each byte is 0, it indicates that the reading of the numerical value has been finished. If the $8^{th}$ bit is 1, it indicates that the reading of the numerical value has not been finished, and the next byte needs to be read until the end of the length (32 bits or 64 bits). For a signed variable-length encoded integer type, a value of an unsigned encoded integer type is first read, and then a sign bit is determined.

For example, if a data value 14 is of a data type of EncodedInt32 data type, a corresponding binary is: 0011100, which occupies 24 bits less than being of a data type of Int32.

9. Coordinate Type

| Field | Field Type | Remarks |
|---|---|---|
| x | Float | X-axis coordinate |
| y | Float | Y-axis coordinate |

The coordinate type (Point) is used for representing coordinates of a position, that is, values on an x-axis and a y-axis. When a numerical value of the coordinate type is encoded, a value on the x-axis is first encoded by using 32 bits, and then a value on the y-axis is encoded by using 32 bits.

10. Ratio Type

| Field | Field Type | Remarks |
|---|---|---|
| numerator | EncodedInt32 | Numerator |
| denominator | EncodedInt32 | Denominator |

The ratio type (Ratio) is used for representing a ratio. When a numerical value of the ratio type is encoded, a value of a numerator occupying variable-length bits is first encoded, and then a value of a denominator occupying variable-length bits is encoded.

11. Color Type

| Field | Field Type | Remarks |
|---|---|---|
| Red | Uint8 | Red value (0 to 255) |
| Green | Uint8 | Green value (0 to 255) |
| Blue | Uint8 | Blue value (0 to 255) |

The color type (Color) is used for representing a color value, which typically includes three colors of red, green, and blue. When a numerical value of the color type is encoded, the red value is first encoded by using one byte, the green value is subsequently encoded by using a second byte, and the blue value is encoded by using a third byte. Each color value is of a data type of Uint8.

12. Font type

| Field | Field Type | Remarks |
|---|---|---|
| id | EncodedUint32 | Unique identifier |
| fontFamily | String | Font family |
| fontStyle | String | Font style |

The font type (FontData) is used for identifying a font. When a numerical value of the font type is encoded, a variable-length font identifier is first encoded, and then the font family and the front style to which the font belongs are encoded respectively by using the String data type. The numbers of bits respectively occupied by the font family and the font style are determined based on a character length. The fontFamily represents a font name, which may be the name of a font or the name of a type of font. The fontStyle is used for defining a slant degree of the font, including an italic front, a slanted front, or a normal font.

13. Transparency Change Information Type

| Field | Field Type | Remarks |
|---|---|---|
| position | Uint16 | Start point |
| midpoint | Uint16 | Middle point |
| opacity | Uint8 | Opacity (0 to 255) |

The transparency change information type (AlphaStop) is used for describing transparency gradient information.

The floating-point number type needs to be encoded as a type of Unit16 according to a precision and then is stored. During decoding, a read numerical value of Unit16 needs to be multiplied by the precision to obtain a floating-point number. The precision is, for example, 0.00002f.

14. Color Change Information Type

| Field | Field Type | Remarks |
| --- | --- | --- |
| position | Uint16 | Start point position |
| midpoint | Uint16 | Middle point position |
| color | Color | Color value |

The color change information type (ColorStop) is used for describing color gradient information.

15. Color Gradient Change Information Type

| Field | Field Type | Remarks |
| --- | --- | --- |
| alphaCount | EncodedUint32 | Transparency gradient information array length |
| colorCount | EncodedUint32 | Color gradient information array length |

-continued

| Field | Field Type | Remarks |
| --- | --- | --- |
| alphaStopList | AlphaStop[alphaCount] | alphaCount counts of consecutive AlphaStops |
| colorStopList | ColorStop[colorCount] | colorCount counts of consecutive ColorStops |

The color gradient change information type (GradientColor) is a combination of the transparency change information type and the color change information type, to obtain a data type that represents color gradient change information. An alphaStopList (a transparency change information list) includes a plurality of pieces of transparency change information, and one of which includes: a start point position, a middle point position, and a transparency value. A colorStopList (a color change information list) includes a plurality of pieces of color change information, and one of which includes: a start point position, a middle point position, and a color value.

When data of the color gradient change information type is encoded, first the alphaCount and the colorCount are encoded sequentially by using the variable-length encoding integer type EncodedUint32; and then each piece of transparency change information in the transparency change information list is sequentially encoded according to the number of bits occupied by the transparency change information type, and each color piece of change information in the color change information list is sequentially encoded according to the number of bits occupied by the color change information type.

16. Text Type

| Field | Field Type | Remarks |
| --- | --- | --- |
| applyFillFlag | UBit[1] | Flag of whether to apply fill |
| applyStrokeFlag | UBit[1] | Flag of whether to apply stroke |
| boxTextFlag | UBit[1] | Flag of whether to add a text box |
| fauxBoldFlag | UBit[1] | Flag of whether to apply faux-bold |
| fauxItalicFlag | UBit[1] | Flag of whether to apply faux-italic |
| strokeOverFillFlag | UBit[1] | Flag of whether to apply stroke over fill |
| baselineShiftFlag | UBit[1] | Flag of whether to apply baseline shift |
| firstBaseLineFlag | UBit[1] | Flag of whether to apply a baseline to the first line of text |
| boxTextPosFlag | UBit[1] | Flag of whether text box position information exists |
| boxTextSizeFlag | UBit[1] | Flag of whether box size information exists |
| fillColorFlag | UBit[1] | Flag of whether fill color information exists |
| fontSizeFlag | UBit[1] | Flag of whether font information exists |
| strokeColorFlag | UBit[1] | Flag of whether stroke color information exists |
| strokeWidthFlag | UBit[1] | Flag of whether stroke width information exists |
| textFlag | UBit[1] | Flag of whether text information exists |
| justificationFlag | UBit[1] | Flag of whether alignment manner information exists |
| leadingFlag | UBit[1] | Flag of whether a line spacing exists |
| trackingFlag | UBit[1] | Flag of whether letter spacing exists |
| hasFontDataFlag | UBit[1] | Flag of whether font information exists |
|  | UBit[5] | All 0, byte aligned |
| baselineShift | float | if baselineShiftFlag == 1 |
| firstBaseLine | float | if firstBaseLineFlag == 1 |
| boxTextPosFlag | Point | if boxTextPosFlag == 1 |
| boxTextSizeFlag | Point | if boxTextSizeFlag == 1 |
| fillColor | Color | if fillColorFlag == 1 |
| fontSize | float | if fontSizeFlag == 1 |
| strokeColor | Color | if strokeColorFlag == 1 |
| strokeWidth | float | if strokeWidthFlag == 1 |
| text | String | if textFlag == 1 |
| justificationFlag | Uint8 | if justificationFlag == 1 |
| leadingFlag | float | if leadingFlag == 1 |
| trackingFlag | float | if trackingFlag == 1 |
| fontID | EncodedUint32 | if hasFontDataFlag == 1 |

The text type (Text) is used for describing text information, including text, font, size, color, and the like. Since the text information in different layers is indeterminate in terms of type and/or quantity, flags are used for identifying whether this data exists during encoding, and each of the flag bits is represented by the bit type occupying one bit, which can save storage space. As can be seen from the above table, the text type includes a total of 19 flag bits, occupying three bytes. During encoding, the last byte of the three bytes is filled with 0. When data of the text type is encoded, if a value of a certain flag bit is 0, it indicates that no text information corresponding to the flag bit exists, and then text information corresponding to a next flag bit with a value of 1 is directly encoded. Accordingly, during decoding, read data of a next byte is the text information corresponding to the next flag bit with the value of 1.

17. Path Type

| Field | Field Type | Remarks |
|---|---|---|
| numVerbs | EncodedUint32 | Quantity of actions included in path information |
| verbList | UB[3][numVerbs] | Action list array with a length of numVerbs, each value in the array representing a certain action, and a data type of each action being UB[3] |
| numBits | UB[5] | Number of bits occupied by each value in the floatList |
| floatList | SB[numBits][floatNum] | Floating-point value array of coordinate points, the length of the array being floatNum, and each value in the array being stored in one SB[numBits] |

The path type (Path) is used for describing path information of drawing a shape, and the path information is determined by a set of actions. The PAG file typically include eight actions:

| Action | Data type | Action value | Coordinate value | Remarks |
|---|---|---|---|---|
| Close | UB[3] | 0 | None | Close the current path to the beginning of the path |
| Move | UB[3] | 1 | Point | Move a coordinate point to a specified position, the Point representing coordinates of a target point to be moved |
| Line | UB[3] | 2 | Point | Draw a straight line, the Point representing coordinates of a target point to which the straight line is drawn |
| HLine | UB[3] | 3 | Float | Draw a horizontal straight line, with X axis moving but Y axis remaining the last value, the Float data representing a target position to which the X axis moves |
| VLine | UB[3] | 4 | Float | Draw a vertical straight line, with Y axis moving but X axis remaining the last value, the Float data representing a target position to which the Y axis moves |
| Curve01 | UB[3] | 5 | Point, Point | Draw a cubic Bezier curve, the first control point being the same as the end point of the last action, and the two Points respectively representing the second control point and the end point |
| Curve10 | UB[3] | 6 | Point, Point | Draw a cubic Bezier curve, the two Points respectively representing the first and second control points, and the end point being the same as the second control point |
| Curve11 | UB[3] | 7 | Point, Point, Point | Draw a cubic Bezier curve, and the three Points sequentially representing the first control point, the second control point, and the end point |

When the path information is encoded, the numVerbs needs to be first determined according to a quantity of all actions in the path drawing information, and corresponding action values are determined according to all the actions. Also, floatNum counts of float type values that need to be encoded need to be determined according to coordinate data of each action. Before encoding, the floatNum counts of float type values need to be first multiplied by SPATIAL_PRECISION, to convert the floating-point number type into the integer type; and then a maximum value among the floatNum counts of float type values is calculated, so that the numBits is obtained according to the number of bits occupied by the maximum value. Since each value in the floatList occupies no more than 31 bits, that is, numBits≤31, the numBits needs to be encoded according to the UB[5] type, and then the value of each floating-point data is encoded according to the UB[numBits] type.

For example, for drawing a rectangle of (x:5, y:0, r:15, b:20), a data structure of the path type (Path) is described as follows: executing a Move action to a point (5, 0), and recording Action "1" and two Float values (5, 0); executing an HLine action to a point (15, 0), and recording Action "3" and a Float value (15); executing a VLine action to a point (15, 20), and recording Action "4" and a Float value (20); executing an HLine action to a point (5, 20), and recording Action "3" and a Float value (5); and executing a Close action to close the rectangle, to return to the start point (5, 0), and recording Action "0".

Figure 5:
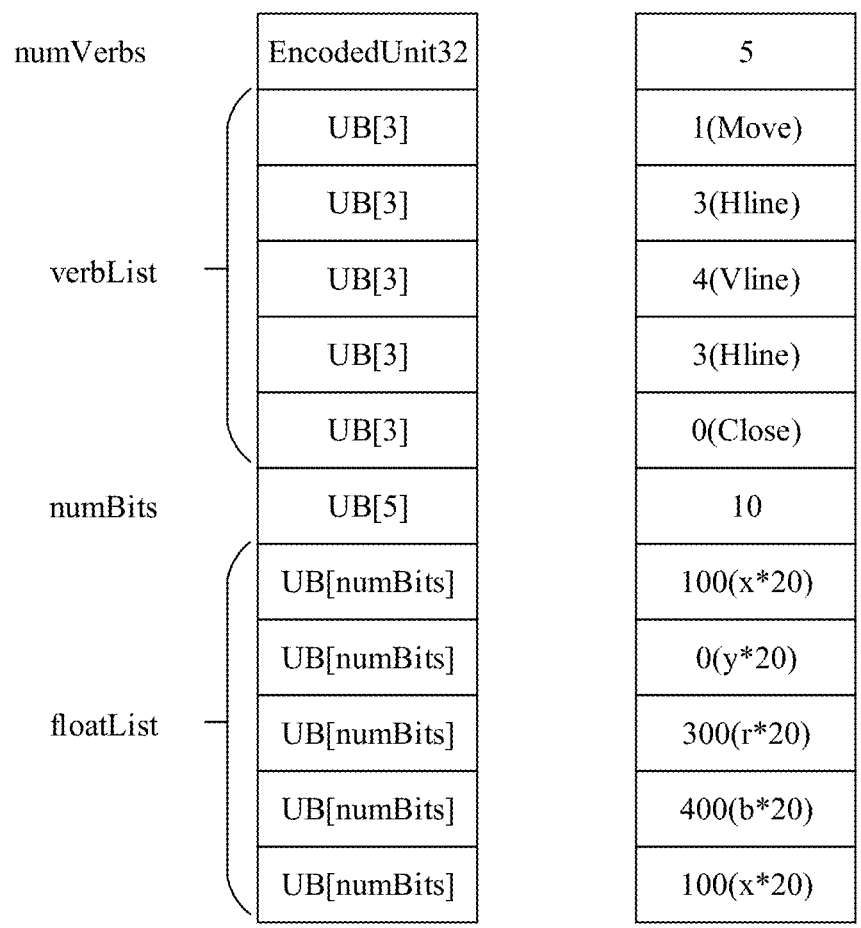
FIG. 5 is a schematic diagram of an encoding structure of path information according to an embodiment.

FIG. 5 is a schematic diagram of an encoding structure of path information according to the above example. When the above path information is encoded, the numVerbs, that is, first the number of actions "5", is encoded according to the EncodedUint32 type, and then the five actions "1, 3, 4, 3, 0" are sequentially encoded according to the UB[3] type. The above five actions include five float values, which are 5, 0, 15, 20, and 5 respectively. According to the precision parameter, the five floating-point numbers are converted into integer data, which are 100, 0, 300, 400, and 100 respectively. The largest value is 400, which needs to be represented by 10 bits, so numBits=10. After the numBits is encoded according to the UB[5] type, a header area of this group of consecutive floating-point data is obtained. Finally, 100, 0, 300, 400, and 100 are sequentially encoded according to the SB[10] type, to obtain encoded data of the entire path information.

18. Byte Stream Type

| Field | Data type | Remarks |
| --- | --- | --- |
| data | Byte address | Start address of a byte |
| length | Uint64 | Byte length |

The byte stream type (ByteData) is used for representing a start address of a byte stream and a length of the byte stream. When a byte stream is encoded, a start address of bytes in the byte stream is first encoded, and then a length of the entire byte stream is encoded. In this way, data is read from the start address in the memory according to the length of the byte stream during decoding, to obtain the entire byte stream. The byte address may also be an offset address. After a computer allocates a corresponding memory for the PAG file, the start address of the byte stream may be determined according to the start address of the allocated memory and the offset address.

19. Bitmap Information Type

| Field | Field type | Remarks |
| --- | --- | --- |
| x | Int32 | X coordinate of a start point of a difference pixel area |
| y | Int32 | Y coordinate of a start point of a difference pixel area |
| fileBytes | ByteData | Image data |

The bitmap information type (BitmapRect) is used for representing binary image data obtained by compressing and encoding a difference pixel area corresponding to each bitmap image in a bitmap image sequence in an image encoding manner. The x and y respectively represent the X coordinate and the Y coordinate of the start point of the difference pixel area. When bitmap information is encoded, the start position in the difference pixel area needs to be first found, and then the start position and the image data corresponding to the difference pixel area are sequentially encoded according to the byte stream type, to obtain encoded data of each bitmap image.

20. Video Frame Information Type

| Field | Field type | Remarks |
| --- | --- | --- |
| frame | Time | Frame serial number |
| fileBytes | ByteData | Video frame data |

The video frame information type (VideoFrame) is used for representing binary image data obtained by compressing a composition bitmap corresponding to each bitmap image in a bitmap image sequence in a video encoding manner. The frame represents a frame serial number of a current frame, and the frame serial number divided by a frame rate may be converted into a time by using a second as a unit. The Time type uses the Int64 for encoding. When video frame information is encoded, the frame serial number is first encoded according to the Int64 data type, and then video frame data corresponding to the video frame is encoded according to the byte stream type, to obtain encoded data of each video frame.

The following describes a file organization structure of the PAG file.

Figure 6:
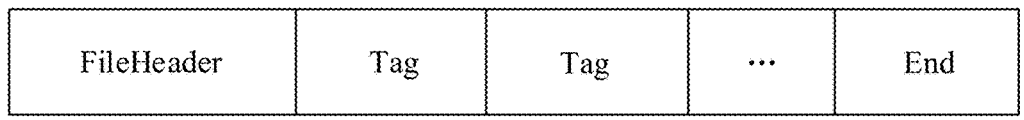
FIG. 6 is a schematic diagram of a file organization structure of a PAG file according to an embodiment.

As shown in FIG. 6, the file organization structure of the PAG file includes a file header (FileHeader) and a node element (Tag). The file header is a data structure at the beginning of the PAG file and used for describing file header information. The file header information includes at least a file version number, a file length, and a file compression manner. The file header information may be organized according to a file header organization structure in the following table:

| Field | Data type | Field meaning |
| --- | --- | --- |
| Signature | Unit8 | Signature byte, used for storing "P" |
| Signature | Unit8 | Signature byte, used for storing "A" |
| Signature | Unit8 | Signature byte, used for storing "G" |
| File version number | Unit32 | File version number, for example, 0X04 represents the "fourth" version |
| File length | Unit32 | Length of the entire file, including a length of the file header |
| File compression mode | Int8 | File compression manner |

Figure 7:
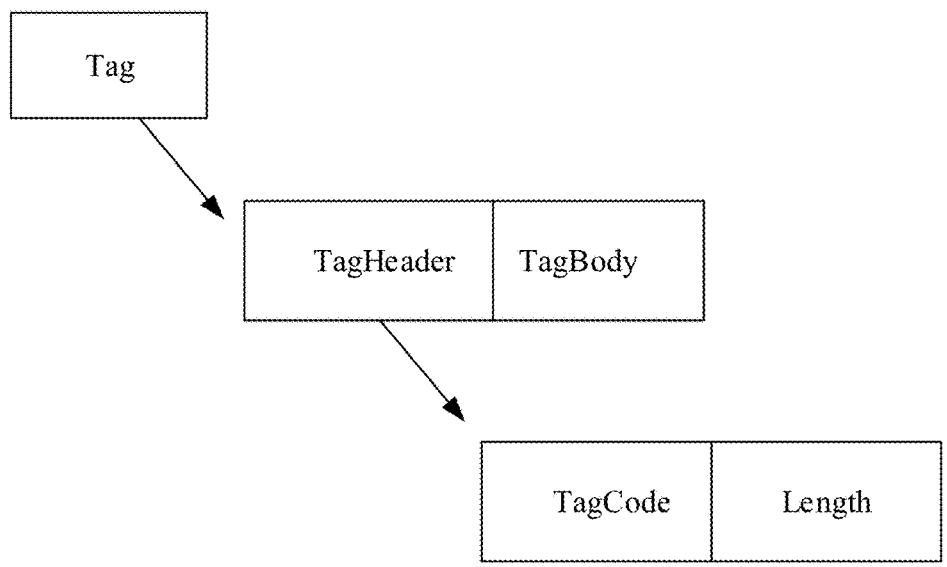
FIG. 7 is a schematic diagram of a node element organization structure of a node element according to an embodiment.

The node element has the same data structure. As shown in FIG. 7, the node element includes a node element header (TagHeader) and node element content (TagBody). In this way, a node element that cannot be parsed can be directly skipped during decoding. A node end tag (End) is a special node element, used for identifying that all the node elements at this level have been read, with no more node element to be read. The node element may also be a nested node element, and one node element may include one or more child node elements. Similarly, an End is used at the end for identifying that all the child node elements have been read, with no more child node element to be read.

Referring to FIG. 7, the node element header (TagHeader) is used for recording an animation tag code (TagCode) and a byte stream length (Length) of the node element content. The animation tag code may be used for indicating which type of animation information is specifically recorded by the node element. Different animation tag codes indicate that different animation information is recorded. The byte stream length may be used for indicating a length of the node element content in the node element.

The amount of data recorded in the TagBody may vary. For example, when some data occupies one byte, a value of the Length is 1; and when some data occupies 100 bytes, a value of the Length is 100. Therefore, in order to reduce the storage space occupied by the file, the TagHeader may be specifically classified into a short type structure and a long type structure for storage.

TagHeader Short Type

| Field | Type | Remarks |
| --- | --- | --- |
| TagCodeAndLength | Uint16 | First 10 bits are the TagCode, and last 6 bits are the length of the TagBody |

TagHeader Long Type

| Field | Type | Remarks |
| --- | --- | --- |
| TagCodeAndLength | Uint16 | First 10 bits are the TagCode, and last 6 bits are fixed to 0x3f for identifying that the TagHeader is of the long type structure |
| Length | Uint32 | Actual length of the TagBody |

The TagHeader of the short type structure records the animation tag code and the length of the node element content by using 16 bits. In the TagHeader of the short type structure, a maximum length of the node element content may be 62 (when the last six bits of the TagCodeAndLength are 111110), indicating that the TagBody may store a maximum 62 bytes of data. In the TagHeader of the long type structure, a data type of the length is the Uint32. Therefore, a maximum length of the node element content may be 4G, indicating that the TagBody can store a maximum 4G of data.

In other words, if the length of the TagBody is 62 bytes or less than 62 bytes, the data type of the TagHeader is the Uint16, with the first 10 bits being used for storing the animation tag code, and the last 6 bits being used for storing the Length. If the length of the TagBody is 63 bytes or more than 63 bytes, the TagHeader includes a TagCodeAndLength field of the Uint16 and a Length field of the Uint32. In the TagCodeAndLength of the Uint16, the first 10 bits are used for storing the animation tag code, and the last 6 bits are fixed as 0x3f. That is, if the last 6 bits are "111111", it indicates that the current TagHeader is stored in the long type structure. In this case, a 32-bit unsigned integer is used immediately after the TagCodeAndLength field for indicating the length of the TagBody. During decoding, the first 10 bits of the TagCodeAndLength field are first read, to obtain the animation tag code, and then the last 6 bits are read. If the value of the last 6 bits is not "111111", the read value of the 6 bits is the length of the TagBody. If the value of the last 6 bits is "111111", the value of the next 32 bits (four bytes) continues to be read, and the read data of the four bytes is the length of the TagBody.

In the above manner, if the TagBody includes more data and more bits that need to be occupied, the value of the Length may be recorded by using an unsigned 64-bit integer in the long-type TagHeader.

Further, the value of the Length read from the TagCodeAndLength field may be alternatively 0, indicating that the length of the TagBody is 0. In this case, no TagBody exists. For example, the node end tag (End) mentioned above is a special node element, and the value of the Length recorded in the TagHeader of this node element is 0.

Certainly, in the data structure of the node element header provided above, the data type of each field may be adjusted according to an actual situation. Each field occupies more or fewer bits according to the actual situation.

The PAG file provides a large number of animation tag codes for representing rich animation information. A data structure of animation information corresponding to each animation tag code is represented by an attribute structure table. When the PAG file is encoded, file header information is first encoded according to the file header organization structure; then the animation tag code (TagCode), the byte stream length (Length) of the node element content, and the node element content (TagBody) are sequentially encoded according to the data structure of the node element and based on the animation data.

The node element content (TagBody) is encoded according to the attribute structure table corresponding to the animation tag code. The attribute structure table defines the data structure of the animation information corresponding to the animation tag code.

If the types and quantity of the attributes included in the animation information represented by the animation tag code are fixed, the data types corresponding to the attributes in the attribute structure table corresponding to the animation tag code are the basic types. The animation data corresponding to the animation tag code may be directly encoded according to these basic types, to obtain the node element content. The data structure used for encoding the node element may be referred to as a basic data structure.

If the attributes included in the animation information recorded by the TagBody are indeterminate in terms of type and/or quantity, for example, path information of a mask is drawn. The drawn path information of different masks may include different action types and action quantities. In this case, a large number of additional flag fields are needed. Therefore, defining the data structure in the above manner will result in waste of a file space. In order to compress the file space as much as possible, it is necessary to redefine an attribute structure table for the animation information corresponding to this animation tag code, and provide a corresponding encoding rule to encode the node element content. The data structure represented by the newly defined attribute structure table may be referred to as a dynamic attribute data structure (AttributeBlock).

The following describes a specific method for encoding the animation data corresponding to each animation tag code according to the above basic data structure or dynamic attribute data structure, to obtain the node element content (TagBody).

Figure 8:
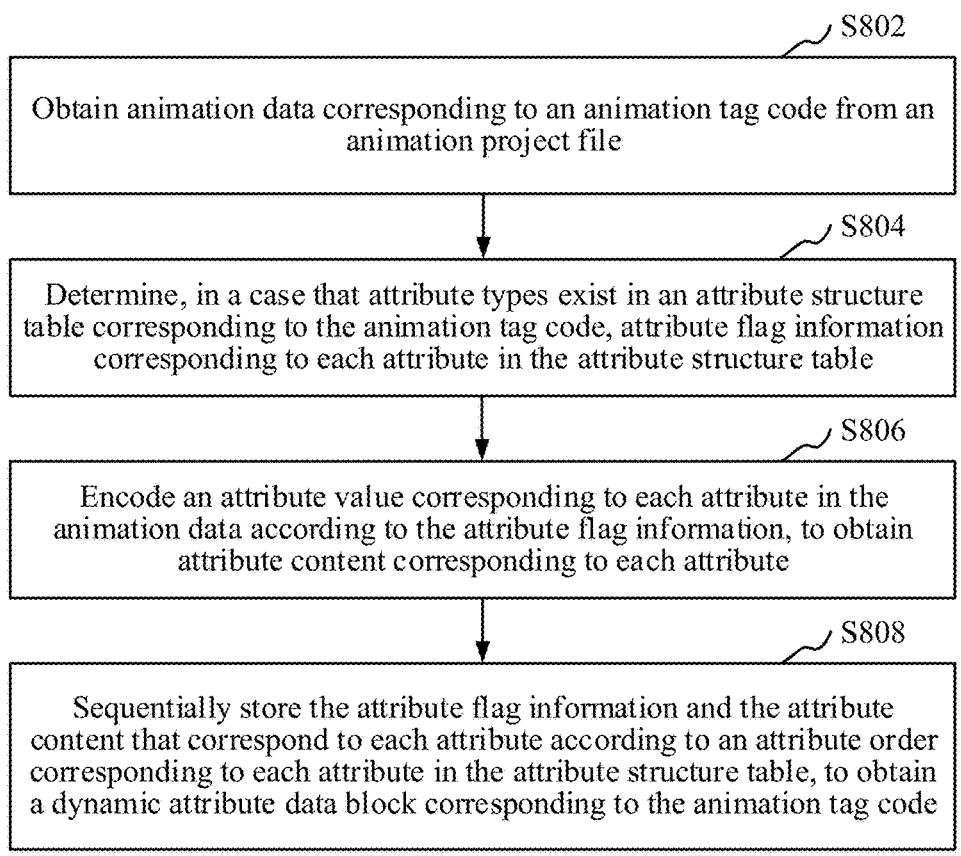
FIG. 8 is a schematic flowchart of an animation data encoding method according to an embodiment.

As shown in FIG. 8, in an embodiment, an animation data encoding method is provided. In this embodiment, descriptions are provided mainly by using an example in which the method is applicable to the terminal 110 in FIG. 1. Referring to FIG. 8, the animation data encoding method specifically includes the following steps:

In step S802, animation data corresponding to an animation tag code is obtained from an animation project file.

The animation project file may be, for example, the aforementioned AE project file with an .aep extension. The animation tag code is used for indicating which type of animation information node element content comes after a node element header corresponding to the animation tag code. A one-to-one correspondence between animation tag codes and corresponding animation information needs to be preset before being encoded, to correspondingly encode an animation tag code and corresponding animation information according to the preset one-to-one correspondence. The animation data is data that describes the animation information and corresponds to the animation tag code. For example, if the animation tag code is 14, indicating MaskBlock, it represents information about a certain mask in the animation project file. The mask information includes the following attributes: a mask identifier, whether the mask is inverted, a blending mode of the mask, and a vector path of the mask, a transparency of the mask, and an edge expansion parameter of the mask. The animation data corresponding to the animation tag code is attribute values corresponding to these attributes. In another example, if the animation tag code is 13, indicating Transform2D, it represents certain 2D transformation information in the animation project file. The 2D transformation information includes the following attributes: anchor point coordinates, position information, an X-axis offset, a Y-axis offset, scale information, rotation information, and transparency information.

The animation project file may be a file made by a designer by using the AE software. The animation project file stores all parameters used in an entire animation composition. The animation composition is a collection of layers. After obtaining the animation project file, the terminal may extract animation data from the animation project file, and match the animation data to each animation tag code according to predefined animation tag codes, to obtain the animation data corresponding to each animation tag code. For example, if a set of 2D transformation information is obtained, and the predefined animation tag code representing the 2D transformation information is "13", the animation data corresponding to the animation tag code "13" is the set of 2D transformation information. Certainly, the animation project file may include a plurality of sets of different 2D transformation information, and each set of 2D transformation information needs to be identified by using the animation tag code "13".

It can be seen from the node element header described above that the PAG file stores the animation tag code by using 10 bits, and thus may store a maximum of 1024 types of different animation tag codes. The animation data is encoded based on the animation tag code and a corresponding data block (including a basic data block or a dynamic attribute data block). Therefore, the PAG file can ensure backward compatibility with a previous old file format as its ability of supporting new animation characteristics develops. At present, the PAG file uses 37 types of animation tag codes, in which 0-29 are animation tag codes supported by a vector export manner, and 45-51 are seven animation tag codes extended for a bitmap sequence frame export manner and a video sequence frame export manner. If the PAG file may further support more animation characteristics in the future, new animation tag codes can be extended for representing animation information corresponding to the newly added animation characteristics.

The following table describes the animation information represented by each animation tag code:

| Name | Numerical value (Decimal) | Remarks |
| --- | --- | --- |
| End | 0 | Node element identifying "end" |
| FontTables | 1 | Font information |
| VectorCompositionBlock | 2 | Vector composition information |
| CompositionAttributes | 3 | Basic attribute information of a composition |
| ImageTables | 4 | Image collection information |
| LayerBlock | 5 | Layer information |
| LayerAttributes | 6 | Layer basic attribute information |
| SolidColor | 7 | Border color information |
| TextSource | 8 | Text attribute information, including basic information such as text, font, size, and color |
| TextPathOption | 9 | Text drawing information, including: drawing path, and top, bottom, left and right margins, and the like. |
| TextMoreOption | 10 | Text other information |
| ImageReference | 11 | Image reference, pointing to an image |
| CompositionReference | 12 | Byte element reference, pointing to a composition |
| Transform2D | 13 | 2D transformation information |
| MaskBlock | 14 | Mask information |
| ShapeGroup | 15 | Shape group information |
| Rectangle | 16 | Rectangle information |
| Ellipse | 17 | Ellipse information |
| PolyStar | 18 | Polygon star information |
| ShapePath | 19 | Shape path information |
| Fill | 20 | Fill rule information |
| Stroke | 21 | Stroke information |
| GradientFill | 22 | Gradient fill information |
| Gradientstroke | 23 | Gradient stroke information |
| MergePaths | 24 | Merge paths information |
| TrimPaths | 25 | Trim paths information |
| Repeater | 26 | Repeater |
| RoundCorners | 27 | Round corner information |
| Performance | 28 | Performance parameters of a PAG file |
| DropShadowStyle | 29 | Drop shadow information |
| BitmapCompositionBlock | 45 | Bitmap sequence frame composition information |
| BitmapSequence | 46 | Bitmap sequence information |
| ImageBytes | 47 | Image byte stream |
| ImageBytes2 | 48 | Image byte stream (with scale) |
| ImageBytes3 | 49 | Image byte stream (with transparency channel) |
| VideoCompositionBlock | 50 | Video sequence frame composition information |
| VideoSequence | 51 | Video sequence information |

An attribute structure table corresponding to each type of animation information will be listed later.

In step S804, in response to a determination that attribute types exist in an attribute structure table corresponding to the animation tag code, attribute flag information corresponding to each attribute in the attribute structure table is determined.

The attribute structure table defines a data structure of the animation information corresponding to the animation tag code. Node element content needs to be encoded according to the attribute structure table corresponding to the animation tag code. The attribute structure table corresponding to each animation tag code is predefined, which will be detailed in the following description. In order to clarify an encoding manner and a decoding rule, it is necessary to extend new animation tag codes as more animation characteristics that need to be supported, and define attribute structure tables corresponding to the newly added animation tag codes.

If attributes included in the animation information represented by the animation tag code are indeterminate in terms of type and/or quantity, an attribute type of each attribute exists in the defined attribute structure table corresponding to the animation tag code. The data structure presented by the attribute structure table may be referred to as the dynamic attribute data structure. For example, the attribute types exist in the attribute structure table corresponding to the animation tag code "14" indicating the mask information. Further, if an attribute value of a certain attribute in the attribute structure table is usually equal to a default value, one bit may be used for indicating that the attribute value of the attribute is equal to the default value instead of storing the attribute value of the attribute, thereby reducing the file size. Therefore, the attribute structure table also includes a default value of each attribute. The default value of each attribute and a corresponding attribute type may be hard-coded in a decoding code of the animation file. As such, in the parsing process, the default value is directly obtained in response to determining that the attribute value of the attribute is the default value according to a flag bit.

The attribute type (AttributeType) is necessary for encoding the animation data according to the dynamic attribute data structure and parsing the dynamic attribute data block (AttributeBlock). When attribute types exist in an attribute structure table corresponding to a certain animation tag code, it indicates that node element content after a node element header corresponding to the animation tag code needs to be encoded according to the dynamic attribute data structure. In the encoding stage, the attribute type is used for determining the number of bits occupied by the attribute flag information; and in the decoding stage, the attribute type is used for determining the number of bits occupied by the attribute flag information and a corresponding reading rule.

The dynamic attribute data block mainly includes two parts: an attribute flag area including attribute flag information (AttributeFlag) corresponding to each attribute, and an attribute content area including attribute content (AttributeContent) corresponding to each attribute. The attribute structure table of the mask information is taken as an example for description. Referring to FIG. 9, the left side of FIG. 9 shows the attribute structure table corresponding to the mask information, including six attributes; and the right side of FIG. 9 shows a specific structure of the dynamic attribute data block corresponding to the attribute structure table. It can be seen from FIG. 9 that each attribute has corresponding attribute flag information (no attribute flag information exists if the attribute type corresponding to the attribute is a fixed property) and attribute content. An arrangement order of each attribute flag information is in one-to-one correspondence with an arrangement order of each attribute content. According to a given attribute structure table, attribute flag information and attribute content that correspond to each attribute are determined, and then stored in the arrangement order. For example, AttributeFlag 0 and AttributeContent 0 herein correspond to the first ID attribute in the attribute structure table corresponding to the mask information. As can be seen from FIG. 9, in the data structure, the attribute content is stored after all the attribute flag information is stored. This is because each item in the attribute flag information area is usually represented by bits, and storing these items together can avoid frequent byte alignment from causing a waste of space. A unified byte alignment is performed after the reading of the attribute flag information area is finished. Since extra bits generated due to the byte alignment are filled with 0, the attribute content is continued to be stored from a full byte.

The quantity of attributes defined in the attribute structure table corresponding to each animation tag code remains unchanged. In order to compress the size of the animation file, the quantity of attributes included in the attribute structure table corresponding to each animation tag code is hard-coded in the parsing code instead of being written into the animation file. In this way, the quantity of attributes included in the animation information identified by the animation tag code may be directly obtained in the parsing process.

As mentioned above, if the attributes included in the animation information represented by the animation tag code are indeterminate in terms of type and/or quantity, the defined attribute structure table corresponding to the animation tag code includes the attribute types of the attributes. For example, the situation that the attributes are indeterminate in terms of type and/or quantity includes the following features:

1. A data type corresponding to an attribute is the Bool type, which needs to occupy one byte. However, a value of the attribute value may be actually represented by one bit, that is, 0 represents false and 1 represents true. Therefore, an attribute type may be additionally used for identifying that the attribute value of the attribute is a Bool value occupying one bit. During encoding, one bit needs to be occupied; and During decoding, the attribute value corresponding to the attribute may be parsed according to the attribute type.

2. An attribute value corresponding to an attribute is usually a default value. In this case, in order to compress the file size, an actual value may not be stored, rather one bit may be directly used for identifying that the attribute value corresponding to the attribute is equal to the default value during encoding, and then the default value is embedded into the parsing code.

3. An attribute value corresponding to an attribute may be an animation interval characteristic data, which does not include a spatial easing parameter, and in this case, data related to the spatial easing parameter may not be stored. An attribute value corresponding to an attribute may not include the animation interval characteristic data and is a fixed value, and in this case, one value needs to be stored. Further, if the value is equal to the default value, one bit may be used for identifying that the value is equal to the default value.

In accordance with the feature of each attribute in the above dynamic attribute data structure, each attribute may have different states, and full use of these states can significantly reduce the file size in most cases. Therefore, according to the features of the above attributes, a defined data structure of the attribute flag information is shown in the following table:

| Field | Type | Remarks |
| --- | --- | --- |
| exist | UB[1] | Content flag bit, identifying whether corresponding attribute content is a default value |
| animatable | UB[1] | Animation interval flag bit, identifying whether corresponding attribute content includes animation interval characteristic data. This field exists only when the exist field is 1. |
| hasSpatial | UB[1] | Spatial easing parameter flag bit. This field exists only when the exist and the animatable fields are both 1. |

The terminal may determine the attribute flag information corresponding to each attribute according to the attribute type of each attribute in the attribute structure table corresponding to the animation tag code and the animation data. During decoding, the attribute content corresponding to the attribute may be read from the attribute content area according to the attribute flag information. However, the number of bits occupied by the attribute flag information corresponding to each attribute is dynamic, ranging from 0 to 3 bits. The number of bits occupied by each attribute flag information needs to be determined according to the attribute type. That is, the attribute type may be used for determining the number of bits (0 to 3 bits) that the attribute flag information may occupy. In the PAG file, eight types of attribute types are included shown in the following table:

| Type | Attribute flag information | Remarks |
| --- | --- | --- |
| Value | Occupy 1 bit | Common property |
| FixedValue | Occupy no bit | Fixed property |
| BitFlag | Occupy 1 bit | Bool property |
| SimpleProperty | Occupy 1 to 2 bits | Simple animation property |
| DiscreteProperty | Occupy 1 to 2 bits | Discrete animation property |
| MultiDimensionProperty | Occupy 1 to 2 bits | Multi-dimensional time easing animation property |
| SpatialProperty | Occupy 1 to 3 bits | Spatial easing animation property |
| Custom | Occupy 1 bit | Extended attribute type. A reading rule for the attribute of the attribute type may be customized. |

As can be seen from the above table, attribute flag information of the common property occupies a maximum of one bit, and only a content flag bit needs to be read during decoding. Attribute flag information of the spatial easing animation property occupies a maximum of three bits. For example, when the spatial easing animation property does not include the animation interval characteristic data and an attribute value is equal to the default value, the attribute flag information needs to be represented by using one bit, namely including an attribute content flag bit, with a value of 0, for indicating that corresponding attribute content is the default value. If the read content flag bit is 0 during decoding, it indicates that the reading of the attribute flag information of the attribute is finished, with no need to read a value of a next bit. In an extreme case, each attribute in the attribute structure table does not include the animation interval characteristic data and the attribute value is equal to the default value, bits whose quantity is a quantity of the attributes are occupied to store the attribute flag information corresponding to all the attributes, each piece of attribute flag information including the content flag bit with a value of 0, and the entire attribute content area is empty, thereby significantly reducing the size of the animation file. In addition, attribute flag information of the fixed property is empty. The attribute flag information of the Bool property occupies one bit. The attribute flag information of the simple animation property, the discrete animation property, or the multi-dimensional time easing animation property occupies one bit or two bits.

It can be seen from the above description that the attribute flag information may be used for representing state information of each attribute in the attribute structure table corresponding to the animation tag code, and the attribute type may be used for determining the number of bits that the attribute flag information may occupy. During encoding, the attribute flag information corresponding to each attribute may be determined according to the attribute type corresponding to each attribute and the animation data. During decoding, the number of bits that the attribute flag information corresponding to each attribute may occupy may be first determined according to the attribute type of each attribute, and further, the attribute flag information corresponding to each attribute is obtained by parsing according to a rule of parsing the attribute flag information, to determine how to read the attribute content corresponding to each attribute.

The quantity, the data types, the attribute types, the attribute order, and the default values of the attributes in the attribute structure table corresponding to each animation tag code are all embedded in the parsing code, namely being hard-coded in the parsing code, with no need to be written into the animation file during encoding. This can reduce the size of the animation file. Alternatively, in other words, the attribute structure table corresponding to the animation tag code is hard-coded in the parsing code. For example, the terminal may parse the animation file by using the PAG software development kit (SDK) and then play the animation file after being rendered. The above-mentioned information related to the attribute structure table corresponding to each animation tag code may be hard-coded in the PAG SDK.

Specifically, when animation data corresponding to an animation tag code needs to be encoded, the terminal may first query an attribute structure table corresponding to the animation tag code. If attribute types exist in the attribute structure table, attribute flag information corresponding to each attribute needs to be determined, and then animation data corresponding to each attribute is encoded according to the attribute flag information and a dynamic attribute data structure presented by the attribute structure table, to obtain attribute content. The dynamic attribute data block constituted by each pair of the attribute flag information and the attribute content is used as node element content corresponding to the animation tag code. Further, the attribute flag information of each attribute in the dynamic attribute data structure presented by the attribute structure table may be determined according to a corresponding attribute type and the animation data itself.

In an embodiment, the above animation data encoding method further includes sequentially encoding, in response a determination that no attribute type exists in the attribute structure table corresponding to the animation tag code, an attribute value corresponding to each attribute in the animation data according to a data type and an attribute order that correspond to each attribute in the attribute structure table, to obtain a basic attribute data block corresponding to the animation tag code.

Specifically, if the attributes included in the animation information represented by the animation tag code are pre-determined in terms of type and/or quantity, no attribute type of each attribute exists in the defined attribute structure table corresponding to the animation tag code, and the data types of the attributes are the basic data types. A data structure presented by the attribute structure table is also referred to as a basic data structure. For example, neither attribute type nor default value corresponding to each attribute exists in an attribute structure table corresponding to an animation tag code "7" indicating size and color information of a border. During encoding, node element content after a node element header corresponding to the animation tag code needs to be encoded according to the basic data structure presented by the attribute structure table. The basic data structure herein is determined according to the data type and the attribute order that correspond to each attribute in the attribute structure table.

In step S806, an attribute value corresponding to each attribute in the animation data is encoded according to the attribute flag information, to obtain attribute content corresponding to each attribute.

As mentioned above, the attribute flag information is used for representing the state information of each attribute in the attribute structure table corresponding to the animation tag code. Therefore, after the attribute flag information corresponding to each attribute is determined, it can be determined whether the attribute content corresponding to each attribute exists, that is, whether the attribute content is the default value. If the attribute content is the default value, the corresponding attribute content is empty; and if the attribute content is not the default value, the attribute value corresponding to the attribute in the animation data needs to be encoded according to the attribute type and the data structure that correspond to the attribute, to obtain the attribute content corresponding to the attribute. Besides, it may be further determined, according to the attribute flag information, whether the attribute value corresponding to the attribute includes the animation interval characteristic data or whether the attribute value corresponding to the attribute includes the spatial easing parameter information. If the attribute value corresponding to the attribute includes the animation interval characteristic data or the attribute value corresponding to the attribute includes the spatial easing parameter information, the attribute value corresponding to the attribute may be encoded according to the data structure corresponding to the animation interval characteristic data, to obtain the corresponding attribute content.

In an embodiment, the attribute type corresponding to the attribute is a common property or the Bool property, and the attribute flag information corresponding to the attribute includes only a content flag bit. The determining attribute flag information corresponding to each attribute includes: encoding, in response to a determination that the attribute value corresponding to the attribute in the animation data is not a default value, the content flag bit into a value indicating that the attribute content corresponding to the attribute exists in the dynamic attribute data block; and encoding, in response to a determination that the attribute value corresponding to the attribute in the animation data is the default value, the content flag bit into a value indicating that no attribute content corresponding to the attribute exists in the dynamic attribute data block.

Specifically, if the attribute type corresponding to the attribute is the common property (Value), the attribute flag information corresponding to the attribute includes only the content flag bit. The content flag bit is used for identifying whether the attribute content corresponding to the attribute exists. If the attribute content corresponding to the attribute exists, that is, the attribute value corresponding to the attribute is not the default value, the content flag bit is encoded into a value, for example 1, indicating that the attribute content corresponding to the attribute exists in the dynamic attribute data block. If the attribute content corresponding to the attribute is the default value, the content flag bit is encoded into a value, for example 0, indicating that no attribute content corresponding to the attribute exists in the dynamic attribute data block. In other words, if the attribute type corresponding to the attribute is a common type, the attribute flag information corresponding to the attribute is either 1 or 0. In fact, the content flag bit is used for determining whether the attribute value corresponding to the attribute is the default value. Whether the flag bit is encoded to 1 or 0 is determined according to a set flag bit encoding rule. If the attribute value corresponding to the attribute is the default value, one flag bit (for example, when the content flag bit is 0) is directly used for indicating that the attribute value corresponding to the attribute is the default value, and there is no need to store an actual value in an attribute content area, thereby reducing the size of the animation file. If the attribute value corresponding to the attribute is not the default value, the attribute value corresponding to the attribute needs to be encoded in a content area corresponding to the attribute in the attribute content area, to obtain the attribute content corresponding to the attribute.

When the attribute value corresponding to the attribute is parsed in the decoding stage, first the attribute type corresponding to the attribute is determined as the common property according to the attribute structure table, indicating that the attribute flag information corresponding to the attribute in the dynamic attribute data block occupies one bit. If the attribute flag information corresponding to the attribute read from the dynamic attribute data block is 0, it indicates that the attribute value corresponding to the attribute is the default value. If the attribute flag information corresponding to the attribute read from the dynamic attribute data block is 1, the attribute content corresponding to the attribute is continued to be read from the dynamic attribute data block, to obtain the attribute value corresponding to the attribute.

If the attribute type corresponding to the attribute is a Bool type (BitFlag), the corresponding attribute value is true or false. As mentioned above, one bit may be used for representing the attribute value. During encoding, the content flag bit may be directly used for representing the corresponding attribute value. If the corresponding attribute value is true, the content flag bit corresponding to the attribute may be encoded into a value such as 1, representing true. If the corresponding attribute value is false, the content flag bit corresponding to the attribute may be encoded into a value such as 0, representing false. Correspondingly, when the attribute value corresponding to the attribute is parsed in the decoding stage, the attribute type corresponding to the attribute is first determined as the Bool attribute based on the attribute structure table, indicating that the attribute flag information corresponding to the attribute in the dynamic attribute data block occupies one bit, and a value of this bit is the attribute value corresponding to the attribute. That is, when the Bool property is parsed, a read value of the content flag bit may be directly used as the corresponding attribute value, with no need to parse the attribute content area in the dynamic attribute data block.

In an embodiment, the attribute type corresponding to the attribute is a fixed property, and the attribute flag information is empty. The encoding an attribute value corresponding to each attribute in the animation data according to the attribute flag information, to obtain attribute content corresponding to each attribute includes: directly encoding the attribute value corresponding to the attribute in the animation data according to a data type corresponding to the attribute, to obtain the attribute content corresponding to the attribute.

Specifically, if the attribute type of the attribute is the fixed property (FixedValue), it indicates that the attribute value corresponding to the attribute is fixed, and a state of the attribute does not need to be identified by using the attribute flag information. During encoding, the attribute value corresponding to the attribute needs to be encoded according to the data type corresponding to the attribute, to obtain the attribute content corresponding to the attribute. For example, in the attribute structure table representing the mask information, the first attribute represents a mask identifier (id), and an attribute type corresponding to this attribute is the fixed property, and it indicates that the mask identifier needs to be encoded according to a corresponding data type, to obtain corresponding attribute content.

In an embodiment, the attribute type corresponding to the attribute is a simple animation property, a discrete animation property, a multi-dimensional time easing animation property, or a spatial easing animation property. The attribute flag information includes at least a content flag bit. The determining attribute flag information corresponding to each attribute includes: encoding, in response to a determination that an attribute value corresponding to the attribute in the animation data is not a default value, the content flag bit into a value indicating that the attribute content corresponding to the attribute exists in the dynamic attribute data block; and encoding, in response to a determination that the attribute value corresponding to the attribute in the animation data is the default value, the content flag bit into a value indicating that no attribute content corresponding to the attribute exists in the dynamic attribute data block.

Specifically, if the attribute type corresponding to the attribute is the simple animation property (SimpleProperty), the discrete animation property (DiscreteProperty), the multi-dimensional time easing animation property (MultiDimensionProperty), or the spatial easing animation property (SpatialProperty), the attribute flag information corresponding to the attribute includes at least the content flag bit. Similarly, if the attribute value corresponding to the attribute in the animation data is the default value, the content flag bit needs to be encoded into a value such as 0, indicating that the attribute value is the default value, with no need to store an actual attribute value in the dynamic attribute data block; and correspondingly when this value is parsed in the decoding stage, it indicates that no attribute content corresponding to the attribute exists in the dynamic attribute data block, and the default value corresponding to the attribute needs to be used as the corresponding attribute content.

If the attribute value corresponding to the attribute in the animation data is not the default value, the actual attribute value needs to be stored in the dynamic attribute data block, and the content flag bit is encoded into a value such as 1, indicating that the attribute content corresponding to the attribute exists in the dynamic attribute data block. When the content flag bit is 1, the attribute flag information further includes at least an animation interval flag bit, that is, the attribute flag information occupies at least two bits. The animation interval flag bit is used for indicating whether the attribute value corresponding to the attribute includes the animation interval characteristic data. In the decoding stage, if the read value of the content flag bit indicates that the attribute content corresponding to the attribute exists in the dynamic attribute data block, a value of a next bit of the content flag bit is read as a value of the animation interval flag bit.

In an embodiment, the attribute flag information further includes an animation interval flag bit. In a case that the value of the content flag bit indicates that the attribute content corresponding to the attribute exists in the dynamic attribute data block, the method further includes: encoding, in response to a determination that the attribute value includes animation interval characteristic data, the animation interval flag bit into a value indicating that the attribute content that corresponds to the attribute and is stored in the dynamic attribute data block includes the animation interval characteristic data; and encoding, in response to a determination that the attribute value does not include the animation interval characteristic data, the animation interval flag bit into a value indicating that the attribute content that corresponds to the attribute and is stored in the dynamic attribute data block does not include the animation interval characteristic data.

The animation interval characteristic data is a basic unit of the animation data. Attributes of most animation data include the animation interval characteristic data. If the attribute value corresponding to the attribute includes the animation interval characteristic data, the animation interval characteristic data describes animation data corresponding to a plurality of animation intervals in the attribute. Each animation interval corresponds to a time axis. The animation characteristic data of each animation interval describes a change relationship of the attribute on a certain time axis, and actually also describes the change relationship of the attribute corresponding to each animation frame corresponding to the time axis. The relationship may be a linear relationship, a Bezier curve relationship, or a static relationship (that is, the attribute value corresponding to the attribute within a time axis remains unchanged).

In an embodiment, the encoding an attribute value corresponding to each attribute in the animation data according to the attribute flag information, to obtain attribute content corresponding to each attribute includes: directly encoding, in response to a determination that the value of the animation interval flag bit indicates that the attribute content that corresponds to each attribute and is stored in the dynamic attribute data block does not include the animation interval characteristic data, the attribute value corresponding to each attribute in the animation data according to the data type corresponding to each attribute, to obtain the attribute content corresponding to each attribute.

Specifically, a quantity of animation intervals in the attribute value corresponding to each attribute may be 0 or more. When the quantity is 0, it indicates that the attribute includes only one valid value and the attribute value corresponding to the attribute does not include the animation interval characteristic data, and the animation interval flag bit needs to be encoded into a value, for example 0, indicating that the attribute content that corresponds to the attribute and is stored in the dynamic attribute data block does not include the animation interval characteristic data. In this case, the attribute flag information corresponding to the attribute is determined to be "10". When the attribute value corresponding to the attribute is encoded, the attribute value is directly encoded according to the data type corresponding to the attribute, to obtain the attribute content corresponding to the attribute.

In an embodiment, the encoding an attribute value corresponding to each attribute in the animation data according to the attribute flag information, to obtain attribute content corresponding to each attribute includes: encoding, in response to a determination that the value of the animation interval flag bit indicates that the attribute content that corresponds to the attribute and is stored in the dynamic attribute data block includes the animation interval characteristic data, the animation interval characteristic data corresponding to the attribute according to a data storage structure corresponding to the animation interval characteristic data, to obtain the attribute content corresponding to the attribute.

Specifically, when there are one or more animation intervals in the attribute value corresponding to the attribute, the animation interval flag bit needs to be encoded into a value, for example 1, indicating that the attribute content that corresponds to the attribute and is stored in the dynamic attribute data block includes the animation interval characteristic data. In this case, characteristic data corresponding to each animation interval needs to be recorded according to the data structure of the animation interval, and the characteristic data of each animation interval is encoded according to a data storage structure (a property storage structure) of a plurality of pieces pf animation interval characteristic data, to obtain the attribute content corresponding to the attribute. The following table shows information to be recorded in an animation interval:

| Field | Type | Remarks |
|---|---|---|
| startValue | Any basic data type | Start value |
| endValue | Any basic data type | End value |
| startTime | Time (Int64) | Start time value of a key frame |
| endTime | Time (Int64) | End time value of a key frame |
| interpolationType | Enumeration (Unit8) | Interpolator type |
| bezierOut | Point[dimensionality] | Time easing parameter array (the first control point of a Bezier curve) |
| bezierIn | Point[dimensionality] | Time easing parameter array (the second control point of a Bezier curve) |
| spatialOut | Point | Spatial easing parameter (the first control point of a Bezier curve) |
| spatialIn | Point | Spatial easing parameter (the second control point of a Bezier curve) |

An animation interval includes a start time and an end time of each interval, further includes an attribute value corresponding to the start time and an attribute value corresponding to the end time, and further includes an interpolator type identifying an attribute value calculation method, a time easing parameter, or the like. An animation interval of an attribute of which an attribute type is the multi-dimensional time easing property may also include the multi-dimensional time easing parameter, and an animation interval of an attribute of which an attribute is the spatial easing animation property may also include the spatial easing parameter. The startValue and endValue represent a start value and an end value of the animation interval, and a corresponding startTime and endTime represent a start moment and an end moment of the animation interval. Therefore, when a value of a moment is equal to the startTime, a corresponding attribute value is the startValue. When a value of a moment is equal to the endTime, a corresponding attribute value is the endValue. When a value of a moment is between the startTime and the endTime, an attribute value is determined by the interpolator type. According to the characteristic of the animation characteristic data in the animation file, the defined interpolator types are shown in the following table:

| Interpolator type | Value | Remarks |
|---|---|---|
| None | 0 | Invalid |
| Linear | 1 | Linear interpolation |
| Bezier | 2 | Bezier curve interpolation according to a time easing parameter |
| Hold | 3 | Remain attribute value unchanged. That is, except for the endTime moment in the animation interval, attribute values corresponding to other moments are equal to startValue, and the attribute value corresponding to the endTime is endValue |

It can be seen from a data structure of the animation interval that when a value of the interpolator type is not equal to 2 (Bezier), there may be no need to store the time easing parameter bezierOut and bezierIn of the animation interval. If the attribute type is the discrete easing animation property, the value representing the interpolator type is definitely 3 (Hold) or 3 by default, and there is no need to store the value of the interpolator type. This situation generally occurs when the basic data type of the attribute is the Bool type or the enumeration type, whose data is discrete, either true or false, thus it is impossible to interpolate an intermediate value between true and false. If the attribute type is the multi-dimensional time easing animation property, it indicates that the time easing parameter is formed by Bezier curves, and each Bezier curve independently controls the easing of a component of the data value. The dimensionality indicates the dimensionality of the time easing parameter array of each animation interval. A specific quantity of Bezier curves is determined according to the data type of the startValue and the endValue. For example, when the data type is Point, the time easing parameter is a two-dimensional array, that is, the dimensionality is 2, and two Bezier curves respectively control independent easing of the x-axis and y-axis. That is, in the Point data type, the value of the x-axis coordinate is controlled by the two Bezier curves, and the value of the y-axis coordinate is also controlled by the two Bezier curves. For most cases that the attribute type is not the multi-dimensional time easing animation property, there is no need to determine the dimensionality based on the basic data types, and only one-dimensional time easing parameter is stored by default, that is, the dimensionality is 1. If the attribute type is the spatial easing animation property, it indicates that there may exist the spatial easing parameter may exist in the animation interval; and in this case, whether such parameter exists in the current animation interval is specifically determined according to the spatial easing parameter flag bit.

If the animation interval flag bit corresponding to the attribute is 1, the attribute flag information further includes at least a spatial easing parameter flag bit, that is, the attribute flag information occupies three bits. The spatial easing parameter flag bit is used for indicating whether the attribute value corresponding to the attribute includes the spatial easing parameter. In the decoding stage, if the read value of the animation interval flag bit indicates that the attribute content that corresponds to the attribute and is stored in the dynamic attribute data block includes the animation interval characteristic data, a value of a next bit of the animation interval flag bit is continued to be read as a value of the spatial easing parameter flag bit.

In an embodiment, the attribute type corresponding to the attribute is a spatial easing animation property, and the attribute flag information further includes a spatial easing parameter flag bit. In a case that the value of the animation interval flag bit indicates that the attribute content that corresponds to the attribute and is stored in the dynamic attribute data block includes the animation interval characteristic data, the method further includes: encoding, in response to a determination that the animation interval characteristic data includes the spatial easing parameter, the spatial easing parameter flag bit into a value indicating that the attribute content that corresponds to the attribute and is stored in the dynamic attribute data block includes the spatial easing parameter; and encoding, in response to a determination that the animation interval characteristic data does not include the spatial easing parameter, the spatial easing parameter flag bit into a value indicating that the attribute content that corresponds to the attribute and is stored in the dynamic attribute data block does not include the spatial easing parameter.

The spatial ease parameter is a parameter used for describing a complex animation effect. The attribute flag information corresponding to the attribute may occupy three bits when the attribute type corresponding to the attribute is the spatial easing animation property. In addition, the premise of the existence of the spatial easing parameter flag bit is that both the content flag bit and the animation interval flag bit are 1. For other attribute types, there is no need to determine whether the third flag bit exists, nor to store the spatial easing parameter.

In an embodiment, the encoding an attribute value corresponding to each attribute in the animation data according to the attribute flag information, to obtain attribute content corresponding to each attribute includes: encoding, in response to a determination that the value of the spatial easing parameter flag bit indicates the attribute content that corresponds to the attribute and is stored in the dynamic attribute data block includes the spatial easing parameter, the animation interval characteristic data corresponding to the attribute according to the data storage structure corresponding to the animation interval characteristic data, to obtain the attribute content that corresponds to the attribute and includes the spatial easing parameter.

Specifically, if the animation interval characteristic data includes the spatial easing parameter, the spatial easing parameter flag bit is encoded into a value, for example 1, indicating that the attribute content that corresponds to the attribute and is stored in the dynamic attribute data block includes the spatial easing parameter. In this case, the attribute flag information corresponding to the attribute is determined to be "111". When the attribute value corresponding to the attribute is encoded, the animation interval characteristic data corresponding to the attribute needs to be encoded according to the data storage structure corresponding to the animation interval characteristic data, to obtain the attribute content corresponding to the attribute.

In an embodiment, the encoding an attribute value corresponding to each attribute in the animation data according to the attribute flag information, to obtain attribute content corresponding to each attribute includes: encoding, in response to a determination that the value of the spatial easing parameter flag bit indicates that the attribute content that corresponds to the attribute and is stored in the dynamic attribute data block does not include the spatial easing parameter, the animation interval characteristic data corresponding to the attribute according to the data storage structure corresponding to the animation interval characteristic data, to obtain the attribute content that corresponds to the attribute and does not include the spatial easing parameter.

Specifically, if the animation interval characteristic data does not include the spatial easing parameter, the spatial easing parameter flag bit is encoded into a value, for example 0, indicating that the attribute content that corresponds to the attribute and is stored in the dynamic attribute data block does not include the spatial easing parameter. In this case, the attribute flag information corresponding to the attribute is determined to be "110". When the attribute value corresponding to the attribute is encoded, the animation interval characteristic data corresponding to the attribute needs to be encoded according to the data storage structure corresponding to the animation interval characteristic data, and the obtained the attribute content does not include the spatial easing parameter.

In an embodiment, fields in the data storage structure corresponding to the animation interval characteristic data include a quantity of animation intervals, the interpolator type of each animation interval, a start time and an end time of each animation interval, and further include a start value, an end value, a time easing parameter, and a spatial easing parameter of the attribute corresponding to each animation interval.

The data storage structure corresponding to the animation interval characteristic data is shown in the following table:

trally, thereby reducing the storage space. For example, the value of the interpolator type occupies two bits in general, thus centralized storage can reduce unnecessary space waste caused by the byte alignment. In another example, the startValue and startTime of the next animation interval are equal to the endValue and endTime of the previous animation interval, thus centralized storage makes it possible to skip repeated data between the animation intervals that do not need to be stored, thereby further compressing the storage space.

When data stored according to the data storage structure corresponding to the animation characteristic data is decoded, the byte-alignment is performed once after the reading of a data value of each field is finished, to skip the remaining bits that have not been read, and a data value corresponding to a next field is started to read from the beginning of a next full byte.

| Field | Data type | Remarks |
| --- | --- | --- |
| numFrames | EncodedUint32 | Quantity of animation intervals |
| interpolationTypeList | UB[2][numFrames] | Interpolator type corresponding to each animation interval. A total of numFrames times of reading are needed. The value of each interpolator type is 0, 1, 2, or 3, so the data type is a two-dimensional array with a length of numFrames and each element being UB[2]. In addition, if the attribute type is the discrete easing animation property, there is no need to encode the value of this field. |
| timeList | EncodedUint64[numFrames + 1] | Start time and end time of each animation interval. A start time of a next animation interval is equal to an end time of a p revious animation interval, so numFrames + 1 counts of values are stored during encoding, and numFrames + 1 times of reading are needed during decoding. |
| valueList | PropertyValueList | Start value and end value of each animation interval. If the basic data type of each value is different, this field is stored differently. |
| timeEaseNumBits | UB[5] | Number of bits occupied by each time easing parameter component |
| timeEaseList | TimeEaseValueList | Time easing parameter array |
| spatialFlagList | UB[numFrames * 2] | Flag array, identifying whether each subsequent animation interval respectively includes the spatial easing parameter |
| spatialEaseNumBits | UB[5] | Number of bits occupied by each spatial easing parameter component |
| spatialEaseList | SpatialEaseValueList | Spatial easing parameter array |

From the data storage structure (or referred to as the Property storage structure) of the animation interval characteristic data given in the above table, it can be seen that animation characteristic data of a plurality of animation intervals is stored in a way that one type of data of each animation interval is stored sequentially and then another type of data of the each animation interval is stored centrally, instead of storing all the data of one animation interval first and then storing all the data of a next animation interval. In this way, similar data can be stored and compressed cen- As mentioned in the above table, the start value and end value (PropertyValue) of the animation interval in the animation interval characteristic data may have different data types. Different data types correspond to different storage manners. In the PAG file, the start value and the end value of the animation interval have a total of 15 types. The encoding manner of each type is shown in the following table:

| Field | type of data | Remarks |
| --- | --- | --- |
| Value<Float> | Float | Single-precision (32-bit) IEEE Standard 754 |
| Value<Bool> | Bool | 1-bit value |
| Value<Uint8> | Uint8 | 8-bit value |
| Value<Uint32> | EncodedUint32 | Variable-length encoded 32-bit unsigned integer |
| Value<Time> | EncodedUint64 | Variable-length encoded 64-bit unsigned integer |
| Value<Point> | Point | Point data structure, which may refer to the basic data types given earlier |
| Value<Color> | Color | Color data structure, which may refer to the basic data types given earlier |
| Value<Ratio> | Ratio | Ratio data structure, which may refer to the basic data types given earlier |
| Value<String> | String | String data structure, which may refer to the basic data types given earlier |
| Value<Path> | Path | Path data structure, which may refer to the basic data types given earlier |
| Value<TextDocument> | TextDocument | TextDocument data structure, which may refer to the basic data types given earlier |
| Value<GradientColor> | GradientColor | GradientColor data structure, which may refer to the basic data types given earlier |
| Value<Layer> | EncodedUint32 | LayerID, through which Layer attributes are obtained |
| Value<Mask> | EncodedUint32 | MaskID, through which Mask attributes are obtained |
| Value<Composition> | Composition | CompositionID, through which Composition attributes are obtained |

As can be seen from the above table, the data type of the start value and end value of the animation interval may be any of the above 15 types. In the storage structure corresponding to the animation interval characteristic data given above, the valueList stores the start values and end values of a plurality of animation intervals, and its data type is the PropertyValueList. The PropertyValueList is substantially to store each value in the PropertyValue type. For example: the storage structure of the Value<Float>[ ] is consecutive Values<Float>, and the data type of the Value<Float> is the Float type, so the Value<Float>[ ] is substantially a set of consecutive Float values, or is converted to other types for storage. For example, the data type of the Value<Uint8>[ ] is to store the values in the consecutive unsigned integer encoding manner (UB[nBits][ ]). The storage manner of the PropertyValueList is shown in the following table:

| Field | type of data | Remarks |
| --- | --- | --- |
| Value<Float>[ ] | Float[ ] | Single-precision (32-bit) IEEE Standard 754 |
| Value<Bool>[ ] | Bool[ ] | 8-bit value |
| Value<Uint8>[ ] | UB[nBits][ ] | Consecutive unsigned integer encoding |
| Value<Uint32>[ ] | UB[nBits][ ] | Consecutive unsigned integer encoding |
| Value<Time>[ ] | EncodedUint64[ ] | Consecutive variable-length encoded 64-bit unsigned integer |
| Value<Point>[ ] | Point[ ] | If the attributeType is the SpatialProperty, coordinates of each Point are converted into consecutive floating-point numbers for encoding with a precision of 0.05f, otherwise they are consecutive Point values |
| Value<Color>[ ] | Color[ ] | Consecutive Color values |
| Value<Ratio>[ ] | Ratio[ ] | Consecutive Ratio values |
| Value<String>[ ] | String[ ] | Consecutive String values |
| Value<Path>[ ] | Path[ ] | Consecutive Path values |
| Value<TextDocument>[ ] | TextDocument[ ] | Consecutive TextDocument values |
| Value<GradientColor>[ ] | GradientColor[ ] | Consecutive GradientColor values |
| Value<Layer>[ ] | EncodedUint32[ ] | LayerID List |
| Value<Mask>[ ] | EncodedUint32[ ] | MaskID List |
| Value<Composition>[ ] | EncodedUint32[ ] | CompositionID List |

In the storage structure corresponding to the animation interval characteristic data given above, the timeEaseList stores the time easing parameters of the plurality of animation intervals, and its data type is the TimeEaseValueList. The data structure of the TimeEaseValueList is shown in the following table:

| Field | type of data | Remarks |
| --- | --- | --- |
| timeEasenumBits | UB[5] | Number of bits occupied by each value in the floatList |

| Field | type of data | Remarks |
| --- | --- | --- |
| floatList | SB[numBits][numFrames * dimensionality * 4] | Floating-point value array of coordinate points, with a length of NumFrames*dimensionality*4. Each value in the array is stored by one SB[numBits], with a precision of 0.05f |

Since the time easing parameter of each animation interval is a pair of control points, and the data type of each control point is the Point type, the encoding manner of the time easing parameters of the plurality of animation intervals may be shown in FIG. 10. Referring to FIG. 10, in the storage manner of the TimeEaseValueList, the number of bits timeEaseNumBits occupied by each element in the time easing parameter array is first stored; and then the time easing parameter of each animation interval is sequentially encoded. The dimensionality represents the dimensions of the bezierIn and bezierOut arrays of each animation interval. When a value of the dimensionality is equal to 1, the time easing parameter of each animation interval is a pair of bezierOut(x, y) and bezierIn(x, y), that is, two Point values (4 Float values), and each Float value is encoded in the SB[timeEaseNumBits] type. When a value of dimensionality is equal to 2, the time easing parameter of each animation interval includes two pairs of the bezierOut and bezierIn values, a total of 8 Float values. The entire TimeEaseValueList needs to store numFrames*dimensionality*4 values excluding the value of the timeEasenumBits.

During decoding, if the interpolator type of a key frame is not the Bezier, the reading of data related to the TimeEase is skipped directly. The coordinates of the bezierOut and bezierIn are stored consecutively in pairs, with first the coordinates of the bezierOut being encoded and then the coordinates of the bezierIn being encoded.

When the value of the timeEaseList is decoded, five bits are first read, to obtain the timeEaseNumBits; then the values read every timeEaseNumBits counts of bits are the coordinates of the bezierOut and bezierIn of each animation interval, and such reading is conducted numFrames*dimensionality*4 times, to obtain the time easing parameter array corresponding to the attribute.

Similarly, in the storage structure corresponding to the animation interval characteristic data given above, the spatialEaseList stores the spatial easing parameters of the plurality of animation intervals, and its data type is the SpatialEaseValueList. The data structure of the SpatialEaseValueList is shown in the following table:

bits are first used to indicate whether each animation interval includes the spatial easing parameter. Then, the number of bits spatialEaseNumBits occupied by each element in the encoding spatial easing parameter array is encoded. Then, the spatial easing parameter of each animation interval is sequentially encoded. In the decoding stage, the reading of the spatial easing parameters needs to depend on the spatialFlagList and the spatialEaseNumBits. The length of the spatialFlagList is twice the quantity of the animation intervals, because the spatial ease parameter of each animation interval includes two Point values. The values in the spatialFlagList list sequentially indicate whether the spatialIn and spatialOut of each animation interval exist, and if the spatialIn and spatialOut of each animation interval do not exist, the coordinate values of the spatialIn and spatialOut both use the default values (0, 0). In addition, the read data is of the integer data type, thus needs to be multiplied by SPATIAL_PRECISION to be converted to Float as the x and y values of the Point.

The spatialInFlag and spatialOutFlag are stored consecutively in pairs, with the spatialInFlag being first stored and then the spatialOutFlag being stored. The value of the floatNum, that is, the length of the spatial easing parameter array, depends on the spatialInFlag and spatialOutFlag. If the spatialInFlag is 1, coordinates (x, y) of the spatialInPoint are continued to be read; and if the spatialInFlag is 0, the coordinates (x, y) of the coordinate Point are the default values, and there is no need to read the coordinates. The SpatialIn and the spatialOut are stored in order, with the spatialIn coordinates being first stored and then the spatialOut coordinates being stored.

When the value of the spatialEaseList is decoded, numFrames*2 counts of bits are first read, to obtain the value of the spatialFlagList. Then, 5 bits are read, to obtain the value of the spatialEaseNumBits. Next, data is read every spatialEaseNumBits counts of bits according to the value of the spatialFlagList, to obtain the spatial easing parameters of animation intervals in which the spatial easing parameters exist.

| Field | Data type | Remarks |
| --- | --- | --- |
| spatialFlagList | UB[numFrames * 2] | Consecutive numFrames * 2 counts of bits for identifying whether coordinates of spatialIn and spatialOut are included |
| SpatialEaseNumBits | UB[5] | Number of bits occupied by each value in the floatList |
| floatList | SB[spatialEaseNumBits][floatNum] | Floating-point value array of coordinate points, with a length of floatNum. Each value in the array is stored by one SB[numBits], with a precision of 0.05f |

Since the spatial easing parameter of each animation interval is a pair of control points, and the data type of each control point is the Point type, the encoding manner of the spatial easing parameters of the plurality of animation intervals may be shown in FIG. 11. Referring to FIG. 11, in the storage manner of the SpatialEaseValueList, consecutive In step S808, the attribute flag information and the attribute content that correspond to each attribute are sequentially stored according to an attribute order corresponding to each attribute in the attribute structure table, to obtain a dynamic attribute data block corresponding to the animation tag code.

Based on previous analysis, the following may be concluded:

The attribute type is the common property. When the attribute flag information corresponding to the attribute is "1", the corresponding attribute value is directly encoded according to the data type corresponding to the attribute, to obtain the attribute content. When the attribute flag information corresponding to the attribute is "0", the corresponding attribute value is the default value, with no need to encode the corresponding attribute value, and no corresponding attribute content exists in the dynamic attribute data block.

The attribute type is the Bool property. When the attribute flag information corresponding to the attribute is "1", it indicates that the attribute value corresponding to the attribute is "true", with no need to encode the corresponding attribute value, and no corresponding attribute content exists in the dynamic attribute data block. Similarly, when the attribute flag information corresponding to the attribute is "0", it indicates that the attribute value corresponding to the attribute is "false".

The attribute type is the fixed property. No corresponding attribute flag information exists, and the corresponding attribute value is directly encoded according to the corresponding data type, to obtain the attribute content.

The attribute type is the simple animation property, the discrete animation property, or the multi-dimensional time easing animation property. When the attribute flag information corresponding to the attribute is "0", the corresponding attribute value is the default value, with no need to encode the corresponding attribute value. In this case, no corresponding attribute content exists in the attribute data block. When the attribute flag information corresponding to the attribute is "10", the corresponding attribute value is not the default value and does not include the animation interval characteristic data. In this case, the corresponding attribute value needs to be normally encoded according to the data type corresponding to the attribute, to obtain the attribute content. When the attribute flag information corresponding to the attribute is "11", the corresponding attribute value is not the default value and includes the animation interval characteristic data. In this case, the corresponding attribute value needs to be encoded according to the data storage structure of the animation interval characteristic data, to obtain the attribute content.

The attribute type is the spatial easing animation property. When the attribute flag information corresponding to the attribute is "0", the corresponding attribute value is the default value, with no need to encode the corresponding attribute value. In this case, no corresponding attribute content exists in the dynamic attribute data block. When the attribute flag information corresponding to the attribute is "10", the corresponding attribute value is not the default value and does not include the animation interval characteristic data. In this case, the corresponding attribute value needs to be normally encoded according to the data type corresponding to the attribute, to obtain the attribute content. When the attribute flag information corresponding to the attribute is "110", the corresponding attribute value is not the default value, and includes the animation interval characteristic data but does not include the spatial easing parameter. In this case, the corresponding attribute value needs to be encoded according to the data storage structure of the animation interval characteristic data, to obtain the attribute content that does not include the spatial easing parameter. When the attribute flag information corresponding to the attribute is "111", the corresponding attribute value is not the default value and includes the animation interval characteristic data and the spatial easing parameter, and the corresponding attribute value needs to be encoded according to the data storage structure of the animation interval characteristic data, to obtain the attribute content that includes the spatial easing parameter.

The attribute structure table corresponding to the animation tag code includes a plurality of attributes. An attribute value corresponding to each attribute in the animation data may be encoded, that is, is encoded according to attribute flag information and an attribute type of each attribute, to obtain corresponding attribute content. Finally, the attribute flag information of each attribute is stored together according to an attribute order, to obtain an attribute flag area; and the attribute content of each attribute is stored together according to the attribute order, to obtain an attribute content area. The attribute flag area and the attribute content area that correspond to the animation tag code constitute a dynamic attribute data block corresponding to the animation tag code. Substantially, the dynamic attribute data block is a value of node element content (TagBody) of a node element (Tag) in which the animation tag code (TagCode) is located.

In the foregoing animation data encoding method, an animation tag code may be used for identifying a group of attributes. An attribute structure table is used for describing a data structure of the group of attributes identified by the animation tag code. If attribute values of this group of attributes are indeterminate in terms of type and/or quantity, or if redundancy exists in the attribute values of the attributes, in order to avoid the problem that additional introduction of a large number of flag fields used for describing the types or quantity of the attributes will cause the excessive large size of the animation file, a data structure of a dynamic attribute data block is introduced, which can maximize the compression of these flags, thereby reducing the size occupied by the target animation file. Specifically, after the animation project file is obtained, the attribute values of the group of attributes included in the attribute structure table corresponding to the animation tag code are obtained from the animation project file. The attribute flag information in the dynamic attribute data block is used for describing attribute states of the attributes. When attribute types exist in the attribute structure table, the attribute flag information corresponding to each attribute may be determined according to the animation data, and then the attribute value corresponding to each attribute is dynamically encoded according to the attribute flag information, to obtain corresponding attribute content. The attribute flag information and the attribute content of the attributes in the attribute structure table are combined to form a dynamic attribute data block corresponding to the animation tag code, which can significantly reduce the space occupied by the animation file.

In an embodiment, the animation tag code is a bitmap composition tag code. The obtaining animation data corresponding to each animation tag code from an animation project file includes: playing the animation project file, and sequentially capturing screenshots of playback screens corresponding to the animation project file, to obtain a corresponding bitmap image sequence. The obtaining animation data further includes processing the bitmap image sequence in a bitmap sequence frame export manner, to obtain image binary data corresponding to the bitmap composition tag code.

Specifically, when the animation project file is exported in the bitmap sequence frame manner to obtain an animation file, the terminal may capture each frame of a playback screen corresponding to the animation project file as a bitmap image when playing the animation project file, to obtain the corresponding bitmap image sequence. In an embodiment, each frame of the animation project file is captured by using a screenshot function of the AE SDK, to obtain a bitmap image corresponding to each frame, thereby obtaining a bitmap image sequence corresponding to the entire animation project file. The processing the bitmap image sequence in a bitmap sequence frame export manner, to obtain image binary data corresponding to the bitmap composition tag code includes: comparing a bitmap image in the bitmap image sequence with a corresponding key bitmap image, to obtain a difference pixel area in the bitmap image; and encoding, in response to a determination that the bitmap image is a non-key bitmap image, the difference pixel area in an image encoding manner, to obtain an encoded image corresponding to the bitmap image. The encoded image is the image binary data corresponding to each bitmap image.

Substantially, when the animation project file is exported in the bitmap sequence frame export manner to obtain the animation file, the animation data corresponding to the bitmap composition tag code (BitmapCompositionBlock) needs to be obtained. In addition to the above-mentioned image binary data, the animation data also includes some basic attribute data of the animation. For this, a defined attribute structure table of the bitmap composition tag code is shown in the following table:

| Field | Data type | Remarks |
| --- | --- | --- |
| CompositionID | EncodedUint32 | Identifier |
| CompositionAttributes | CompositionAttributes Tag | Composition basic attributes |
| bitmapsequences | BitmapSequence Tag[ ] | Bitmap image sequences |

In the above table, the CompositionAttributes is also an animation tag code, whose corresponding attribute structure table is shown in the following table:

| Field | Data type | Remarks |
| --- | --- | --- |
| duration | EncodedUint64 | Playback duration |
| frameRate | Float | Frame rate |
| backgroundColor | Color | Background color |

The bitmapsequences is also an animation tag code, whose corresponding attribute structure table is shown in the following table:

| Field | Data type | Remarks |
| --- | --- | --- |
| width | EncodedUint32 | Width of a bitmap image |
| height | EncodedUint32 | Height of a bitmap image |
| frameCount | EncodedUint32 | Quantity of bitmap images |
| isKeyFrameFlag [frameCount] | UB[frameCount] | frameCount counts of flags each indicating whether to be a key frame |
| bitmapRect[frameCount] | BitmapRect[frameCount] | frameCount counts of image binary data |

As can be seen from the above three tables, the node element in which the bitmap composition tag code is located is a nested node element, and a node element in which the CompositionAttributes is located and a node element in which the bitmapsequences is located are nested. In addition to the image binary data obtained in the image encoding manner, the animation data corresponding to the bitmap composition tag code also includes a composition identifier (CompositionID), composition basic attributes (CompositionAttributes), and a bitmap image sequence (sequence). The composition basic attributes include a playback duration, a frame rate, and a background color of the composition. The bitmap image sequence includes a width, a height and counts of the bitmap images, key frame flags, and the image binary data sequence (bitmapRect[frameCount]). The image binary sequence includes a width and a height of the difference pixel area corresponding to each bitmap image, the coordinates (x, y) of the start pixel in the difference pixel area corresponding to each bitmap image, and the image binary data stream (fileBytes) corresponding to each difference pixel area.

FIG. 12 is a diagram of an encoding structure of animation data corresponding to a bitmap sequence frame encoding manner. Referring to FIG. 12, during encoding, a value of the CompositionID is first encoded according to the data type of the composition identifier in the attribute structure table corresponding to the bitmap composition tag code. The basic attribute data is sequentially encoded according to the attribute structure table of the CompositionAttributes. The width, height, and frame rate when the entire animation is played are encoded. Whether each subsequent frame is a key frame is recorded by using nBits counts of bits. The total counts of bitmap images BitmapCount is encoded. Finally, the image binary data, that is, coordinate values (x, y) of a start pixel point in the difference pixel area and corresponding image binary data fileBytes, corresponding to each bitmap image in the bitmap image sequence (bitmapsequences) is encoded sequentially.

In an embodiment, the animation tag code is a video composition tag code. The obtaining animation data corresponding to each animation tag code from an animation project file includes: playing the animation project file, and sequentially capturing screenshots of playback screens corresponding to the animation project file, to obtain a bitmap image sequence corresponding to the animation project file. The obtaining animation data further includes processing the bitmap image sequence in a video sequence frame export manner, to obtain image binary data corresponding to the video composition tag code.

The processing the bitmap image sequence in a video sequence frame export manner to obtain image binary data corresponding to the video composition tag code includes: classifying a bitmap image into a color channel bitmap and a transparency channel bitmap, and compositing the color channel bitmap and the transparency channel bitmap, to obtain a composition bitmap. The processing the bitmap image sequence further includes encoding the composition bitmap in a video encoding manner, to obtain an encoded image corresponding to the bitmap image. The encoded image is image binary data corresponding to each bitmap image.

When the animation project file is exported in the video sequence frame export manner, to obtain the animation file, the animation data corresponding to the video composition tag code (VideoCompositionBlock) needs to be obtained.

| Field | Field Type | Remarks |
| --- | --- | --- |
| CompositionID | EncodedUint32 | Unique identifier |
| hasAlpha | Bool | Whether there is an Alpha channel |
| CompositionAttributes | CompositionAttributes Tag | |
| videosequences | VideoSequenceTag[ ] | |

The VideoSequence is also an animation tag code, whose corresponding attribute structure table is shown in the following table:

| Field | Field Type | Remarks |
| --- | --- | --- |
| width | EncodedUint32 | Width of a bitmap image |
| height | EncodedUint32 | Height of a bitmap image |
| alphaStartX | EncodedInt32 | Record X coordinate of the start pixel in the transparency channel, when hasAlpha = 1 |
| alphaStartY | EncodedInt32 | Record Y coordinate of the start pixel in the transparency channel, when hasAlpha = 1 |
| spsLength | EncodedUint32 | |
| spsData | Bytes[spsLength] | Parameters of the video encoding manner |
| ppsLength | EncodedUint32 | |
| ppsData | Bytes[ppsLength] | |
| frameCount | EncodedUint32 | Counts of bitmap images |
| isKeyFrameFlag [frameCount] | UB[frameCount] | frameCount counts of flags each indicating whether to be a key frame |
| videoFrames | VideoFrame[frameCount] | frameCount counts of image binary data |

As can be seen from the attribute structure table of the video composition tag code, a node element in which the video composition tag code is located is a nested node element, and a node element in which the CompositionAttributes is located and a node element in which the VideoSequence is located are nested. In addition to the image binary data obtained according to the video encoding manner, the animation data corresponding to the video composition tag code also includes a composition identifier (CompositionID), whether to include a transparency channel (hasAlpha), composition basic attributes (CompositionAttributes), and a video frame sequence (VideoSequence). The composition basic attributes include a playback duration, a frame rate, and a background color of the composition. The video frame sequence includes a width and a height of the bitmap images, position information of the transparency channel, parameters of the video encoding manner, key frame flags, and an image binary data sequence (videoFrames). The image binary sequence includes a timestamp and an image binary data stream (fileBytes) that correspond to each video frame.

FIG. 13 is a diagram of an encoding structure of animation data corresponding to a video sequence frame encoding manner. Referring to FIG. 13, during encoding, a value of the CompositionID is first encoded according to a data type of the composition identifier in the attribute structure table corresponding to the video composition tag code. A value of hasAlpha identifying whether a transparency channel exists is encoded according to the Bool type. The basic attribute data is sequentially encoded according to the attribute structure table of the CompositionAttributes. The width, height, and frame rate when the entire animation is played are encoded. Start position information alphaStartX and alphaStartY of the transparency channel is encoded. Video encoding parameters SPS and PPS are encoded. A total count of bitmap images Count is encoded. Finally, a frame serial number and image binary data fileBytes that correspond to each composition bitmap in the video frame sequence (VideoSequence) are sequentially encoded.

In an embodiment, the above animation data encoding method further includes: sequentially encoding file header information according to a file header organization structure, to obtain file header encoded information, and sequentially encoding the animation tag code, a data block length, and a data block according to a node element organization structure, to obtain node element encoded data, the data block including the dynamic attribute data block and the basic attribute data block. The animation data encoding method further includes organizing the file header encoded information and each piece of node element encoded data according to a target file structure, to obtain a target animation file.

The target animation file herein is the PAG file, whose file organization structure includes a file header (FileHeader) and a node element (Tag). Therefore, when data of the entire animation file is encoded, the file header information is encoded according to the file header organization structure, to obtain the file header encoded information. The node element organization structure includes the animation tag code, the data block length, and the data block. Therefore, the animation data corresponding to each animation tag code obtained from the animation project file is encoded in sequence according to the node element organization structure, to obtain the node element encoded data. The data block herein includes the dynamic attribute data block and the basic attribute data block. The obtained file header encoded information and node element encoded data are organized according to the file structure of the target animation file, to obtain the target animation file.

The dynamic attribute data block is obtained when the animation project file is exported in a vector export manner. The basic attribute data block is obtained when the animation project file is exported in the vector export manner, the bitmap sequence frame export manner, or the video sequence frame export manner. Different animation tag codes correspond to different attribute structure tables, and different attributes in the attribute structure tables have different attribute types. The encoding may be performed according to the basic attribute data block or the dynamic attribute data block.

The following describes attribute structure tables of 37 animation tag codes listed above.

End

| Field | Data type | Remarks |
| --- | --- | --- |
| End | Unit16 | Tag ending flag |

The End, as a special animation tag code, identifies the end of a certain node element. When this tag is read during decoding, it indicates that reading of the content of the node element corresponding to this End has been finished. If the node element includes nested elements, that is, includes child node elements, the content of the current node element needs to be jumped out for continuing to read content from an outer node element.

FontTables

| Field | Data type | Remarks |
| --- | --- | --- |
| count | EncodedUint32 | Counts of fonts |
| fontData | FontData[ ] | Font array |

The FontTables is a collection of font information.

VectorCompositionBlock

| Field | Data type | Remarks |
| --- | --- | --- |
| id | EncodedUint32 | Unique identifier |
| CompositionAttributes | CompositionAttributes Tag | TagCode Type, basic attribute information |
| LayerBlock | LayerBlock Tag | Layer information |

The VectorCompositionBlock is a collection of animation data that is exported in the vector export manner, which may include simple vector graphics data, or may include one or more VectorCompositions.

| Field | Data type | Remarks |
| --- | --- | --- |
| width | EncodedInt32 | Width of a layer |
| height | EncodedInt32 | Height of a layer |
| duration | EncodedUint64 | Duration |
| frameRate | Float | Frame rate |
| backgroundColor | Color | Background color |

The CompositionAttributes are basic attribute information of a composition.

ImageTables

| Field | Data type | Remarks |
| --- | --- | --- |
| count | EncodedInt32 | Counts of images |
| images | ImageBytesTag[ ] | Image array |

The ImageTables are a collection of image information.

LayerBlock

| Field | Data type | Remarks |
| --- | --- | --- |
| type | Uint8 | Type of a layer |
| id | EncodedUint32 | Unique identifier of a layer |
| LayerAttributes | LayerAttributes Tag | Basic attributes of a layer |
| masks | MaskBlockTag[ ] | Mask collection of a layer |
| transform | Transform2D Tag | 2D transformation information |
| SolidColor | SolidColor Tag | Information such as width, height, and color. |

-continued

| Field | Data type | Remarks |
|---|---|---|
| TextSource | TextSource Tag | Text information, including basic information such as text, font, size, and color. |
| TextPathOption | TextPathOption Tag | Text location information, including drawing path, top, bottom, left and right margins, and the like. |
| TextMoreOption | TextMoreOption Tag | Text other information |
| CompositionReference | CompositionReference Tag | Byte element reference, pointing to a byte element |
| ImageReference | ImageReference Tag | Byte element reference, pointing to a byte element |
| ImageReference | ImageReference Tag | Byte element reference, pointing to a byte element |
| Shape | Shape Tag | Shape information |

The LayerBlock is a collection of layer information.
LayerAttributes

| Field | Field type | Attribute type | Default value | Remarks |
|---|---|---|---|---|
| isActive | Bool | BitFlag | true | Not to be rendered if false |
| autoOrientation | Bool | BitFlag | false | Auto-adaptive screen-to-body ratio |
| parent | Pointer type | Value | nullptr | Parent layer of a layer |
| stretch | Ratio | Value | (1, 1) | Stretch ratio |
| startTime | Int64 | Value | 0 | Start time |
| blendMode | Enumeration (Unit8) | Value | BlendMode::Normal | Layer blend mode |
| trackMatteType | Enumeration (Unit8) | Value | TrackMatteType::None | Track Matte |
| timeRemap | Float | SimpleProperty | 0.0 | Time remap |
| duration | Int64 | FixedValue | 0 | Duration |

The LayerAttributes represent information related to layer attributes.
SolidColor

| Field | Data type | Remarks |
|---|---|---|
| solidColor | Color | Color value |
| width | EncodedInt32 | Width |
| height | EncodedInt32 | Height |

The SolidColor represents attribute information of a layer.
TextSource

| Field | Data type | Attribute type | Default value | Remarks |
|---|---|---|---|---|
| applyFill | Bool | BitFlag | true | Apply fill |
| applyStroke | Bool | BitFlag | false | Apply stroke |
| boxText | Bool | BitFlag | false | Apply a text box |
| fauxBold | Bool | BitFlag | false | Apply faux-bold |
| fauxItalic | Bool | BitFlag | false | Apply faux-italic |
| strokeOverFill | Bool | BitFlag | true | Apply stroke over fill |
| baselineShift | Float | Value | 0.0 | Apply baseline shift |
| firstBaseLine | Float | Value | 0.0 | Apply a baseline to the first line of text |
| boxTextPos | Point | Value | (0.0) | Text box position information |
| boxTextSize | Point | Value | (0.0) | Text box size information |

-continued

| Field | Data type | Attribute type | Default value | Remarks |
|---|---|---|---|---|
| fillColor | Color | Value | Black | Fill color information |
| fontSize | Float | Value | 24.0f | Font information |
| strokeColor | Color | Value | Black | Stroke color information |
| strokeWidth | Float | Value | 1.0f | Stroke width information |
| text | String | Value | | Text information |
| justification | Enumeration (Unit8) | Value | ParagraphJustification::LeftJustify | Justification information |
| leading | Float | Value | 0.0f | Line spacing |
| tracking | Float | Value | 0.0f | Letter spacing |
| fontFamily | String | Value | | Font information |
| fontStyle | String | Value | | Font style |

TextSource represents text information, including basic information such as text, font, size, and color.

TextPathOption Tag

| Field | Data type | Attribute type | Default value | Remarks |
|---|---|---|---|---|
| path | Mask Tag | Value | null | Path information |
| reversedPath | Bool | DiscreteProperty | false | Whether to invert a path |
| perpendicularToPath | Bool | DiscreteProperty | false | Perpendicular to a path |
| forceAlignment | Bool | DiscreteProperty | false | Force alignment |
| firstMargin | Float | SimpleProperty | 0.0f | First margin |
| lastMargin | Float | SimpleProperty | 0.0f | Last margin |

TextPathOption represents text drawing information, including drawing path, top, bottom, left and right margins, and the like.

TextMoreOption Tag

| Field | Data type | Attribute type | Default value | Remarks |
|---|---|---|---|---|
| anchorPointGrouping | Unit8 | Value | ParagraphJustification::LeftJustify | Text animation anchor point |
| Grouping-Alignment | Point | MultiDimensionProperty | (0.0) | Grouping alignment |

The TextMoreOption represents text other information.

ImageReference Tag

| Field | Data type | Remarks |
|---|---|---|
| id | EncodedUint32 | Image identifier |

The ImageReference represents a reference of an image. An ID of the image is stored, through which a real image information is indexed.

CompositionReference Tag

| Field | Data type | Remarks |
|---|---|---|
| id | EncodedUint32 | Identifier |
| compositionStartTime | Int64 | Start time |

The CompositionReference represents a reference of a layer composition. An ID of the layer composition is stored, through which a real layer composition is indexed.

Transform2D Tag

| Field | Data type | Attribute type | Default value | Remarks |
| --- | --- | --- | --- | --- |
| anchorPoint | Point | Value | (0.0) | Anchor point |
| position | Point | Value | (0.0) | Position information |
| xPosition | Float | Value | 0.0 | x-axis offset |
| yPosition | Float | Value | 0.0 | y-axis offset |
| scale | Point | Value | (0.0) | Scale |
| rotation | Float | Value | 0.0 | Rotation |
| opacity | unit8 | Value | 255 | Transparency (0 to 255) |

The Transform2D represents 2D transform information, including information such as an anchor point, scale, rotation, and x-axis and y-axis offsets.

Mask Tag

| Field | Data type | Attribute type | Default value | Remarks |
| --- | --- | --- | --- | --- |
| id | EncodedUint32 | FixedValue | 0 | Identifier |
| inverted | Bool | BitFlag | false | Whether to invert a mask |
| maskMode | Enumeration(Unit8) | Value | MaskMode::Add | Mask blend mode |
| maskPath | Path | SimpleProperty | None | Vector path information of a mask |
| maskOpacity | unit8 | SimpleProperty | 255 | Transparency (0 to 255) |
| maskExpansion | Float | SimpleProperty | 0.0f | Edge expansion parameter of a mask |

The Mask represents mask information.

ShapeGroup Tag

| Field | Data type | Attribute type | Default value | Remarks |
| --- | --- | --- | --- | --- |
| blendMode | Enumeration(Unit8) | Value | BlendMode::Normal | Image blend mode |
| transform | ShapeTransform | Value | None | Transform |
| elements | Shape[ ] | Value | None | Elements |

The ShapeGroup represents projection information.

Rectangle Tag

| Field | Data type | Attribute type | Default value | Remarks |
| --- | --- | --- | --- | --- |
| reversed | Bool | BitFlag | false | Flag indicating whether to invert a rectangle |
| size | Point | MultiDimensionProperty | (100, 100) | Width and height of a rectangle |
| position | Point | SpatialProperty | (0, 0) | Position of a rectangle |
| roundness | Float | SimpleProperty | 0.0f | Roundness |

The Rectangle represents rectangle information.

Ellipse Tag

| Field | Data type | Attribute type | Default value | Remarks |
| --- | --- | --- | --- | --- |
| reversed | Bool | BitFlag | false | Flag indicating whether to invert an ellipse |
| size | Point | MultiDimensionProperty | (100, 100) | Width and height |
| position | Point | SpatialProperty | (0, 0) | Position |

The Ellipse represents ellipse information.

Poly Star Tag

| Field | Data type | Attribute type | Default value | Remarks |
|---|---|---|---|---|
| reversed | Bool | BitFlag | false | Whether to invert a polygon |
| polyType | Enumeration (Unit8) | Value | PolyStarType::Star | Polygon type |
| points | Float | SimpleProperty | 5.0f | Vertex |
| position | Point | SpatialProperty | (0, 0) | Position |
| rotation | Float | SimpleProperty | 0.0f | Rotation |
| innerRadius | Float | SimpleProperty | 50.0f | Inner radius |
| outerRadius | Float | SimpleProperty | 100.0f | Outer radius |
| innerRoundness | Float | SimpleProperty | 0.0f | Inner roundness |
| outerRoundness | Float | SimpleProperty | 0.0f | Outer roundness |

The PolyStar represents polygon star information.

ShapePath Tag

| Field | Data type | Attribute type | Default value | Remarks |
|---|---|---|---|---|
| shapePath | Path | SimpleProperty | None | Path shape |

The ShapePath represents path information of a shape.

Fill Tag

| Field | Data type | Attribute type | Default value | Remarks |
|---|---|---|---|---|
| blendMode | Enumeration (Unit8) | Value | BlendMode::Normal | Image blend mode |
| composite | Enumeration (Unit8) | Value | CompositeOrder::BelowPreviousInSameGroup | Composition |
| fillRule | Enumeration (Unit8) | Value | FillRule::NonZeroWinding | Fill rule |
| color | Color | SimpleProperty | Red | Color |
| opacity | unit8 | SimpleProperty | 255 | Transparency (0-255) |

The Fill represents information related to fill.

Stroke Tag

| Field | Data type | Attribute type | Default value | Remarks |
|---|---|---|---|---|
| blendMode | Enumeration (Unit8) | Value | BlendMode::Normal | Image blend mode |
| composite | Enumeration (Unit8) | Value | CompositeOrder::BelowPreviousInSameGroup | Composition |
| lineCap | Enumeration (Unit8) | Value | LineCap::Butt | Line cap |
| linejoin | Enumeration (Unit8) | Value | LineJoin::Miter | Line join |
| miterLimit | Float | SimpleProperty | 4.0f | Miter limit between lines |
| color | Color | SimpleProperty | White | Color |
| opacity | unit8 | SimpleProperty | 255 | Transparency (0 to 255) |
| strokeWidth | Float | SimpleProperty | 2.0f | Stroke width |
| dashOffset | Float | SimpleProperty | 0.0f | Offset size of the dash mode from the beginning of a path |
| dashes | Float[ ] | SimpleProperty | None | Dashes |

The Stroke represents information related to stroke.

GradientFill Tag

| Field | Data type | Attribute type | Default value | Remarks |
|---|---|---|---|---|
| blendMode | Enumeration (Unit8) | Value | BlendMode::Normal | Image blend mode |
| composite | Enumeration (Unit8) | Value | CompositeOrder::BelowPreviousInSameGroup | Composition |
| fillRule | Enumeration (Unit8) | Value | FillRule::NonZeroWinding | Fill rule |
| fillType | Enumeration (Unit8) | Value | GradientFillType::Linear | Fill type |
| startPoint | Point | SpatialProperty | (0, 0) | Start position |
| endPoint | Point | SpatialProperty | (100, 0) | End position |
| colors | Color[ ] | SimpleProperty | None | Color |
| opacity | unit8 | SimpleProperty | 255 | Transparency (0 to 255) |

The GradientFill represents color gradient fill information.

GradientStroke Tag

| Field | Data type | Attribute type | Default value | Remarks |
|---|---|---|---|---|
| blendMode | Enumeration (Unit8) | Value | BlendMode::Normal | Image blend mode |
| composite | Enumeration (Unit8) | Value | CompositeOrder::BelowPreviousInSameGroup | Composition |
| fillType | Enumeration (Unit8) | Value | GradientFillType::Linear | Fill type |
| startPoint | Point | SpatialProperty | (0, 0) | Start position |
| endPoint | Point | SpatialProperty | (100, 0) | End position |
| color | Color | SimpleProperty | White | Color |
| opacity | unit8 | SimpleProperty | 255 | Transparency (0 to 255) |
| strokeWidth | Float | SimpleProperty | 2.0f | Stroke width |
| lineCap | Enumeration (Unit8) | Value | LineCap::Butt | Line cap |
| linejoin | Enumeration (Unit8) | Value | LineJoin::Miter | Line join |
| miterLimit | Float | SimpleProperty | 4.0f | Miter limit between lines |
| dashOffset | Float | SimpleProperty | 0.0f | Offset size of the dash mode from the beginning of a path |
| dashes | Float[ ] | SimpleProperty | | Dashes |

The GradientStroke represents transparency gradient information of stroke.

MergePaths Tag

| Field | Data type | Attribute type | Default value | Remarks |
|---|---|---|---|---|
| mode | Enumeration (Unit8) | Value | MergePathsMode::Add | Merge mode |

The MergePaths represents information related to merge paths.

TrimPaths Tag

| Field | Data type | Attribute type | Default value | Remarks |
|---|---|---|---|---|
| start | Float | SimpleProperty | 0.0f | Start |
| end | Float | SimpleProperty | 100.0f | End |
| offset | Float | SimpleProperty | 4.0f | Offset |
| trimType | Enumeration (Unit8) | Value | TrimPathsType::Simultaneously | Trim paths effect type |

The TrimPaths represent information related to effect of trim paths.

Repeater Tag

| Field | Data type | Attribute type | Default value | Remarks |
|---|---|---|---|---|
| composite | Enumeration (Unit8) | Value | CompositeOrder::BelowPreviousInSameGroup | Composition |
| copies | Float | SimpleProperty | 3.0f | Copy |
| offset | Float | SimpleProperty | 0.0f | Offset |
| anchorPoint | Point | SpatialProperty | (0, 0) | Anchor position |
| position | Point | SpatialProperty | (100, 0) | Position information |
| scale | Point | MultiDimensionProperty | (1.1) | Scale information |
| rotation | Float | SimpleProperty | 0.0f | Rotation information |
| startOpacity | unit8 | SimpleProperty | 255 | Transparency (0 to 255) |
| endOpacity | unit8 | SimpleProperty | 255 | Transparency (0 to 255) |

The Repeater represents information related to a repeater.

RoundCorners Tag

| Field | Data type | Attribute type | Default value | Remarks |
|---|---|---|---|---|
| radius | Float | SimpleProperty | 10.0f | radius |

The RoundCorners represent information related to a round corner.

Performance Tag

| Field | Data type | Attribute type | Default value | Remarks |
|---|---|---|---|---|
| renderingTime | Int64 | Value | 0 | Rendering time |
| imageDecodingTime | Int64 | Value | 0 | Image decoding time |
| presentingTime | Int64 | Value | 0 | Presenting time |
| graphicsMemory | Int64 | Value | 0 | Rendering memory |

The Performance represents performance parameters of animation.

DropShadowStyle Tag

| Field | Data type | Attribute type | Default value | Remarks |
|---|---|---|---|---|
| blendMode | Enumeration (Unit8) | DiscreteProperty | BlendMode::Normal | Image blend mode |
| color | Color | SimpleProperty | Black | Color |
| opacity | unit8 | SimpleProperty | 191 | Transparency (0 to 255) |
| angle | Float | SimpleProperty | 120.0f | Angle |
| distance | Float | SimpleProperty | 5.0f | Distance |
| size | Float | DiscreteProperty | 5.0f | Size |

The DropShadowStyle is information related to adding of a drop shadow.

StrokeStyle Tag

| Field | Data type | Attribute type | Default value | Remarks |
|---|---|---|---|---|
| blendMode | Enumeration (Unit8) | DiscreteProperty | BlendMode::Normal | Image blend mode |
| color | Color | SimpleProperty | Red | Color |
| size | Float | SimpleProperty | 3.0f | Size |
| opacity | unit8 | SimpleProperty | 255 | Transparency (0 to 255) |

-continued

| Field | Data type | Attribute type | Default value | Remarks |
|---|---|---|---|---|
| position | Enumeration (Unit8) | DiscreteProperty | StrokePosition::Outside | Position information |

The StrokeStyle represents information related to a stroke style.

TintEffect Tag

| Field | Data type | Attribute type | Default value | Remarks |
|---|---|---|---|---|
| mapBlackTo | Color | SimpleProperty | Black | Map a specified color to black pixel |
| mapWhiteTo | Color | SimpleProperty | White | Map a specified color to white pixel |
| amountToTint | Float | SimpleProperty | 1.0f | Specify the amount of colorization |

The TintEffect represents information related to a tint effect.

FillEffect Tag

| Field | Data type | Attribute type | Default value | Remarks |
|---|---|---|---|---|
| allMasks | Bool | BitFlag | false | All masks |
| fillMask | Mask Tag | Value | null | Mask to be filled |
| color | Color | SimpleProperty | Red | Color |
| invert | Bool | DiscreteProperty | false | Whether to invert a mask |
| horizontalFeather | Float | SimpleProperty | 0.0f | Horizontal edge feathering |
| verticalFeather | Float | SimpleProperty | 0.0f | Vertical edge feathering |
| opacity | unit8 | SimpleProperty | 255 | Transparency (0 to 255) |

The FillEffect represents information related to a fill effect.

StrokeEffect Tag

| Field | Data type | Attribute type | Default value | Remarks |
|---|---|---|---|---|
| allMasks | Bool | BitFlag | false | All masks |
| path | Mask Tag | Value | null | Information about path |
| strokeSequentially | Bool | DiscreteProperty | false | Whether to combine all paths |
| color | Color | SimpleProperty | Red | Color |
| brushSize | Float | SimpleProperty | 2.0f | Brush size |
| brushHardness | Float | SimpleProperty | 0.75f | Brush edge |
| opacity | unit8 | SimpleProperty | 255 | Transparency (0 to 255) |
| start | Float | SimpleProperty | 0.0f | Start position |
| end | Float | SimpleProperty | 1.0f | End position |
| spacing | Float | SimpleProperty | 0.15f | Spacing |
| paintStyle | Enumeration (Unit8) | DiscreteProperty | StrokePaintStyle::OnOriginalImage | Paint style |
| effectOpacity | unit8 | SimpleProperty | 255 | Transparency (0 to 255) |
| maskReferences | MaskTag[ ] | Value | null | Mask reference |

The StrokeEffect is information related to a stroke effect.

TritoneEffect Tag

| Field | Data type | Attribute type | Default value | Remarks |
|---|---|---|---|---|
| highlights | Color | SimpleProperty | White | Highlights |
| midtones | Color | SimpleProperty | (127, 100, 70) | Mid-tone |
| shadows | Color | SimpleProperty | Black | Shadow |
| blendWithOriginal | Float | SimpleProperty | 0.0f | Blending degree with original image |
| effectOpacity | unit8 | SimpleProperty | 255 | Transparency (0 to 255) |
| maskReferences | MaskTag[ ] | Value | null | Mask reference |

TritoneEffect represents effects of highlights, mid-tone, and shadow.

DropShadowEffect Tag

| Field | Data type | Attribute type | Default value | Remarks |
|---|---|---|---|---|
| shadowColor | Color | SimpleProperty | Black | Shadow color |
| opacity | unit8 | SimpleProperty | 127 | Transparency (0 to 255) |
| direction | Float | SimpleProperty | 135.0f | Direction |
| distance | Float | SimpleProperty | 5.0f | Distance |
| softness | Float | SimpleProperty | 0.0f | Softness degree |
| shadowOnly | Bool | DiscreteProperty | false | Only keep shadow |
| effectOpacity | unit8 | SimpleProperty | 255 | Transparency (0 to 255) |
| maskReferences | MaskTag [ ] | Value | null | Mask reference |

The DropShadowEffect represents information about a drop shadow effect.

FillRadialWipeEffect Tag

| Field | Data type | Attribute type | Default value | Remarks |
|---|---|---|---|---|
| transitionCompletion | Float | SimpleProperty | 0.0f | Percentage of transition completed |
| startAngle | Float | SimpleProperty | 0.0f | Start angle |
| wipeCenter | Point | SpatialProperty | (200.0, 150.0) | Center position of transition effect |
| wipe | Enumeration (Unit8) | DiscreteProperty | RadialWipeDirection::Both | Transition effect |
| feather | Float | SimpleProperty | 0.0f | Feathering degree |
| effectOpacity | unit8 | SimpleProperty | 255 | Transparency (0 to 255) |
| maskReferences | MaskTag [ ] | Value | null | Mask reference |

The FillRadialWipeEffect represents information about a fill radial wipe effect.

DisplacementMapEffect Tag

| Field | Data type | Attribute type | Default value | Remarks |
|---|---|---|---|---|
| displacementMapLayer | Layer | Value | null | Displace map layer |
| useForHorizontalDisplacement | Enumeration (Unit8) | DiscreteProperty | DisplacementMapSource::Red | Select the map layer to be horizontal to the current layer |
| maxHorizontalDisplacement | Float | SimpleProperty | 5.0f | Max horizontal displacement |

-continued

| Field | Data type | Attribute type | Default value | Remarks |
| --- | --- | --- | --- | --- |
| useForVerticalDisplacement | Enumeration (Unit8) | DiscreteProperty | DisplacementMapSource::Green | Select the map layer to be vertical to the current layer |
| maxVerticalDisplacement | Float | SimpleProperty | 5.0f | Max vertical displacement |
| displacementMapBehavior | Enumeration (Unit8) | DiscreteProperty | DisplacementMapBehavior::StretchMapToFit | Displace map behavior |
| edgeBehavior | Bool | DiscreteProperty | false | Blur direction of an image boundary |
| expandOutput | Bool | DiscreteProperty | true | Effect expands beyond original image edge |
| effectOpacity | unit8 | SimpleProperty | 255 | Transparency (0 to 255) |
| maskReferences | MaskTag [ ] | Value | null | Mask reference |

The DisplacementMapEffect represents displacement layer information.

BitmapCompositionBlock

| Field | Field Type | Remarks |
| --- | --- | --- |
| CompositionID | EncodedUint32 | Identifier |
| CompositionAttributes | CompositionAttributes Tag | Basic attributes of a composition |
| bitmapsequences | BitmapSequence Tag[ ] | Bitmap image sequence |

The BitmapCompositionBlock represents a composition exported in the bitmap sequence frame manner.

CompositionAttributes

| Field | Field Type | Remarks |
| --- | --- | --- |
| duration | EncodedUint64 | Playback duration |
| frameRate | Float | Frame rate |
| backgroundColor | Color | Background color |

The CompositionAttributes represent basic attribute information of the composition exported in the bitmap sequence frame manner.

BitmapSequence

| Field | Field Type | Remarks |
| --- | --- | --- |
| width | EncodedUint32 | Width of a bitmap image |
| height | EncodedUint32 | Height of a bitmap image |
| frameCount | EncodedUint32 | Counts of bitmap images |
| isKeyFrameFlag [frameCount] | UB[frameCount] | frameCount counts of flags each indicating whether to be a key frame |
| bitmapRect[frameCount] | BitmapRect[frameCount] | frameCount counts of image binary data |

The BitmapSequence represents a bitmap image sequence.

ImageBytes

| Field | Field Type | Remarks |
| --- | --- | --- |
| id | EncodedUint32 | Identifier |
| width | EncodedInt32 | Width of a bitmap image |
| width | EncodedInt32 | Height of a bitmap image |
| anchorX | EncodedInt32 | X-axis coordinate |
| anchorY | EncodedInt32 | Y-axis coordinate |
| fileBytes | ByteData | Image byte stream |

The ImageBytes represents attribute information of an encoded image.

ImageBytes2

| Field | Field Type | Remarks |
| --- | --- | --- |
| id | EncodedUint32 | Identifier |
| width | EncodedInt32 | Width of a bitmap image |
| width | EncodedInt32 | Height of a bitmap image |
| anchorX | EncodedInt32 | X-axis coordinate |
| anchorY | EncodedInt32 | Y-axis coordinate |
| fileBytes | ByteData | Image byte stream |
| scaleFactor | Float | Scale factor (0~1.0) |

The ImageBytes2 store image-related attribute information, and a scaleFactor attribute is added compared with the ImageBytes.

The ImageBytes3 strips off the transparent border, without changing the attribute values compared with the ImageBytes2.

VideoCompositionBlock

| Field | Field Type | Remarks |
| --- | --- | --- |
| CompositionID | EncodedUint32 | Unique identifier |
| hasAlpha | Bool | Whether there is an Alpha channel |
| CompositionAttributes | CompositionAttributes Tag | Basic attributes of a composition |
| videosequences | VideoSequenceTag[ ] | Video frame sequence |

The VideoCompositionBlock represents a composition exported in the video sequence frame export manner.

VideoSequence

| Field | Field Type | Remarks |
| --- | --- | --- |
| width | EncodedUint32 | Width of a bitmap image |
| height | EncodedUint32 | Height of a bitmap image |
| alphaStartX | EncodedInt32 | Record X coordinate of the start pixel in the transparency channel, when hasAlpha = 1 |
| alphaStartY | EncodedInt32 | Record Y coordinate of the start pixel in the transparency channel, when hasAlpha = 1 |
| spsLength | EncodedUint32 | Parameters of the video encoding manner |
| spsData | Bytes[spsLength] | |
| ppsLength | EncodedUint32 | |
| ppsData | Bytes[ppsLength] | |
| frameCount | EncodedUint32 | Counts of bitmap images |
| isKeyFrameFlag [frameCount] | UB[frameCount] | frameCount counts of flags each indicating whether to be a key frame |
| videoFrames | VideoFrame[frameCount] | frameCount counts of image binary data |

The VideoSequence represents a sequence frame sequence.

As shown in FIG. 14, in an embodiment, an animation data decoding method is provided. In this embodiment, descriptions are provided mainly by using an example in which the method is applicable to the terminal 110 in FIG. 1. Referring to FIG. 14, the animation data decoding method specifically includes the following steps.

In step S1402, an animation tag code is obtained.

When the PAG file is parsed, file header information needs to be decoded according to a file header organization structure, and the remaining node elements need to be decoded according to a node element organization structure. A node end tag (End) is a special node element, used for identifying that all node elements at this level have been read, with no more node element to be read. Therefore, if the node end tag (0) is read, it indicates that the reading of content of the current node element is finished, and obtained data, which is content of a next node element, is continued to be read. Certainly, if the node element is a nested node element, including a plurality of child node elements, obtained data, which is content of an outer node element, is continued to be read after the node end tag is read; and until a node end tag corresponding to the outermost node element is obtained or a byte stream length of the content of the outermost node element has been read, it indicates that there is no more content to be read from the outermost node element.

According to the node element organization structure described above, the node element includes a node element header (TagHeader) and node element content (TagBody). The node element header includes an animation tag code (TagCode) and a byte stream length (Length) of the node element content. The node element header is classified into a short type and a long type. Regardless of the short type or the long type, the first 10 bits of the first two bytes of the node element header represent the animation tag code. Therefore, after an animation tag code (0) corresponding to END is read, 2 bytes are continued to be read, and the first 10 bits of the two bytes represent an animation tag code included in a next node element. If the last six bits of the first two bytes are not "0x3f", it indicates that the node element header of the node element is of the short type. According to an organizational structure of the short-type node element header, the value of the last six bits represents the byte stream length (Length) of the node element content (TagBody). If the last six bits of the first two bytes are "0x3f", it indicates that the node element header of the node element is of the long type. According to an organizational structure of the long-type node element header, four bytes subsequent to the two bytes are continued to be read, and an obtained data value represents the byte stream length (Length) of the node element content (TagBody). The value of the byte stream length represents the number of bytes occupied by the node element content. After the obtained byte stream length is parsed, it may be determined how many bytes of data after the node element header belong to the node element content of the current node element.

The animation tag code is used for indicating which type of animation information is specifically recorded by the node element. Different animation tag codes indicate that different animation information is recorded. After a certain animation tag code is parsed, the animation information represented by the node element content of the current node element may be determined. Node element content of different animation information has different encoding structures. Therefore, obtaining the animation tag code in each piece of node element is needed for accurately parsing each piece of node element, especially for the node element content.

As mentioned above, the PAG file stores the animation tag code by using 10 bits, and accordingly may store a maximum of 1024 different animation tag codes. At present, the PAG file uses 37 types of animation tag codes, in which 0-29 are animation tag codes supported by the vector export manner, and 45-51 are seven animation tag codes extended for the bitmap sequence frame export manner and the video sequence frame export manner. If the PAG file can support more animation characteristics in the future, new animation tag codes may be continued to be extended for representing animation information corresponding to newly added animation characteristics.

Further, when an animation tag code is parsed, node element content of a current node element needs to be parsed according to an attribute structure table corresponding to animation information represented by the animation tag code, which includes two main cases. When no attribute type exists in the attribute structure table corresponding to the parsed animation tag code, data in the node element content is stored in the form of a basic attribute data block. When attribute types exist in the attribute structure table corresponding to the animation tag code, the data in the node element content is stored in the form of a dynamic attribute data block.

In step S1404, in response to a determination that attribute types exist in an attribute structure table corresponding to the animation tag code, attribute flag information corresponding to each attribute is parsed from a dynamic attribute data block corresponding to the animation tag code, according to an attribute type corresponding to each attribute in the attribute structure table.

The attribute structure table defines a data structure of the animation information corresponding to the animation tag code. When attribute types exist in the attribute structure table corresponding to a certain animation tag code, it indicates that node element content after a node element header corresponding to the animation tag code needs to be decoded according to a dynamic attribute data structure. The dynamic attribute data block mainly includes two parts: an attribute flag area including attribute flag information (AttributeFlag) corresponding to each attribute, and an attribute content area including attribute content (AttributeContent) corresponding to each attribute. The attribute type (AttributeType) is used for determining the number of bits occupied by the attribute flag information and a reading rule for the corresponding attribute content. The attribute type includes a common property, a Bool property, a fixed property, a simple animation property, a discrete animation property, a multi-dimensional time easing animation property, and a spatial easing animation property.

Mask information is taken as an example. When an animation tag code "14" representing the mask information is read, since attribute types exist in an attribute structure table corresponding to the mask information, node element content of a current node element needs to be parsed according to the dynamic attribute data structure. In general, an attribute flag area in the dynamic attribute data block is first parsed; and after a unified byte alignment is performed, an attribute content area is read from the beginning of a full byte, to sequentially obtain attribute content corresponding to each attribute in the attribute structure table corresponding to the mask information.

The attribute flag information may be empty, or the attribute flag information may include at least a content flag bit, or may include an animation interval flag bit and a spatial easing parameter flag bit. The content flag bit (exist) is used for indicating whether attribute content corresponding to the attribute exists in the dynamic attribute data block or is equal to a default value. The animation interval flag bit (animatable) is used for indicating whether an attribute value corresponding to the attribute includes animation interval characteristic data. The spatial easing parameter flag bit (hasSpatial) is used for indicating whether an attribute value corresponding to the attribute includes a spatial easing parameter. The number of bits occupied by the attribute flag information corresponding to attributes of different attribute types is dynamic, ranging from 0 to 3 bits. The number of bits occupied by each attribute flag information needs to be determined according to the attribute type. That is, the attribute type may be used for determining the number of bits (0 to 3 bits) that may be occupied by the attribute flag information. The common property occupies a maximum of 1 bit, and only the content flag bit needs to be read during decoding. The spatial easing animation property occupies a maximum of three bits to store the attribute flag information. For example, if the spatial easing animation property does not include the animation interval characteristic data and the attribute value is equal to the default value, the attribute flag information needs to be represented by using one bit, and the attribute flag information includes only the attribute content flag bit, with a value of 0, indicating that the corresponding attribute content is the default value. If the read content flag bit is 0 during decoding, it indicates that reading of the attribute flag information corresponding to the attribute is finished, with no need to read a value of a next bit. In an extreme case, each attribute in the attribute structure table does not include the animation interval characteristic data and the attribute value is equal to the default value, bits whose quantity is a quantity of the attributes are occupied to store the attribute flag information corresponding to all the attributes, and each attribute flag information includes only the content flag bit with a value of 0.

Rules of parsing the attribute flag information corresponding to different attribute types are given below:

The attribute flag information of the common property occupies one bit. When the attribute flag information corresponding to the attribute is read, a value of one bit needs to be read.

The attribute flag information of the Bool property occupies one bit. When the attribute flag information corresponding to the attribute is read, one bit needs to be read, and a value of the bit is the attribute value corresponding to the attribute.

The attribute flag information of the fixed property occupies no bit, so there is no need to read the attribute flag information corresponding to the attribute from the dynamic attribute data block.

The attribute flag information of the simple animation property, the discrete animation property, or the multi-dimensional time easing animation property occupies 1 to 2 bits. If a read value of the first bit is 1, it indicates that the attribute value corresponding to the attribute is not the default value, and to the process continues to read the second bit, to obtain the attribute flag information "11" or "10" corresponding to the attribute. If the read value of the first bit is 0, it indicates that the attribute value corresponding to the attribute is the default value, and the attribute flag information occupies one bit, namely being "1".

The attribute flag information of the spatial easing animation property occupies 1 to 3 bits. If a read value of the first bit is 1, it indicates that the attribute value corresponding to the attribute is not the default value, and to the process continues to read the second bit. If a value of the second bit is 0, the attribute content corresponding to the attribute does not include the animation interval characteristic data, to obtain the attribute flag information "10" corresponding to the attribute. In this case, subsequent data cannot be read as the attribute flag information corresponding to the attribute. If the value of the second bit is 1, the attribute content corresponding to the attribute includes the animation interval characteristic data, and the third bit needs to be read continuously. If a value of the third bit is 0, the attribute content corresponding to the attribute does not include the spatial easing parameter, and the attribute flag information "110" corresponding to the attribute is determined. If the value of the third bit is 1, the attribute content corresponding to the attribute includes the spatial easing parameter, and the attribute flag information "111" corresponding to the attribute is determined. If the read value of the first bit is 0, it indicates that the attribute value corresponding to the attribute is the default value, and the attribute flag information occupies one bit, namely being "1". In this case, subsequent data cannot be read as the attribute flag information corresponding to the attribute.

In an embodiment, the parsing attribute flag information corresponding to each attribute from a dynamic attribute data block corresponding to the animation tag code, according to an attribute type corresponding to each attribute in the attribute structure table includes: querying the attribute structure table, to obtain an attribute order corresponding to each attribute, and determining, according to the attribute type corresponding to each attribute, the number of bits occupied by the attribute flag information corresponding to each attribute. The parsing the attribute flag information further includes reading data from a first bit in the dynamic attribute data block corresponding to the animation tag code, and sequentially determining the attribute flag information corresponding to each attribute from the read data based on the number of bits occupied by the attribute flag information corresponding to each attribute and according to the attribute order.

In fact, a quantity of attributes, the attribute order, the attribute types of the attributes, and the default values of the attributes included in the attribute structure table are all hard-coded in parsing code. When a certain animation tag code is parsed, information about an attribute structure table corresponding to the animation tag code may be directly determined according to the parsing code, the attribute structure table including the attribute order, the attribute types, the data types, the quantity, and the default values corresponding to the attributes.

Specifically, when the attribute flag information corresponding to each attribute is parsed from the dynamic attribute data block, the number of bits that may be occupied by the attribute flag information corresponding to each attribute is first determined according to the attribute type corresponding to each attribute. The data needs to be sequentially read from an attribute flag area of the dynamic attribute data block according to the attribute order corresponding to each attribute, and the read data needs to be parsed according to encoding rules of the attribute flag information of different attribute types, to accurately determine the attribute flag information corresponding to each attribute.

In an embodiment, in response to a determination that no attribute type exists in the attribute structure table corresponding to the animation tag code, an attribute value corresponding to each attribute is sequentially read from the basic attribute data block corresponding to the animation tag code according to a data type and the attribute order that correspond to each attribute in the attribute structure table.

Specifically, if no attribute type exists in the attribute structure table corresponding to the animation tag code, it indicates that node element content after a node element header corresponding to the animation tag code needs to be decoded according to the basic attribute data structure. Substantially, the node element content is parsed according to the data type and the attribute content that correspond to each attribute in the attribute structure table corresponding to the animation tag code, to sequentially obtain the attribute value corresponding to each attribute.

For example, when a parsed value of an animation tag code is "7", it indicates that a current node element represents information about a size and a color of a border. No attribute type exists in an attribute structure table corresponding to this information, and the attribute structure table includes three fields, respectively solidColor, width, and height. A data type of the solidColor is Color. The Color type needs to occupy three bytes, representing values of red, green, and blue in sequence. A data type of width and height is EncodedInt32. When node element content of a node element in which the animation tag code is located is decoded, 24 bits need to be first read, to obtain a value of the solidColor; and then values of width and height are read sequentially according to an EncodedInt32 encoding rule, to obtain each attribute value of animation information represented by the current node element.

In step S1406, attribute content corresponding to each attribute is parsed from the dynamic attribute data block according to the attribute flag information corresponding to each attribute.

The attribute flag information identifies a state of each attribute. The states may include the following types, such as whether the attribute value is a default value or exists in an attribute content area of the dynamic attribute data block, or whether the attribute content includes the animation interval characteristic data if the attribute value exists in the attribute content area of the dynamic attribute data block. The states may further indicate whether the attribute content includes the spatial easing parameters, or the like. The manners of encoding attribute values in different states are different. Therefore, the state of each attribute is determined according to the attribute flag information corresponding to each attribute; besides, it is determined which type of data structure is used to parse the attribute content from the dynamic attribute data block or how to parse the corresponding attribute value.

Specifically, after the attribute flag information corresponding to each attribute is obtained, the attribute content corresponding to each attribute may be parsed from the dynamic attribute data block according to a state of an attribute identified by the attribute flag information and in a parsing manner corresponding to the state. When the attribute types are different, and the attribute flag information of each attribute type takes different values, the corresponding parsing manners are different. This will be described in detail below.

In an embodiment, the attribute type is the common property. The attribute flag information includes a content flag bit. The parsing attribute content corresponding to each attribute from the dynamic attribute data block according to the attribute flag information corresponding to each attribute includes: reading, in response to a determination that a value of the content flag bit indicates that the attribute content corresponding to the attribute exists in the dynamic attribute data block, the attribute content corresponding to the attribute from the dynamic attribute data block according to the data type corresponding to the attribute; and querying, in response to a determination that the value of the content flag bit indicates that no attribute content corresponding to the attribute exists in the dynamic attribute data block, a default value corresponding to the attribute from the attribute structure table.

When the attribute type is the common property, the attribute flag information includes a content flag bit, that is, occupies one bit. If the value of the content flag bit, for example 1, indicates that the attribute content corresponding to the attribute exists in the dynamic attribute data block, that is, the attribute content corresponding to the attribute is not the default value, the attribute content corresponding to the attribute needs to be parsed from the dynamic attribute data block according to the data type corresponding to the attribute. If the value of the content flag bit, for example 0, indicates that no attribute content corresponding to the attribute exists in the dynamic attribute data block, that is, the attribute content corresponding to the attribute is the default value, the default value corresponding to the attribute is directly obtained, and there is no need to parse the attribute content corresponding to the attribute from the dynamic attribute data block according to the data type corresponding to the attribute.

In an embodiment, the attribute type is a fixed property, and the attribute flag information is empty. The parsing attribute content corresponding to each attribute from the dynamic attribute data block according to the attribute flag information corresponding to each attribute includes: directly reading the attribute content corresponding to the attribute from the dynamic attribute data block according to the data type corresponding to the attribute.

The attribute type is the fixed property. The attribute flag information of the fixed property is empty and does not occupy bits. In fact, the attribute value corresponding to the fixed property definitely exists in the attribute content area of the dynamic attribute data block. Therefore, the attribute content corresponding to the attribute may be directly read from the dynamic attribute data block according to the data type corresponding to the attribute.

In an embodiment, the attribute type is the Bool property. The attribute flag information includes a content flag bit. The parsing attribute content corresponding to each attribute from the dynamic attribute data block according to the attribute flag information corresponding to each attribute includes: directly using the value of the content flag bit as the attribute content corresponding to the attribute.

The attribute type is the Bool type. The attribute flag information of the Bool type occupies one bit, and a value of this bit is a value corresponding to the attribute. Therefore, a value of the content flag bit may be directly used as the attribute value corresponding to the attribute. If the value of the content flag bit is 1, the attribute value corresponding to the attribute is true; and if the value of the content flag bit is 0, the attribute value corresponding to the attribute is false.

In an embodiment, the attribute type is the simple animation property, the discrete animation property, the multi-dimensional time easing animation property, or the spatial easing animation property. The attribute flag information includes at least a content flag bit. The parsing attribute content corresponding to each attribute from the dynamic attribute data block according to the attribute flag information corresponding to each attribute includes: reading, in response to a determination that a value of the content flag bit indicates that the attribute content corresponding to the attribute exists in the dynamic attribute data block, the attribute content corresponding to the attribute from the dynamic attribute data block; and querying, in response to a determination that the value of the content flag bit indicates that no attribute content corresponding to the attribute exists in the dynamic attribute data block, a default value corresponding to the attribute according to the attribute structure table.

If the attribute type corresponding to the attribute is the simple animation property (SimpleProperty), the discrete animation property (DiscreteProperty), the multi-dimensional time easing animation property (MultiDimensionProperty), or the spatial easing animation property (SpatialProperty), the attribute flag information corresponding to the attribute includes at least a content flag bit. Similarly, if a parsed value of the content flag bit such as 1, indicates that an attribute value is not a default value, that is, the attribute content corresponding to the attribute exists in the dynamic attribute data block, the attribute content corresponding to the attribute needs to be read from the dynamic attribute data block. If the parsed value of the content flag bit such as 0, indicates that the attribute value is the default value, that is, no attribute content corresponding to the attribute exists in the dynamic attribute data block, the default value corresponding to the attribute is used as the corresponding attribute content.

In an embodiment, the reading, in response to a determination that a value of the content flag bit indicates that the attribute content corresponding to the attribute exists in the dynamic attribute data block, the attribute content corresponding to the attribute from the dynamic attribute data block includes: reading, in response to a determination that the value of the content flag bit indicates that the attribute content corresponding to the attribute exists in the dynamic attribute data block, a value of a next bit of the content flag bit as a value of an animation interval flag bit. The reading the attribute content further includes parsing, in response to a determination that the value of the animation interval flag bit indicates that the attribute content includes animation interval characteristic data, the animation interval characteristic data corresponding to the attribute from the dynamic attribute data block according to a data storage structure corresponding to the animation interval characteristic data. The reading the attribute content further includes directly parsing, in response to a determination that the value of the animation interval flag bit indicates that the attribute content does not include the animation interval characteristic data, the attribute content corresponding to the attribute from the dynamic attribute data block according to the data type of the attribute.

Specifically, if the value of the content flag bit such as 1, indicates that the attribute content corresponding to the attribute exists in the dynamic attribute data block, the attribute flag information corresponding to the attribute further includes at least an animation interval flag bit, that is, the attribute flag information occupies at least two bits. If a read value (for example, 1) of a next bit of the content flag bit indicates that the attribute content includes the animation interval characteristic data, that is, the second bit of the attribute flag information is 1, the attribute content corresponding to the attribute in the dynamic attribute data block needs to be parsed according to the data storage structure corresponding to the animation interval characteristic data. If the read value (for example 0) of the next bit of the content flag bit indicates that the attribute content does not include the animation interval characteristic data, that is, the second bit of the attribute flag information is 0, and the attribute flag information is "10", the attribute content corresponding to the attribute in the dynamic attribute data block needs to be parsed according to the data type corresponding to the attribute.

In an embodiment, fields included in the data storage structure corresponding to the animation interval characteristic data include a quantity of animation intervals, an interpolator type of each animation interval, a start time and an end time of each animation interval, and further include a start value, an end value, a time easing parameter, and a spatial easing parameter of the attribute corresponding to each animation interval.

The data storage structure corresponding to the animation interval characteristic data may refer to the explanation given in the animation data encoding method. Such data storage structure is used for storing animation data of one or more animation intervals. In addition, the animation characteristic data of a plurality of animation intervals is stored in a way that one type of data of each animation interval is stored sequentially and then another type of data of each animation interval is stored centrally, instead of storing all data of one animation interval first and then storing all data of a next animation interval. In this way, similar data can be stored and compressed centrally, thereby reducing the storage space.

In an embodiment, the attribute type is the spatial easing animation property. The parsing, in response to a determination that the value of the animation interval flag bit indicates that the attribute content includes animation interval characteristic data, the animation interval characteristic data corresponding to the attribute from the dynamic attribute data block according to a data storage structure corresponding to the animation interval characteristic data includes: reading, in response to a determination that the value of the animation interval flag bit indicates that the attribute content includes the animation interval characteristic data, a value of a next bit of the animation interval flag bit as a value of a spatial easing parameter flag bit. The parsing the animation interval characteristic data further includes parsing, in response to a determination that the value of the spatial easing parameter flag bit indicates that the animation interval characteristic data includes a spatial easing parameter, the animation interval characteristic data that corresponds to the attribute and includes the spatial easing parameter from the dynamic attribute data block according to the data storage structure corresponding to the animation interval characteristic data. The parsing the animation interval characteristic data further includes parsing, in response to a determination that the value of the spatial easing parameter flag bit indicates that the animation interval characteristic data does not include the spatial easing parameter, the animation interval characteristic data that corresponds to the attribute and does not include the spatial easing parameter from the dynamic attribute data block according to the data storage structure corresponding to the animation interval characteristic data.

The spatial ease parameter is a parameter used for describing a complex animation effect. The attribute flag information corresponding to the attribute may occupy three bits when the attribute type corresponding to the attribute is the spatial easing animation property. In addition, the premise of the existence of the spatial easing parameter flag bit is that both the content flag bit and the animation interval flag bit are 1. For other attribute types, there is no need to determine whether the third flag bit exists, nor to store the spatial easing parameter.

Specifically, if the value of the animation interval flag bit such as 1, indicates that the attribute content includes the animation interval characteristic data, the attribute flag information corresponding to the attribute further includes at least a spatial easing parameter flag bit. That is, the attribute flag information occupies three bits. If a read value (for example 1) of a next bit of the animation interval flag bit indicates that the attribute content includes the spatial easing parameter, that is, the third bit of the attribute flag information is 1, and the attribute flag information is "111", the animation interval characteristic data that corresponds to the attribute and includes the spatial easing parameter is parsed from the dynamic attribute data block. In addition, the spatial easing parameter has a corresponding encoding structure, and thus needs to be parsed according to the corresponding encoding structure. If the read value (for example 0) of the next bit of the animation interval flag bit indicates that the attribute content does not include the spatial easing parameter, that is, the third bit of the attribute flag information is 0, and the attribute flag information is "110", the animation interval characteristic data that corresponds to the attribute and does not include the spatial easing parameter is parsed from the dynamic attribute data block.

When the attribute content is parsed according to the data storage structure of the animation interval characteristic data, whether an interpolator type field in each animation interval exists needs to be determined according to the attribute type (the interpolator type field does not exist in response to a determination of the discrete animation property, because the interpolation type is Hold by default), and whether the animation interval characteristic data includes the time easing parameter is further determined according to the parsed interpolator type (because the time easing parameter does not exist when the value of the interpolator type is not equal to Bezier), and to determine whether the spatial easing parameter according to the attribute flag information exists, or the like. That is to say, the values of some fields in the data storage structure of the animation interval characteristic data may not exist. The storage structure of the entire attribute content can be clarified by determinations based on the attribute type, the attribute flag information, the interpolator type, and the data type of the attribute value corresponding to the animation interval, to parse the attribute content corresponding to the attribute from the attribute content area. The process of parsing the attribute content corresponding to each attribute in the attribute structure table corresponding to the animation tag code is performed according to the previous parsing solution.

In the foregoing animation data decoding method, an animation tag code may be used for identifying a group of attributes. An attribute structure table is used for describing a data structure of the group of attributes identified by the animation tag code. If attribute values of this group of attributes are indeterminate in terms of type and/or quantity, or if redundancy exists in the attribute values of the attributes, in order to avoid the problem that additional introduction of a large number of flag fields used for describing the types or quantity of the attributes will cause the excessive large size of the animation file, a data structure of a dynamic attribute data block is introduced, which can maximize the compression of these flags, thereby greatly reducing the size occupied by the target animation file. Specifically, during decoding, after the animation tag code is read, if attribute types exist in the attribute structure table corresponding to the animation tag code, it indicates that the attribute values of the group of attributes identified by a animation tag code are encoded in the form of the dynamic attribute data block. Therefore, attribute flag information corresponding to each attribute may be parsed from the dynamic attribute data block corresponding to the animation tag code according to the attribute type corresponding to each attribute, and then attribute content corresponding to each attribute may be parsed from the dynamic attribute data block according to the attribute flag information, thereby implementing the decoding of the animation file.

In an embodiment, the obtaining an animation tag code includes: parsing a target animation file, to obtain a binary sequence, sequentially reading file header encoded information and node element encoded data of the target animation file from the binary sequence according to a target file structure of the target animation file, and decoding the file header encoded information according to an order of the fields included in the file header organization structure of the target animation file and data types of the fields, to obtain file header information. The obtaining an animation tag code also includes decoding the node element encoded data according to a node element organization structure of the target animation file, to sequentially obtain the animation tag code, a data block length, and a data block corresponding to each animation tag code, the data block including the dynamic attribute data block and the basic attribute data block.

The target animation file is the PAG file. The file organization structure of the PAG file includes a file header (FileHeader) and a node element (Tag). When data of the entire animation file is encoded, file header information is encoded according to the file header organization structure, to obtain the file header encoded information. The node element organization structure includes the animation tag code, the data block length, and the data block. The animation data corresponding to each animation tag code obtained from the animation project file is sequentially encoded according to the node element organization structure, to obtain the node element encoded data. The data block herein includes the dynamic attribute data block and the basic attribute data block. Therefore, after the binary sequence of the target animation file is obtained by parsing, the file header encoded information in the binary sequence needs to be decoded reversely according to the file header organization structure, to obtain the file header information; and each piece of node element encoded data in the binary sequence is decoded according to the node element organization structure, to obtain content included in the node element, that is, the animation tag code, the data block length, and the data block corresponding to each animation tag code.

In an embodiment, the target animation file is obtained by exporting the animation project file in a vector export manner. The parsing a target animation file, to obtain a binary sequence includes: obtaining a file data structure corresponding to the vector export manner; and parsing the target animation file according to the file data structure, to obtain the binary sequence representing animation vector data.

Figure 15:
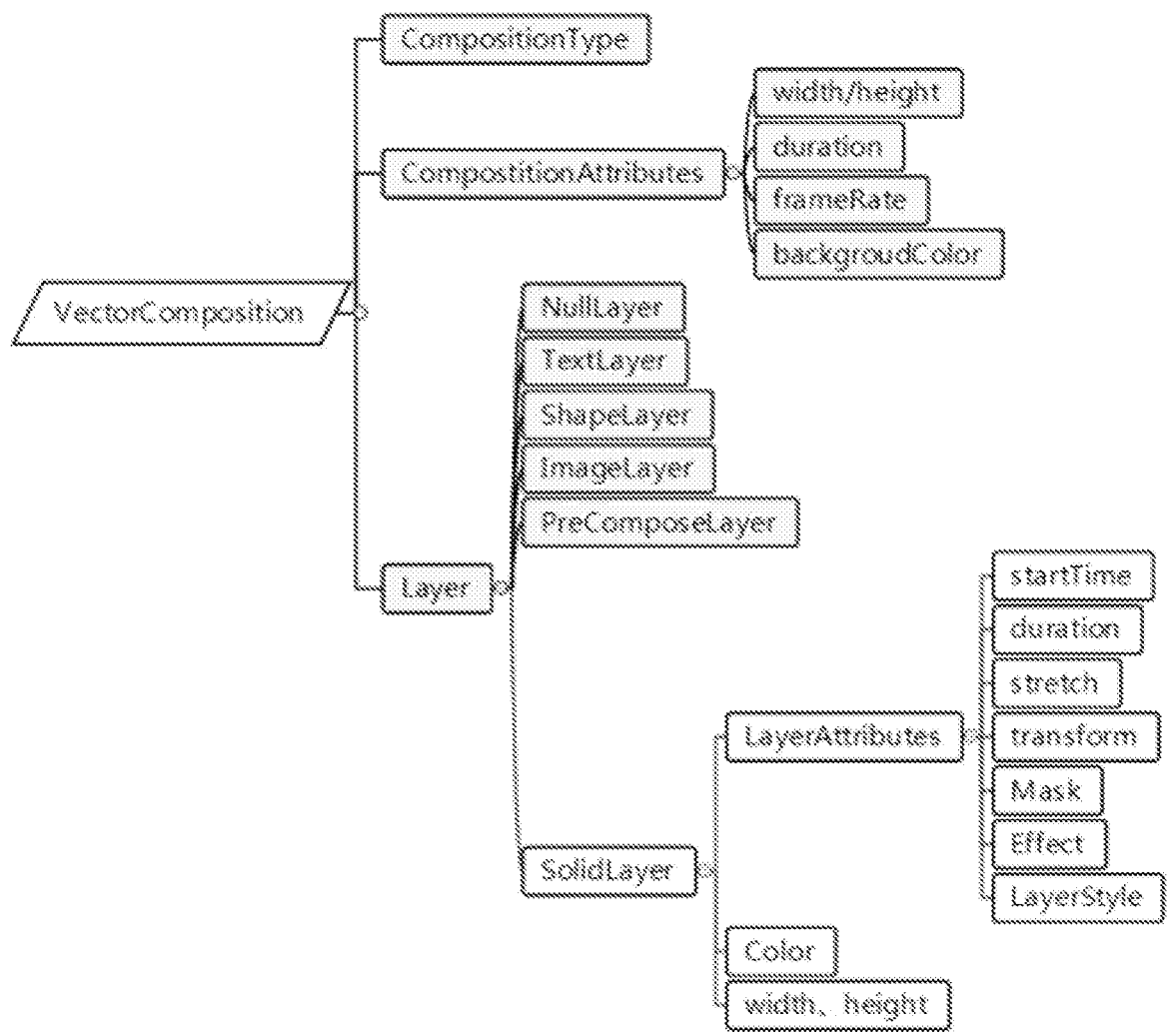
FIG. 15 is a file data structure corresponding to a vector export manner according to an embodiment.

FIG. 15 is a file data structure corresponding to a vector export manner according to an embodiment. Referring to FIG. 15, the entire target animation file is obtained by compositing layer information of all layers. VectorComposition represents an entire file, including CompositionAttributes and Layer. CompositionAttributes represents basic attribute data of an animation, including width, height, or the like of the animation, and further including duration, a frame rate, and a background color, or the like of the entire animation. The Layer represents animation layer data, including data corresponding to each layer. In an original animation file, different types of layers may be used, including but not limited to a virtual object layer (NullObjectLayer), a solid layer (SolidLayer), a text layer (TextLayer), a shape layer (ShapeLayer), an image layer (ImageLayer), a pre-composite layer (PreComposeLayer), and the like. Therefore, the binary sequence obtained by parsing the target animation file is animation vector data that describes layer information according to the above-mentioned layer structure. Taking the solid layer as an example, corresponding described information includes a width, a height, and a color of a layer, and layer attributes (LayerAttributes). The layer attributes include basic attributes and animation attribute groups. The basic attributes include layer duration, a layer start time startTime (namely in which frame the layer is used), a stretch parameter stretch, and the like. The animation attribute groups include transform, mask, trackMatter, layerStyle, effect, and content. One layer is obtained by any one or more combinations of these 6 types of animation attribute groups.

In an embodiment, the target animation file is obtained by exporting the animation project file in a bitmap sequence frame export manner. The parsing a target animation file to obtain a binary sequence includes: decompressing the target animation file in an image decoding manner, to obtain image binary data corresponding to the target animation file. The image binary data includes pixel data of key bitmap images in the animation project file and pixel data of difference pixel areas of non-key bitmap images in the animation project file.

Specifically, the target animation file obtained by exporting the animation project file in the bitmap sequence frame export manner is actually a series of encoded images obtained by compressing and encoding the difference pixel areas corresponding to the non-key bitmap images and the key bitmap images in the image encoding manner. The specific steps include: obtaining a bitmap image sequence corresponding to the animation project file, comparing pixels of a bitmap image in the bitmap image sequence with pixels of a corresponding key bitmap image, to obtain a difference pixel area in the bitmap image, and encoding the difference pixel area in the image encoding manner, in response to a determination that the bitmap image is a non-key bitmap image, to obtain an encoded image corresponding to the bitmap image. The specific steps further include directly encoding the bitmap image in the image encoding manner in response to a determination that the bitmap image is a key bitmap image, to obtain an encoded image corresponding to the bitmap image, and generating the target animation file corresponding to the animation project file according to the encoded image corresponding to each bitmap image in the bitmap image sequence.

Therefore, when the target animation file is parsed, the target animation file needs to be decoded in a corresponding image decoding manner, to obtain the image binary sequence corresponding to the target animation file. The image binary data includes the pixel data of the key bitmap images in the animation project file and the pixel data of the difference pixel areas of the non-key bitmap images.

In an embodiment, the target animation file is obtained by exporting the animation project file in a video sequence frame export manner. The parsing a target animation file to obtain a binary sequence includes: decompressing the target animation file in a video decoding manner, to obtain image binary data corresponding to the target animation file. The image binary data is pixel data of composition bitmaps. The composition bitmaps are obtained by compositing color channel bitmaps and transparency channel bitmaps of the bitmap images included in the animation project file.

Specifically, a specific process of exporting the animation project file in the video sequence frame export manner to obtain the target animation file is as follows: obtaining the bitmap image sequence corresponding to the animation project file, and classifying each bitmap image in the bitmap image sequence into a color channel bitmap and a transparency channel bitmap. The specific process further includes compositing the color channel bitmap and the transparency channel bitmap, to obtain a composition bitmap, encoding the composition bitmap in the video encoding manner, to obtain an encoded image corresponding to the bitmap image, and generating the target animation file corresponding to the animation project file according to the encoded image corresponding to each bitmap image in the bitmap image sequence.

Therefore, when the target animation file is parsed, the target animation file needs to be decoded in a corresponding video decoding manner, to obtain the image binary data corresponding to the composition bitmaps corresponding to the target animation file.

It is to be understood that, although the steps of the flowcharts in FIG. 8 and FIG. 14 are displayed sequentially based on indication of arrows, the steps are not necessarily performed according to the sequence indicated by arrows. Unless otherwise explicitly specified in this application, execution of the steps is not strictly limited, and the steps may be performed in other sequences. Moreover, at least some steps in FIG. 8 and FIG. 14 may include a plurality of sub-steps or a plurality of stages. The sub-steps or the stages are not necessarily performed at a same moment, but may be performed at different moments. The sub-steps or the stages are not necessarily performed in sequence, but may be performed in turn or alternately with another step or at least some of sub-steps or stages of the another step.

Figure 16:
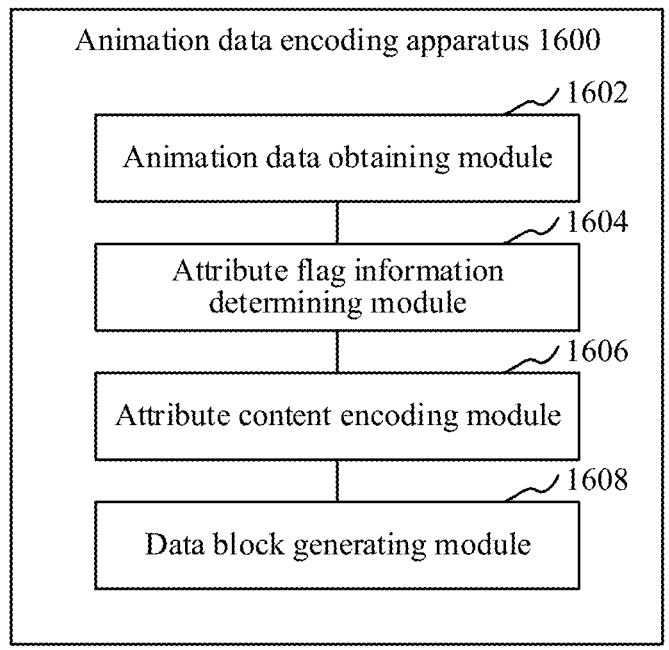
FIG. 16 is a structural block diagram of an animation data encoding apparatus according to an embodiment.

In an embodiment, as shown in FIG. 16, an animation data encoding apparatus 1600 is provided. The animation data encoding apparatus 1600 includes an animation data obtaining module 1602, an attribute flag information determining module 1604, an attribute content encoding module 1606, and a data block generating module 1608. One or more of the modules can be implemented by processing circuitry, software, or a combination thereof, for example.

The animation data obtaining module 1602 is configured to obtain animation data corresponding to each animation tag code from an animation project file.

The attribute flag information determining module 1604 is configured to determine, in response to a determination that attribute types exist in an attribute structure table corresponding to the animation tag code, attribute flag information corresponding to each attribute in the attribute structure table.

The attribute content encoding module 1606 is configured to encode an attribute value corresponding to each attribute in the animation data according to the attribute flag information, to obtain attribute content corresponding to each attribute.

The data block generating module 1608 is configured to sequentially store, according to an attribute order corresponding to each attribute in the attribute structure table, the attribute flag information and the attribute content that correspond to each attribute, to obtain a dynamic attribute data block corresponding to the animation tag code.

In an embodiment, the animation data encoding apparatus 1600 further includes a basic attribute data block generating module, configured to sequentially encode, in response to a determination that no attribute type exists in the attribute structure table corresponding to the animation tag code, the attribute value corresponding to each attribute in the animation data according to a data type and the attribute order that correspond to each attribute in the attribute structure table, to obtain a basic attribute data block corresponding to the animation tag code.

In an embodiment, the attribute type corresponding to the attribute is a common property or a Bool property, and the attribute flag information corresponding to the attribute includes only a content flag bit. The attribute flag information determining module 1604 is further configured to encode, in response to a determination that the attribute value corresponding to the attribute in the animation data is not a default value, the content flag bit into a value indicating that the attribute content corresponding to the attribute exists in the dynamic attribute data block; and encode, in response to a determination that the attribute value corresponding to the attribute in the animation data is the default value, the content flag bit into a value indicating that no attribute content corresponding to the attribute exists in the dynamic attribute data block.

In an embodiment, the attribute type corresponding to the attribute is a fixed property, and the attribute flag information is empty. The attribute content encoding module 1606 is further configured to directly encode the attribute value corresponding to the attribute in the animation data according to a data type corresponding to the attribute, to obtain the attribute content corresponding to the attribute.

In an embodiment, the attribute type corresponding to the attribute is a simple animation property, a discrete animation property, a multi-dimensional time easing animation property, or a spatial easing animation property, and the attribute flag information includes at least a content flag bit. The attribute flag information determining module 1604 is further configured to encode, in response to a determination that the attribute value corresponding to the attribute in the animation data is not a default value, the content flag bit into a value indicating that the attribute content corresponding to the attribute exists in the dynamic attribute data block; and encode, in response to a determination that the attribute value corresponding to the attribute in the animation data is the default value, the content flag bit into a value indicating that no attribute content corresponding to the attribute exists in the dynamic attribute data block.

In an embodiment, the attribute flag information further includes an animation interval flag bit. In a case that the value of the content flag bit indicates that the attribute content corresponding to the attribute exists in the dynamic attribute data block, the attribute flag information determining module 1604 is further configured to encode, in response to a determination that the attribute value includes animation interval characteristic data, the animation interval flag bit into a value indicating that the attribute content that corresponds to the attribute and is stored in the dynamic attribute data block includes the animation interval characteristic data; and encode, in response to a determination that the attribute value does not include the animation interval characteristic data, the animation interval flag bit into a value indicating that the attribute content that corresponds to the attribute and is stored in the dynamic attribute data block does not include the animation interval characteristic data.

In an embodiment, the attribute content encoding module 1606 is configured to encode, in response to a determination that the value of the animation interval flag bit indicates that the attribute content that corresponds to the attribute and is stored in the dynamic attribute data block includes the animation interval characteristic data, the animation interval characteristic data corresponding to the attribute according to a data storage structure corresponding to the animation interval characteristic data, to obtain the attribute content corresponding to the attribute; and directly encode, in response to a determination that the value of the animation interval flag bit indicates that the attribute content that corresponds to the attribute and is stored in the dynamic attribute data block does not include the animation interval characteristic data, the attribute value corresponding to the attribute in the animation data according to the data type corresponding to the attribute, to obtain the attribute content corresponding to the attribute.

In an embodiment, the attribute type corresponding to the attribute is the spatial easing animation property, and the attribute flag information further includes a spatial easing parameter flag bit. In a case that the value of the animation interval flag bit indicates that the attribute content that corresponds to the attribute and is stored in the dynamic attribute data block includes the animation interval characteristic data, the attribute flag information determining module 1604 is further configured to encode, in response to a determination that the animation interval characteristic data includes a spatial easing parameter, the spatial easing parameter flag bit into a value indicating that the attribute content that corresponds to the attribute and is stored in the dynamic attribute data block includes the spatial easing parameter; and encode, in response to a determination that the animation interval characteristic data does not include the spatial easing parameter, the spatial easing parameter flag bit into a value indicating that the attribute content that corresponds to the attribute and is stored in the dynamic attribute data block does not include the spatial easing parameter.

In an embodiment, the attribute content encoding module 1606 is further configured to encode, in response to a determination that the value of the spatial easing parameter flag bit indicates that the attribute content that corresponds to the attribute and is stored in the dynamic attribute data block includes the spatial easing parameter, the animation interval characteristic data corresponding to the attribute according to the data storage structure corresponding to the animation interval characteristic data, to obtain the attribute content that corresponds to the attribute and includes the spatial easing parameter; otherwise, obtain the attribute content that corresponds to the attribute and does not include the spatial easing parameter.

In an embodiment, fields in the data storage structure corresponding to the animation interval characteristic data include a quantity of animation intervals, an interpolator type of each animation interval, a start time and an end time of each animation interval, and further includes a start value, an end value, a time easing parameter, and a spatial easing parameter of the attribute corresponding to each animation interval.

In an embodiment, the animation tag code is a bitmap composition tag code. The animation data obtaining module 1602 is further configured to play the animation project file. The animation data obtaining module 1602 is further configured to sequentially capture screenshots of playback screens corresponding to the animation project file, to obtain a bitmap image sequence corresponding to the animation project file, and process the bitmap image sequence in a bitmap sequence frame export manner, to obtain image binary data corresponding to the bitmap composition tag code.

In an embodiment, the animation tag code is a video composition tag code. The animation data obtaining module 1602 is further configured to play the animation project file, and sequentially capture screenshots of playback screens corresponding to the animation project file, to obtain a bitmap image sequence corresponding to the animation project file. The animation data obtaining module 1602 is further configured to process the bitmap image sequence in a video sequence frame export manner, to obtain image binary data corresponding to the video composition tag code.

In an embodiment, the animation data encoding apparatus 1600 further includes a file header information encoding module, a node element encoding module, and a target animation file generating module. The file header information encoding module is configured to sequentially encode file header information according to a file header organization structure, to obtain file header encoded information. The node element encoding module is configured to sequentially encode the animation tag code, a data block length, and a data block according to a node element organization structure, to obtain node element encoded data, the data block including a dynamic attribute data block and a basic attribute data block. The target animation file generating module is configured to organize the file header encoded information and each piece of node element encoded data according to a target file structure, to obtain a target animation file.

In the foregoing animation data encoding apparatus, an animation tag code may be used for identifying a group of attributes. An attribute structure table is used for describing a data structure of the group of attributes identified by the animation tag code. If attribute values of this group of attributes are indeterminate in terms of type and/or quantity, or if redundancy exists in the attribute values of the attributes, in order to avoid the problem that additional introduction of a large number of flag fields used for describing the types or quantity of the attributes will cause the excessive large size of the animation file, the data structure of the dynamic attribute data block is introduced, which can maximize the compression of these flags, thereby reducing the size occupied by the target animation file. Specifically, after the animation project file is obtained, the attribute values of the group of attributes included in the attribute structure table corresponding to the animation tag code are obtained from the animation project file. The attribute flag information in the dynamic attribute data block is used for describing attribute states of the attributes. When attribute types exist in the attribute structure table, the attribute flag information corresponding to each attribute may be determined according to the animation data, and then the attribute value corresponding to each attribute is dynamically encoded according to the attribute flag information, to obtain corresponding attribute content. The attribute flag information and the attribute content of the attributes in the attribute structure table are combined to form a dynamic attribute data block corresponding to the animation tag code, which can significantly reduce the space occupied by the animation file.

Figure 17:
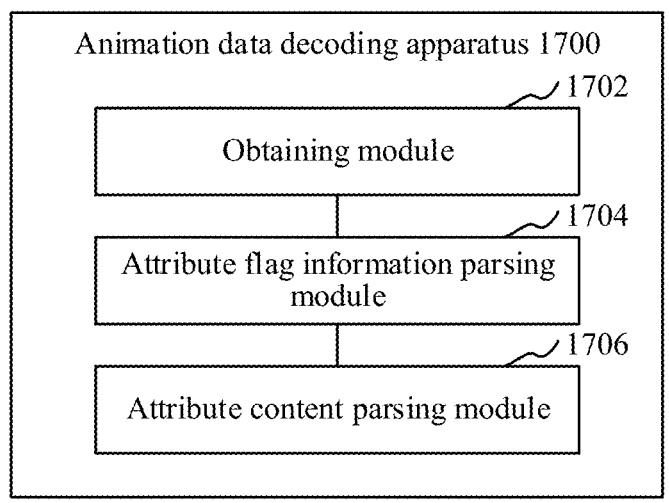
FIG. 17 is a structural block diagram of an animation data decoding apparatus according to an embodiment.

In an embodiment, as shown in FIG. 17, an animation data decoding apparatus 1700 is provided. The animation data decoding apparatus 1700 includes an obtaining module 1702, an attribute flag information parsing module 1704, and an attribute content parsing module 1706. One or more of the modules can be implemented by processing circuitry, software, or a combination thereof, for example.

The obtaining module 1702 is configured to obtain an animation tag code.

The attribute flag information parsing module 1704 is configured to parse, in response to a determination that attribute types exist in an attribute structure table corresponding to the animation tag code, attribute flag information corresponding to each attribute from a dynamic attribute data block corresponding to the animation tag code according to an attribute type corresponding to each attribute in the attribute structure table.

The attribute content parsing module 1706 is configured to parse attribute content corresponding to each attribute from the dynamic attribute data block according to the attribute flag information corresponding to each attribute.

In an embodiment, the animation data decoding apparatus 1700 further includes a basic attribute data block parsing module, configured to sequentially read, in response to a determination that no attribute type exist in the attribute structure table corresponding to the animation tag code, an attribute value corresponding to each attribute from a basic attribute data block corresponding to the animation tag code according to a data type and an attribute order that correspond to each attribute in the attribute structure table.

In an embodiment, the attribute flag information parsing module 1704 is further configured to query the attribute structure table, to obtain the attribute order corresponding to each attribute. The attribute flag information parsing module 1704 is further configured to determine, according to the attribute type corresponding to each attribute, the number of bits occupied by the attribute flag information corresponding to each attribute. The attribute flag information parsing module 1704 is further configured to start reading data from a first bit in the dynamic attribute data block corresponding to the animation tag code. The attribute flag information parsing module 1704 is further configured to determine, based on the number of bits occupied by the attribute flag information corresponding to each attribute and according to the attribute order, the attribute flag information corresponding to each attribute from data that has been sequentially read.

In an embodiment, the attribute type is a common property, and the attribute flag information only includes a content flag bit. The attribute content parsing module 1706 is further configured to read, in response to a determination that a value of the content flag bit indicates that the attribute content corresponding to the attribute exists in the dynamic attribute data block, the attribute content corresponding to the attribute from the dynamic attribute data block according to a data type corresponding to the attribute; and query, in response to a determination that the value of the content flag bit indicates that no attribute content corresponding to the attribute exists in the dynamic attribute data block, a default value corresponding to the attribute from the attribute structure table.

In an embodiment, the attribute type is a fixed property, and the attribute flag information is empty. The attribute content parsing module 1706 is further configured to directly read, according to the data type corresponding to the attribute, the attribute content corresponding to the attribute from the dynamic attribute data block.

In an embodiment, the attribute type is a Bool property, and the attribute flag information includes only a content flag bit. The attribute content parsing module 1706 is further configured to directly use a value of the content flag bit as the attribute content corresponding to the attribute.

In an embodiment, the attribute type is a simple animation property, a discrete animation property, a multi-dimensional time easing animation property, or a spatial easing animation property, and the attribute flag information includes at least a content flag bit. The attribute content parsing module 1706 is further configured to read, in response to a determination that the value of the content flag bit indicates that the attribute content corresponding to the attribute exists in the dynamic attribute data block, the attribute content corresponding to the attribute from the dynamic attribute data block; and query, in response to a determination that the value of the content flag bit indicates that no attribute content corresponding to the attribute exists in the dynamic attribute data block, a default value corresponding to the attribute according to the attribute structure table.

In an embodiment, the attribute content parsing module 1706 is further configured to read, in response to a determination that the value of the content flag bit indicates that the attribute content corresponding to the attribute exists in the dynamic attribute data block, a value of a next bit of the content flag bit as a value of an animation interval flag bit. The attribute content parsing module 1706 is further configured to parse, in response to a determination that the value of the animation interval flag bit indicates that the attribute content includes animation interval characteristic data, the animation interval characteristic data corresponding to the attribute from the dynamic attribute data block according to a data storage structure corresponding to the animation interval characteristic data. The attribute content parsing module 1706 is further configured to directly parse, in response to a determination that the value of the animation interval flag bit indicates that the attribute content does not include the animation interval characteristic data, the attribute content corresponding to the attribute from the dynamic attribute data block according to the data type of the attribute.

In an embodiment, the attribute type is a spatial easing animation property. The attribute content parsing module 1706 is further configured to read, in response to a determination that the value of the animation interval flag bit indicates that the attribute content includes the animation interval characteristic data, a value of a next bit of the animation interval flag bit as a value of a spatial easing parameter flag bit. The attribute content parsing module 1706 is further configured to parse, in response to a determination that the value of the spatial easing parameter flag bit indicates that the animation interval characteristic data includes a spatial easing parameter, the animation interval characteristic data that corresponds to the attribute and includes the spatial easing parameter from the dynamic attribute data block according to the data storage structure corresponding to the animation interval characteristic data. The attribute content parsing module 1706 is further configured to parse, in response to a determination that the value of the spatial easing parameter flag bit indicates that the animation interval characteristic data does not include the spatial easing parameter, the animation interval characteristic data that corresponds to the attribute and does not include the spatial easing parameter from the dynamic attribute data block according to the data storage structure corresponding to the animation interval characteristic data.

In an embodiment, fields included in the data storage structure corresponding to the animation interval characteristic data include a quantity of animation intervals, an interpolator type of each animation interval, a start time and an end time of each animation interval, and further includes a start value, an end value, a time easing parameter, and a spatial easing parameter of the attribute corresponding to each animation interval.

In an embodiment, the obtaining module 1702 further includes a target animation file parsing module, a file header information parsing module, and a node element parsing module. The target animation file parsing module is configured to parse a target animation file, to obtain a binary sequence; and sequentially read, according to a target file structure of the target animation file, file header encoded information and node element encoded data of the target animation file from the binary sequence. The file header information parsing module is configured to decode the file header encoded information according to an order of fields included in a file header organization structure of the target animation file and data types of the fields, to obtain file header information. The node element parsing module is configured to decode the node element encoded data according to a node element organization structure of the target animation file, to sequentially obtain the animation tag code, a data block length, and a data block corresponding to the animation tag code, the data block including a dynamic attribute data block and a basic attribute data block.

In an embodiment, the target animation file is obtained by exporting the animation project file in a vector export manner. The target animation file parsing module is further configured to obtain a file data structure corresponding to the vector export manner; and parse the target animation file according to the file data structure, to obtain the binary sequence representing animation vector data.

In an embodiment, the target animation file is obtained by exporting the animation project file in a bitmap sequence frame export manner. The target animation file parsing module is further configured to decompress the target animation file in an image decoding manner, to obtain image binary data corresponding to the target animation file, the image binary data including pixel data of key bitmap images and pixel data of difference pixel areas of non-key bitmap images in the animation project file.

In an embodiment, the target animation file is obtained by exporting the animation project file in a video sequence frame export manner. The target animation file parsing module is further configured to decompress the target animation file in a video decoding manner, to obtain the image binary data corresponding to the target animation file, the image binary data being pixel data of composition bitmaps, and the composition bitmaps being obtained by compositing color channel bitmaps and transparency channel bitmaps of the bitmap images in the animation project file.

In the foregoing animation data decoding apparatus 1700, an animation tag code may be used for identifying a group of attributes. An attribute structure table is used for describing a data structure of the group of attributes identified by the animation tag code. If attribute values of this group of attributes are indeterminate in terms of type and/or quantity, or if redundancy exists in the attribute values of the attributes, in order to avoid the problem that additional introduction of a large number of flag fields used for describing the types or quantity of the attributes will cause the excessive large size of the animation file, a data structure of a dynamic attribute data block is introduced, which can maximize the compression of these flags, thereby reducing the size occupied by the target animation file. Specifically, during decoding, after the animation tag code is obtained, if attribute types exist in the attribute structure table corresponding to the animation tag code, it indicates that the attribute values of the group of attributes identified by the animation tag code are encoded in the form of the dynamic attribute data block. Therefore, the attribute flag information corresponding to each attribute may be parsed from the dynamic attribute data block corresponding to the animation tag code according to the attribute type corresponding to each attribute, and then the attribute content corresponding to each attribute may be parsed from the dynamic attribute data block based on the attribute flag information, thereby implementing the decoding of the animation file.

Figure 18:
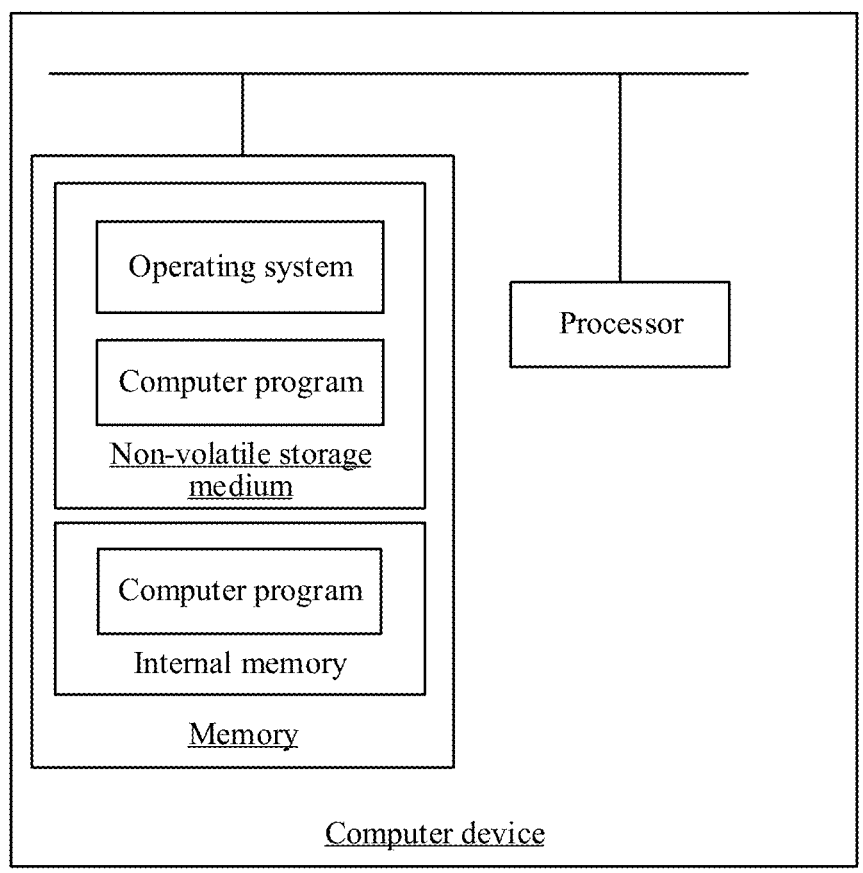
FIG. 18 is a structural block diagram of a computer device according to an embodiment.

FIG. 18 is a diagram of an internal structure of a computer device according to an embodiment. The computer device may be specifically the terminal 110 in FIG. 1. As shown in FIG. 18, the computer device includes a processor (processing circuitry) and a (non-transitory) memory connected by a system bus. The memory includes a non-volatile storage medium and an internal memory. The non-volatile storage medium of the computer device stores an operating system and may further store a computer program, the computer program, when executed by the processor, causing the processor to implement the animation data encoding/decoding method. The internal memory may also store a computer program, the computer program, when executed by the processor, causing the processor to perform the animation data encoding/decoding method.

A person skilled in the art may understand that, the structure shown in FIG. 18 is only a block diagram of a partial structure related to the solution of this application and does not constitute a limitation to the computer device to which the solution of this application is applied. Specifically, the computer device may include more or fewer components than those in the figure, or some components may be combined, or a different component deployment may be used.

In an embodiment, the animation data encoding apparatus 1600 provided in this application may be implemented in a form of a computer program. The computer program may run on the computer device shown in FIG. 18. The memory of the computer device may store program modules such as the animation data obtaining module 1602, the attribute flag information determining module 1604, the attribute content encoding module 1606, and the data block generating module 1608 shown in FIG. 16, constituting the animation data encoding apparatus 1600. The computer program formed by the program modules causes the processor to perform the steps of the animation data encoding method in the embodiments of this application that are described in this specification.

For example, the computer device shown in FIG. 18 may perform step S802 by using the animation data obtaining module 1602 in the animation data encoding apparatus 1600 shown in FIG. 16. The computer device may perform step S804 by using the attribute flag information determining module 1604. The computer device may perform step S1606 by using the attribute content encoding module 1606. The computer device may perform step S1608 by using the data block generating module 1608.

In an embodiment, the animation data decoding apparatus 1700 provided in this application may be implemented in a form of a computer program. The computer program may run on the computer device shown in FIG. 18. The memory of the computer device may store program modules such as the obtaining module 1702, the attribute flag information parsing module 1704, and the attribute content parsing module 1706 shown in FIG. 17, constituting the animation data decoding apparatus 1700. The computer program formed by the program modules causes the processor to perform the steps of the animation data decoding method in the embodiments of this application that are described in this specification.

For example, the computer device shown in FIG. 18 may perform step S1402 by using the obtaining module 1702 in the animation data decoding apparatus 1700 shown in FIG. 17. The computer device may perform step S1404 by using the attribute flag information parsing module 1704. The computer device may perform step S1406 by using the attribute content parsing module 1706.

In an embodiment, a computer device is provided, including a processor and a memory. The memory stores a computer program, the computer program, when executed by the processor, causing the processor to perform the steps of the foregoing animation data encoding method. The steps of the animation data encoding method herein may be the steps of the animation data encoding method in the foregoing embodiments.

In an embodiment, a computer-readable storage medium is provided, storing a computer program, the computer program, when executed by a processor, causing the processor to perform the steps of the foregoing animation data decoding method. The steps of the animation data decoding method herein may be the steps of the animation data decoding method in the foregoing embodiments.

In an embodiment, a computer device is provided, including a processor and a memory. The memory stores a computer program, the computer program, when executed by the processor, causing the processor to perform the steps of the foregoing animation data decoding method. The steps of the animation data decoding method herein may be the steps of the animation data decoding method in the foregoing embodiments.

In an embodiment, a computer-readable storage medium is provided, storing a computer program, the computer program, when executed by a processor, causing the processor to perform the steps of the foregoing animation data decoding method. The steps of the animation data decoding method herein may be the steps of the animation data decoding method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDR_SDRAM), an enhanced SDRAM (ESDRAM), a synchronous link (Synchlink) DRAM (SLDRAM), a rambus (Rambus) direct RAM (RDRAM), a direct rambus dynamic RAM (DRDRAM), and a rambus dynamic RAM (RDRAM).

The technical features of the foregoing embodiments may be randomly combined. For concise description, not all possible combinations of the technical features in the embodiments are described. However, provided that combinations of these technical features do not conflict with each other, the combinations of the technical features are considered as falling within the scope described in this specification.

The foregoing embodiments only describes several implementations of this application, which are described in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application is subject to the protection scope of the appended claims.

What is claimed is:

1. An animation data encoding method comprising:
obtaining animation data corresponding to an animation tag code from an animation project file;
in response to a determination that attribute types exist in an attribute structure table corresponding to the animation tag code,
  determining attribute flag information corresponding to each attribute in the attribute structure table;
  encoding, by processing circuitry of a computer device, an attribute value corresponding to each attribute in the animation data according to the attribute flag information, to obtain attribute content corresponding to each attribute; and
  for each attribute, sequentially storing the corresponding attribute flag information and the corresponding attribute content according to an attribute order of the attribute structure table, to obtain a dynamic attribute data block corresponding to the animation tag code.

2. The method according to claim 1, further comprising:
in response to a determination that no attribute types exist in the attribute structure table corresponding to the animation tag code,
sequentially encoding the attribute value corresponding to each attribute in the animation data according to a data type of the attribute and the attribute order of the attribute structure table, to obtain a basic attribute data block corresponding to the animation tag code.

3. The method according to claim 2, wherein
the animation tag code is a bitmap composition tag code; and
the obtaining comprises:
  playing the animation project file;
  sequentially capturing screenshots of playback screens corresponding to the animation project file, to obtain a bitmap image sequence corresponding to the animation project file; and
  processing the bitmap image sequence in a bitmap sequence frame export manner, to obtain image binary data corresponding to the bitmap composition tag code.

4. The method according to claim 2, wherein
the animation tag code is a video composition tag code; and
the obtaining comprises:
  playing the animation project file;
  sequentially capturing screenshots of playback screens corresponding to the animation project file, to obtain a bitmap image sequence corresponding to the animation project file; and
  processing the bitmap image sequence in a video sequence frame export manner, to obtain image binary data corresponding to the video composition tag code.

5. The method according to claim 2, further comprising:
sequentially encoding file header information according to a file header organization structure, to obtain file header encoded information;
sequentially encoding the animation tag code, a data block length, and a data block according to a node element organization structure, to obtain node element encoded data, the data block comprising the dynamic attribute data block and the basic attribute data block; and
organizing the file header encoded information and each piece of the node element encoded data according to a target file structure, to obtain a target animation file.

6. The method according to claim 1, wherein
an attribute type corresponding to an attribute in the attribute structure table is a common property or a Bool property, and the attribute flag information corresponding to the attribute comprises only a content flag bit; and
the determining comprises:
encoding, in response to a determination that the attribute value corresponding to the attribute is not a default value, the content flag bit into a value indicating that the attribute content corresponding to the attribute exists in the dynamic attribute data block; and
encoding, in response to a determination that the attribute value corresponding to the attribute is the default value, the content flag bit into a value indicating that no attribute content corresponding to the attribute exists in the dynamic attribute data block.

7. The method according to claim 1, wherein
an attribute type corresponding to an attribute in the attribute structure table is a fixed property, and the attribute flag information is empty; and
the encoding comprises:
directly encoding the attribute value corresponding to the attribute according to a data type corresponding to the attribute, to obtain the attribute content corresponding to the attribute.

8. The method according to claim 1, wherein
an attribute type corresponding to an attribute in the attribute structure table is a simple animation property, a discrete animation property, a multi-dimensional time easing animation property, or a spatial easing animation property, and the attribute flag information corresponding to the attribute comprises at least a content flag bit; and
the determining comprises:
  encoding, in response to a determination that the attribute value corresponding to the attribute is not a default value, the content flag bit into a value indicating that the attribute content corresponding to the attribute exists in the dynamic attribute data block; and
  encoding, in response to a determination that the attribute value corresponding to the attribute is the default value, the content flag bit into a value indicating that no attribute content corresponding to the attribute exists in the dynamic attribute data block.

9. The method according to claim 8, wherein
the attribute flag information corresponding to the attribute further comprises an animation interval flag bit; and
in response to a determination that the value of the content flag bit indicates that the attribute content corresponding to the attribute exists in the dynamic attribute data block, the method further comprises:
  encoding, in response to a determination that the attribute value corresponding to the attribute comprises animation interval characteristic data, the animation interval flag bit into a value indicating that the attribute content that corresponds to the attribute and is stored in the dynamic attribute data block comprises the animation interval characteristic data; and
  encoding, in response to a determination that the attribute value corresponding to the attribute does not comprise the animation interval characteristic data, the animation interval flag bit into a value indicating that the attribute content that corresponds to the attribute and is stored in the dynamic attribute data block does not comprise the animation interval characteristic data.

10. The method according to claim 9, wherein the encoding the attribute value corresponding to each attribute comprises:
  encoding, in response to a determination that the value of the animation interval flag bit indicates that the attribute content that corresponds to the attribute and is stored in the dynamic attribute data block comprises the animation interval characteristic data, the animation interval characteristic data corresponding to the attribute according to a data storage structure corresponding to the animation interval characteristic data, to obtain the attribute content corresponding to the attribute; and
  directly encoding, in response to a determination that the value of the animation interval flag bit indicates that the attribute content that corresponds to the attribute and is stored in the dynamic attribute data block does not comprise the animation interval characteristic data, the attribute value corresponding to the attribute according to a data type corresponding to the attribute, to obtain the attribute content corresponding to the attribute.

11. The method according to claim 9, wherein
the attribute type corresponding to the attribute is the spatial easing animation property, and the attribute flag information further comprises a spatial easing parameter flag bit; and
in response to a determination that the value of the animation interval flag bit indicates that the attribute content that corresponds to the attribute and is stored in the dynamic attribute data block comprises the animation interval characteristic data, the method further comprises:
  encoding, in response to a determination that the animation interval characteristic data comprises a spatial easing parameter, the spatial easing parameter flag bit into a value indicating that the attribute content that corresponds to the attribute and is stored in the dynamic attribute data block comprises the spatial easing parameter; and encoding, in response to a determination that the animation interval characteristic data does not comprise the spatial easing parameter, the spatial easing parameter flag bit into a value indicating that the attribute content that corresponds to the attribute and is stored in the dynamic attribute data block does not comprise the spatial easing parameter.

12. The method according to claim 11, wherein the encoding the attribute value corresponding to each attribute comprises:
   encoding, in response to a determination that the value of the spatial easing parameter flag bit indicates that the attribute content that corresponds to the attribute and is stored in the dynamic attribute data block comprises the spatial easing parameter, the animation interval characteristic data corresponding to the attribute according to a data storage structure corresponding to the animation interval characteristic data, to obtain the attribute content that corresponds to the attribute and comprises the spatial easing parameter; and
   encoding, in response to a determination that the value of the spatial easing parameter flag bit indicates that the attribute content that corresponds to the attribute and is stored in the dynamic attribute data block does not comprise the spatial easing parameter, the animation interval characteristic data corresponding to the attribute according to the data storage structure corresponding to the animation interval characteristic data, to obtain the attribute content that corresponds to the attribute and does not comprise the spatial easing parameter.

13. The method according to claim 12, wherein fields in the data storage structure corresponding to the animation interval characteristic data comprise a quantity of animation intervals, an interpolator type of each animation interval, a start time and an end time of each animation interval, and further comprise a start value, an end value, a time easing parameter, and a spatial easing parameter of the attribute corresponding to each animation interval.

14. An animation data encoding apparatus, comprising:
   processing circuitry configured to
      obtain animation data corresponding to an animation tag code from an animation project file;
      in response to a determination that attribute types exist in an attribute structure table corresponding to the animation tag code,
         determine attribute flag information corresponding to each attribute in the attribute structure table;
         encode, according to the attribute flag information, an attribute value corresponding to each attribute in the animation data, to obtain attribute content corresponding to each attribute; and
         for each attribute, sequentially store, according to an attribute order of the attribute structure table, the corresponding attribute flag information and the corresponding attribute content, to obtain a dynamic attribute data block corresponding to the animation tag code.

* * * * *